United States Patent
Kinoshita et al.

(10) Patent No.: US 12,550,891 B2
(45) Date of Patent: Feb. 17, 2026

(54) STORAGE METHOD OF HUMAN CORNEAL ENDOTHELIAL CELLS AND/OR HUMAN CORNEAL ENDOTHELIAL PRECURSOR CELLS

(71) Applicant: KYOTO PREFECTURAL PUBLIC UNIVERSITY CORPORATION, Kyoto (JP)

(72) Inventors: Shigeru Kinoshita, Kyoto (JP); Munetoyo Toda, Kyoto (JP); Chie Sotozono, Kyoto (JP); Morio Ueno, Kyoto (JP)

(73) Assignee: KYOTO PREFECTURAL PUBLIC UNIVERSITY CORPORATION, Kyoto (JP)

(*) Notice: Subject to any disclaimer, the term of this patent is extended or adjusted under 35 U.S.C. 154(b) by 0 days.

(21) Appl. No.: 18/032,726

(22) PCT Filed: Oct. 19, 2021

(86) PCT No.: PCT/JP2021/038609
§ 371 (c)(1),
(2) Date: Apr. 19, 2023

(87) PCT Pub. No.: WO2022/085680
PCT Pub. Date: Apr. 28, 2022

(65) Prior Publication Data
US 2023/0380417 A1    Nov. 30, 2023

(30) Foreign Application Priority Data

Oct. 22, 2020  (JP) ................................. 2020-177634

(51) Int. Cl.
A01N 1/162    (2025.01)
A01N 1/126    (2025.01)
A61K 35/30    (2015.01)
C12N 5/079    (2010.01)

(52) U.S. Cl.
CPC ............. *A01N 1/162* (2025.01); *A01N 1/126* (2025.01); *A61K 35/30* (2013.01); *C12N 5/0621* (2013.01); *C12N 2501/11* (2013.01); *C12N 2501/70* (2013.01)

(58) Field of Classification Search
None
See application file for complete search history.

(56) References Cited

U.S. PATENT DOCUMENTS

| 4,678,783 A | 7/1987 | Hidaka et al. |
| 5,958,944 A | 9/1999 | Arita et al. |
| 2004/0138286 A1 | 7/2004 | Imazaki et al. |
| 2007/0129404 A1 | 6/2007 | Hagihara et al. |
| 2007/0275365 A1* | 11/2007 | Lui ............... A61L 27/3895 |
| | | 435/405 |
| 2010/0209402 A1 | 8/2010 | Koizumi et al. |
| 2015/0210981 A1* | 7/2015 | Hagiya ............... A61K 35/30 |
| | | 435/325 |
| 2019/0083543 A1 | 3/2019 | Kinoshita et al. |
| 2021/0196656 A1 | 7/2021 | Koizumi et al. |

FOREIGN PATENT DOCUMENTS

| EP | 1 094 055 A1 | 4/2001 |
| EP | 1 378 247 A1 | 1/2004 |
| EP | 1 541 559 A1 | 6/2005 |
| EP | 1 632 492 A1 | 3/2006 |
| EP | 1 829 876 A1 | 9/2007 |
| EP | 1 932 841 A1 | 6/2008 |
| EP | 2193806 A1 | 6/2010 |
| EP | 4 116 411 A1 | 1/2023 |
| JP | 3421217 B | 6/2003 |
| JP | 2015155400 A * | 8/2015 |
| WO | 1995/028387 A1 | 10/1995 |
| WO | 1999/020620 A1 | 4/1999 |
| WO | 1999/061403 A1 | 12/1999 |
| WO | 2002/076976 A2 | 10/2002 |
| WO | 2002/076977 A2 | 10/2002 |
| WO | 2002/083175 A1 | 10/2002 |
| WO | 2002/100833 A1 | 12/2002 |

(Continued)

OTHER PUBLICATIONS

Roy et al. Understanding the Process of Corneal Endothelial Morphological Change In Vitro (2015) Investigative Ophtalmology & Visual Science, 56, pp. 1228-1237. (Year: 2015).*

Zhu et al. Engineering of Human Corneal Endothelial Grafts (2015) Current Ophthalmology Reports, 3, pp. 207-217. (Year: 2015).*

Peh et al. Optimization of human corneal endothelial cell culture: density dependency of successful cultures in vitro (2013) BMC Research Notes, 6, pp. 1-9. (Year: 2013).*

Aouimeur et al. Investigating the Role of TGF-Signaling Pathways in Human Corneal Endothelial Cell Primary Culture (2023) Cells, 12, 1624. (Year: 2023).*

(Continued)

*Primary Examiner* — Peter Paras, Jr.
(74) *Attorney, Agent, or Firm* — Foley Hoag LLP; Xianfeng Morgan Xu

(57) ABSTRACT

Human corneal endothelial cells and/or human corneal endothelial precursor cells are preserved with a high survival rate of these cells being maintained, and the occurrence rate of contaminated cells in post-preservation culturing is suppressed. A storage method of human corneal endothelial cells and/or human corneal endothelial precursor cells is characterized in that human corneal endothelial cells and/or human corneal endothelial precursor cells that have been cultured using a culture medium that contains a ROCK inhibitor, and in which the content of epidermal growth factor (EGF) is less than a concentration that will cause a transformation are harvested at a timing when any one of or a plurality of the conditions (a)~(d) have been met, and are placed in a suspension state and then preserved.

11 Claims, 44 Drawing Sheets

(56) References Cited

FOREIGN PATENT DOCUMENTS

| WO | 2003/059913 A1 | 7/2003 |
| WO | 2003/062227 A1 | 7/2003 |
| WO | 2004/009555 A1 | 1/2004 |
| WO | 2004/022541 A1 | 3/2004 |
| WO | 2004/108724 A1 | 12/2004 |
| WO | 2005/003101 A2 | 1/2005 |
| WO | 2005/034866 A2 | 4/2005 |
| WO | 2005/035501 A1 | 4/2005 |
| WO | 2005/035503 A1 | 4/2005 |
| WO | 2005/035506 A1 | 4/2005 |
| WO | 2005/037197 A2 | 4/2005 |
| WO | 2005/037198 A2 | 4/2005 |
| WO | 2005/039564 A1 | 5/2005 |
| WO | 2005/080394 A1 | 9/2005 |
| WO | 2005/103050 A2 | 11/2005 |
| WO | 2006/057270 A1 | 6/2006 |
| WO | 2007/026664 A1 | 3/2007 |
| WO | 2009/028631 A1 | 3/2009 |
| WO | 2014/038639 A1 | 3/2014 |
| WO | 2017/110094 A1 | 6/2017 |
| WO | 2017/141926 A1 | 8/2017 |
| WO | 2021/172554 A1 | 9/2021 |

OTHER PUBLICATIONS

Vianna, L.M.M., et al., "Characterization of cryopreserved primary human corneal endothelial cells cultured in human serum-supplemented media", *Arq Bras Oftalmol.* 79 (1), 2016, pp. 37-41.

Okumura, N., et al., "Feasibility of a cryopreservation of cultured human corneal endothelial cells,", *PLOS One* 14(6), Jun. 21, 2019, e0218431.

ATCC Animal Cell Culture Basics, Dec. 2011, pp. 1-40, 7-8, 29.

Rolev, K., et al., "Experimental models of corneal endothelial cell therapy and translational challenges to clinical practice", *Experimental Eye Research*, Sep. 10, 2019, vol. 188, 107794, p. 1-17.

Ueno, M., et al., "Superiority of Mature Differentiated Cultured Human Corneal Endothelial Cell Injection Therapy for Corneal Endothelial Failure", *American Journal of Ophthalmology*, May 2022, vol. 237, p. 267-277.

International Search Report Issued in International Patent Application No. PCT/JP2021/038609, dated Dec. 21, 2021, with English translation thereof.

Written Opinion of IPEA issued in International Application No. PCT/JP2021/038609, dated Jul. 19, 2022, with English translation thereof.

International Preliminary Report on Patentability (Chapter II) for International Patent Application No. PCT/JP2021/038609, dated Nov. 22, 2022, and English translation thereof.

Office Action dated Mar. 23, 2023 issued in JP patent application No. 2022-557558, with English machine translation.

Specification in Japanese application No. 2020-032139, open to public at Patentscope on Sep. 2, 2021; Corresponds to WO2021/172554A1 and EP4116411A.

Office Action dated May 14, 2024, issued in New Zealand patent application No. 799955.

Office Action for CA Application No. 3,196,110 dated May 5, 2025.

Office Action for CN Application No. 202180072227.5 dated Jul. 9, 2025 with English translation.

Office Action for IL Application No. 302168 dated Mar. 9, 2025.

Supplementary European Search Report for EP Application No. 21882821.8 dated Oct. 29, 2024.

Office Action for JP Application No. 2023-119210 dated Aug. 19, 2025 with English translation, 8 pages.

\* cited by examiner

FIG. 43

| EXAMPLE 13 : P7 D34 |
|---|
| Total Culture period = 118 days |
| Estimated Culture scale = 2,066 Flasks |
| Estimated Yield = 11,440 × 10⁶ cells |
| (7,626 injections) |

| CONTROL EXAMPLE 2: P3 D35 |
|---|
| Total Culture period = 140 days |
| Estimated Culture scale = 92 Flasks |
| Estimated Yield = 403.9 × 10⁶ cells |
| (269 injections) |

| CONTROL EXAMPLE 2: P7 D35 |
|---|
| Total Culture period = 280 days |
| Estimated Culture scale = 31,241 Flasks |
| Estimated Yield = 83,725 × 10⁶ cells |
| (55,816 injections) |

STORAGE METHOD OF HUMAN CORNEAL ENDOTHELIAL CELLS AND/OR HUMAN CORNEAL ENDOTHELIAL PRECURSOR CELLS

CROSS-REFERENCE TO RELATED APPLICATIONS

This application is a U.S. National Phase of International Patent Application No. PCT/JP2021/038609 filed on Oct. 19, 2021, which claims priority to Japanese Patent Application No. 2020-177634 filed on Oct. 22, 2020, the content of each of which is incorporated herein by reference in its entirety.

TECHNICAL FIELD

The present disclosure relates to a storage method of human corneal endothelial cells and/or human corneal endothelial precursor cells in which cells that have been preserved are subsequently differentiated and matured by being cultured again, thereby enabling expressions of functional properties of the human corneal endothelial cells to be obtained.

TECHNICAL BACKGROUND

As an in vitro method of culturing human corneal endothelial cells, as is shown in Patent Document 1, Non-Patent Document 1, and Non-Patent Document 2, a method is known in which these cells are cultured by supplying an epidermal growth factor (EGF), and by additionally supplying other factor(s) in order to suppress any adverse effects on the maturation and differentiation of the human corneal endothelial cells that might arise as a result of the EGF being supplied thereto.

In contrast to this, as is shown in Patent Document 2 and Patent Document 3, the inventors of the present disclosure developed a method of culturing human corneal endothelial cells in which the quantity of epidermal growth factor (EGF) that is supplied can be reduced as much as possible. According to the culturing methods described in Patent Document 2 or Patent Document 3, compared to the culturing methods described in Patent Document 1, Non-Patent Document 1, and Non-Patent Document 2, the occurrence of contaminated cells that have no human corneal endothelial functional properties can be suppressed as much as possible, and it is possible to obtain a cell population having an improved percentage content of functional human corneal endothelial cells (hereinafter, also referred to as 'effector cells') which have the equivalent corneal endothelial functional properties as corneal endothelial cells present in the human body.

However, a method that enables a cell population that has been cultured using the method described in Patent Document 2 or Patent Document 3, or the functional human corneal endothelial cells that are contained in this cell population to be preserved in a suspension state has not yet been established.

DOCUMENTS OF THE PRIOR ART

Patent Documents

[Patent Document 1] International Patent Publication No. 2017/110094
[Patent Document 2] International Patent Publication No. 2009/028631
[Patent Document 3] Japanese Patent Application No. 2020-032139

Non-Patent Documents

[Non-Patent Document 1] Vianna L. M. M., et al., (2016) Arq Bras Oftalmol.; 79 (1): 37
[Non-Patent Document 2] Okumura N. et al., (2019) PLos ONE 14 (6): e0218431

DISCLOSURE OF THE INVENTION

Problems to be Solved by the Invention

In order to be able to supply a cell population that has been cultured using the method described in Patent Document 2 or Patent Document 3, or the functional human corneal endothelial cells that are contained in this cell population as regenerative medical products to an international market, it is desirable that it be possible for the cell population or the functional human corneal endothelial cells to be preserved not in a monolayer culture state, but in a suspension state for a period of at least several days.

For this reason, the inventors of the present disclosure investigated methods that would enable a cell population of functional human corneal endothelial cells cultured using the method described in Patent Document 2 or Patent Document 3 to be preserved in a suspension state for a period of at least several days.

In addition, cryopreservation is beneficial in achieving the long-term storage of the cells over a period of several years, or in order to preserve the cells in a cell bank, and the inventors of the present disclosure also investigated methods of establishing cryopreservation for functional human corneal endothelial cells.

In order to proliferate human corneal endothelial cells and to maturate and differentiate them to a cell population whose functional human corneal endothelial cell percentage content (hereinafter, this may be referred to as the E-ratio) is higher than 90% is achieved, it is necessary to culture for 4 to 5 weeks or longer in the methods described in Patent Document 2 or in Patent Document 3.

For this reason, firstly, the inventors of the present disclosure performed culturing for 4 weeks or longer using the methods described in Patent Document 2 or Patent Document 3, and harvested a cell population which had been matured and differentiated until the functional human corneal endothelial cell percentage content thereof was greater than 90%. They subsequently placed this cell population in a suspension state and attempted to preserve it.

As a result, they found that, when the cell population which had been matured and differentiated until the functional human corneal endothelial cell percentage content thereof was greater than 90% was subsequently placed in a suspension state and preserved, the survival rate after preservation was low, and the rate of occurrence of contaminated cells during post-preservation culturing was high.

Upon obtaining this result, the inventors of the present disclosure undertook development of methods and compositions configured to allow preservation of functional human corneal endothelial cells (cultured using the method described in Patent Document 2 or Patent Document 3) in a suspension state while advantageously maintaining a high survival rate thereof, and while also suppressing the occurrence of contaminated cells therein.

The inventors of the present disclosure discovered that, if they harvested a cell population immediately after a timing when the destiny of this cell population to be differentiated as functional human corneal endothelial cells had been decided, which was also a timing when the proliferation viability thereof was still high, and then placed this cell population in a suspension state, then it was possible to preserve functional human corneal endothelial cells while maintaining a high survival rate thereof, and to suppress the rate of occurrence of contaminated cells during post-preservation culturing to a low level, and thereby established a new and improved storage method (and related compositions for use therein) of human corneal endothelial cells and/or human corneal endothelial precursor cells.

In addition, the inventors of the present disclosure also considered that, if they were able to harvest a cell population at a timing immediately after the destiny of this cell population to be differentiated as functional human corneal endothelial cells had been decided, which was also a timing when the proliferation viability thereof was still high, and then preserve this cell population, then by harvesting cells at the same timing as this and repeatedly performing subculturing and culturing, it was possible to achieve a large-scale culturing of functional human corneal endothelial cells in a far shorter time period than is possible via the conventional technology, and thereby additionally established a method of culturing of functional human corneal endothelial cells on a large scale.

In this manner, the inventors of the present disclosure discovered that if cells were destined to become functional human corneal endothelial cells by being cultured under appropriate culturing conditions, then by harvesting those cells in an immature state and either preserving or subculturing them, it was possible to obtain the desired target functional human corneal endothelial cells (exhibiting enhanced viability and reduced contamination), and thereby enabled the present embodiments disclosed herein to be completed for the first time.

Means for Solving the Problem

In other words, the storage method of human corneal endothelial cells and/or human corneal endothelial precursor cells according to the present disclosure is as summarized in a non-limiting manner as follows.

[Item 1] A storage method of human corneal endothelial cells and/or human corneal endothelial precursor cells characterized in that human corneal endothelial cells and/or human corneal endothelial precursor cells that have been cultured using a culture medium that contains a ROCK inhibitor, and in which either epidermal growth factor (EGF) has not been added or has been added such that the content of EGF is less than a concentration that will cause a transformation are harvested at a timing when any one of or a plurality of the conditions (a)~(d) given below have been met, and are placed in a suspension state and then preserved.
  (a) During a period from immediately after a morphology of the human corneal endothelial cells and/or human corneal endothelial precursor cells has shifted from a spindle fibroblast-like shape having irregular elongated projections to a tessellated shape (e.g., a polygonal shape or an elliptical shape) whose major axis-minor axis ratio including the projections is close to 1 (e.g., about 2:1 to about 1:2), until immediately before boundaries between the cells become indistinct.
  (b) During a period from when an expression level of CD44 becomes equal to or less than half a maximum value observed after the most recent subculturing until this expression level reaches a plateau.
  (c) When the cell density of the human corneal endothelial cells and/or human corneal endothelial precursor cells is not less than about 900 cells/mm$^2$ and not more than about 2500 cells/mm$^2$.
  (d) When the number of culturing days since seeding is not less than about 4 days and not more than about 14 days.
[Item 2] The storage method according to [Item 1], wherein the human corneal endothelial cells and/or human corneal endothelial precursor cells are preserved at a temperature of not more than about 10 degrees centigrade.
[Item 3] The storage method according to [Item 1] or [Item 2], wherein the human corneal endothelial cells and/or human corneal endothelial precursor cells are preserved at a temperature of not more than about −30 degrees centigrade.
[Item 4] The storage method according to any one of [Item 1] through [Item 3], wherein the human corneal endothelial cells and/or human corneal endothelial precursor cells are preserved for about 24 hours or longer after being placed in a suspension state.
[Item 5] The storage method according to any one of [Item 1] through [Item 4], wherein the transformation includes endothelial-mesenchymal transitions.
[Item 6] The storage method according to any one of [Item 1] through [Item 5], wherein the human corneal endothelial cells and/or human corneal endothelial precursor cells are created using, as a source, cells selected from a group containing corneal endothelial cell-derived cells, pluripotent stem cells, mesenchymal stem cells, corneal endothelial precursor cells harvested from a corneal endothelium, cells harvested from a corneal endothelium, and corneal endothelial precursor cells and corneal endothelial-like cells produced via a direct programing method.
[Item 7] The storage method according to any one of [Item 1] through [Item 6], wherein a cell population of human corneal endothelial cells obtained by culturing and/or performing differentiation and maturation on the human corneal endothelial cells and/or the human corneal endothelial precursor cells after these have been preserved using a culture medium that contains a ROCK inhibitor, and in which the content of epidermal growth factor (EGF) is less than a concentration that will cause a transformation satisfies any one of or a plurality of the conditions (1)~(8) given below.
  (1) No fibroblast, foreign matter, discoloration, or other abnormality is found upon an external visual inspection being performed using phase-contrast imaging.
  (2) The cell survival rate is 70% or more in Trypan blue dye exclusion assay.
  (3) PDGF-BB concentration of the cell supernatant is 100 pg/mL or more in a purity test performed via an ELISA.
  (4) Results of a purity test of the cells performed via a FACS satisfies all of the following ranges:
  CD166$^+$>99%
  CD24$^+$<5%
  CD44$^{high}$<5%
  CD44$^{neg-low}$>90%
  CD90$^+$<5%
  (5) The percentage content of effector cells (i.e., the E-ratio) provided with human corneal endothelium function is greater than 90%.

(6) The pumping function (Na$^+$/K$^+$ ATPase) is positive.
(7) The barrier function (ZO-1) is positive.
(8) The human corneal endothelial cell density (ECD) is 1500 cells/mm$^2$ or greater.

[Item 8] The storage method according to [Item 7], wherein the effector cells are cells in which an endothelial-mesenchymal transition has not occurred.

[Item 9] The storage method according to [Item 7] or [Item 8], wherein the effector cells are cells that either express a functional protein that is required to demonstrate corneal endothelial functional properties, or are cells in which an inhibitor protein that inhibits the corneal endothelial functional properties is not expressed or in which an expression of an inhibitor protein is reduced.

[Item 10] The storage method according to [Item 9], wherein the functional protein includes any one or a plurality of proteins selected from a group containing Na$^+$/K$^+$ ATPase, ZO-1, sodium-hydrogen exchanger 1 (NHE1), aquaporin-1 (AQP-1), and carbonic anhydrase 5B (CA5B).

[Item 11] The storage method according to [Item 9] or [Item 10], wherein the functional protein further includes any one or a plurality of metabolism-related enzymes selected from a group containing citrate synthase (CS), aconitase 2 (ACO2), isocitrate dehydrogenase 2 (IDH2), malate dehydrogenase 2 (MDH2), malic enzyme 3 (ME3), ACSS1, acetyl-CoA acetyltransferase 1 (ACAT1), pyruvate dehydrogenase (PDH), BCAT2, and branched-chain keto acid dehydrogenase (BCKDH2).

[Item 12] The storage method according to any one of [Item 9] through [Item 11], wherein the inhibitor protein includes at least one or more metabolism-related enzymes selected from a group containing ATP citrate lyase (ACLY), aconitase 1 (ACO1), isocitrate dehydrogenase 1 (IDH1), malate dehydrogenase 1 (MDH1), malic enzyme 1 (ME1), ACSS2, acetyl-CoA acetyl-transferase 2 (ACAT2), and lactate dehydrogenase (LDH).

In addition, the present disclosure further provides the following.

[Item 13] Human corneal endothelial cells and/or human corneal endothelial precursor cells preserved using the storage method described in any one of [Item 1] through [Item 12].

[Item 14] A suspension solution of human corneal endothelial cells and/or human corneal endothelial precursor cells preserved using the storage method described in any one of [Item 1] through [Item 12].

[Item 15] A method of preparing human corneal endothelial cells characterized in that the human corneal endothelial cells and/or the human corneal endothelial precursor cells preserved using the storage method described in any one of [Item 1] through [Item 12] are cultured and/or differentiated and matured using a culture medium that contains a ROCK inhibitor, and in which the content of epidermal growth factor (EGF) is less than a concentration that will cause a transformation.

[Item 16] A suspension solution preparation method for preparing a suspension solution of human corneal endothelial cells and/or human corneal endothelial precursor cells characterized in that human corneal endothelial cells and/or human corneal endothelial precursor cells that have been cultured using a culture medium that contains a ROCK inhibitor, and in which the content of epidermal growth factor (EGF) is less than a concentration that will cause a transformation are harvested at a timing when any one of or a plurality of the conditions (a)~(d) given below have been met, and are placed in a suspension state.

(a) During a period from immediately after a morphology of the human corneal endothelial cells and/or human corneal endothelial precursor cells has shifted from a spindle fibroblast-like shape having irregular elongated projections to a tessellated shape whose major axis-minor axis ratio including the projections is close to 1, until immediately before boundaries between the cells become indistinct.

(b) During a period from when an expression level of CD44 becomes equal to or less than half a maximum value observed after the most recent subculturing until this expression level reaches a plateau.

(c) When the cell density of the human corneal endothelial cells and/or human corneal endothelial precursor cells is not less than 900 cells/mm$^2$ and not more than 2500 cells/mm$^2$.

(d) When the number of culturing days since the most recent subculturing is not less than 4 days and not more than 14 days.

[Item 17] A culturing method for culturing human corneal endothelial cells and/or human corneal endothelial precursor cells characterized in that human corneal endothelial cells and/or human corneal endothelial precursor cells that have been cultured using a culture medium that contains a ROCK inhibitor, and in which the content of epidermal growth factor (EGF) is less than a concentration that will cause a transformation are harvested at a timing when any one of or a plurality of the conditions (a)~(d) given below have been met, and are subcultured.

(a) During a period from immediately after a morphology of the human corneal endothelial cells and/or human corneal endothelial precursor cells has shifted from a spindle fibroblast-like shape having irregular elongated projections to a tessellated shape whose major axis-minor axis ratio is close to 1, until immediately before boundaries between the cells become indistinct.

(b) During a period from when an expression level of CD44 becomes equal to or less than half a maximum value observed after the most recent subculturing until this expression level reaches a plateau.

(c) When the cell density of the human corneal endothelial cells and/or human corneal endothelial precursor cells is not less than 900 cells/mm$^2$ and not more than 2500 cells/mm$^2$.

(d) When the number of culturing days since the most recent subculturing is not less than 4 days and not more than 14 days.

Effects of the Invention

According to the present disclosure, human corneal endothelial cells and/or human corneal endothelial precursor cells from which it is possible to obtain a cell population, whose functional human corneal endothelial cell percentage content is made higher than about 90% by culturing the cells again after they have been preserved, is able to be preserved for a period of at least several days, while a high survival rate of the cells is maintained.

As a result, a cell population whose functional human corneal endothelial cell percentage content is made higher than about 90% by culturing the cells again is able to be supplied to an international market as a regenerative medical product.

Furthermore, it is possible to create a master cell bank using cryopreservation, and the manufacturing of functional human corneal endothelial cells as a regenerative medical product can be achieved more efficiently and more systematically.

BRIEF DESCRIPTION OF THE DRAWINGS

FIG. 43 contains the cell yields and phase-contrast microscopic images of cultivated cells in the respective culturing conditions shown in FIG. 39.

EMBODIMENTS FOR IMPLEMENTING THE INVENTION

Figure 1:
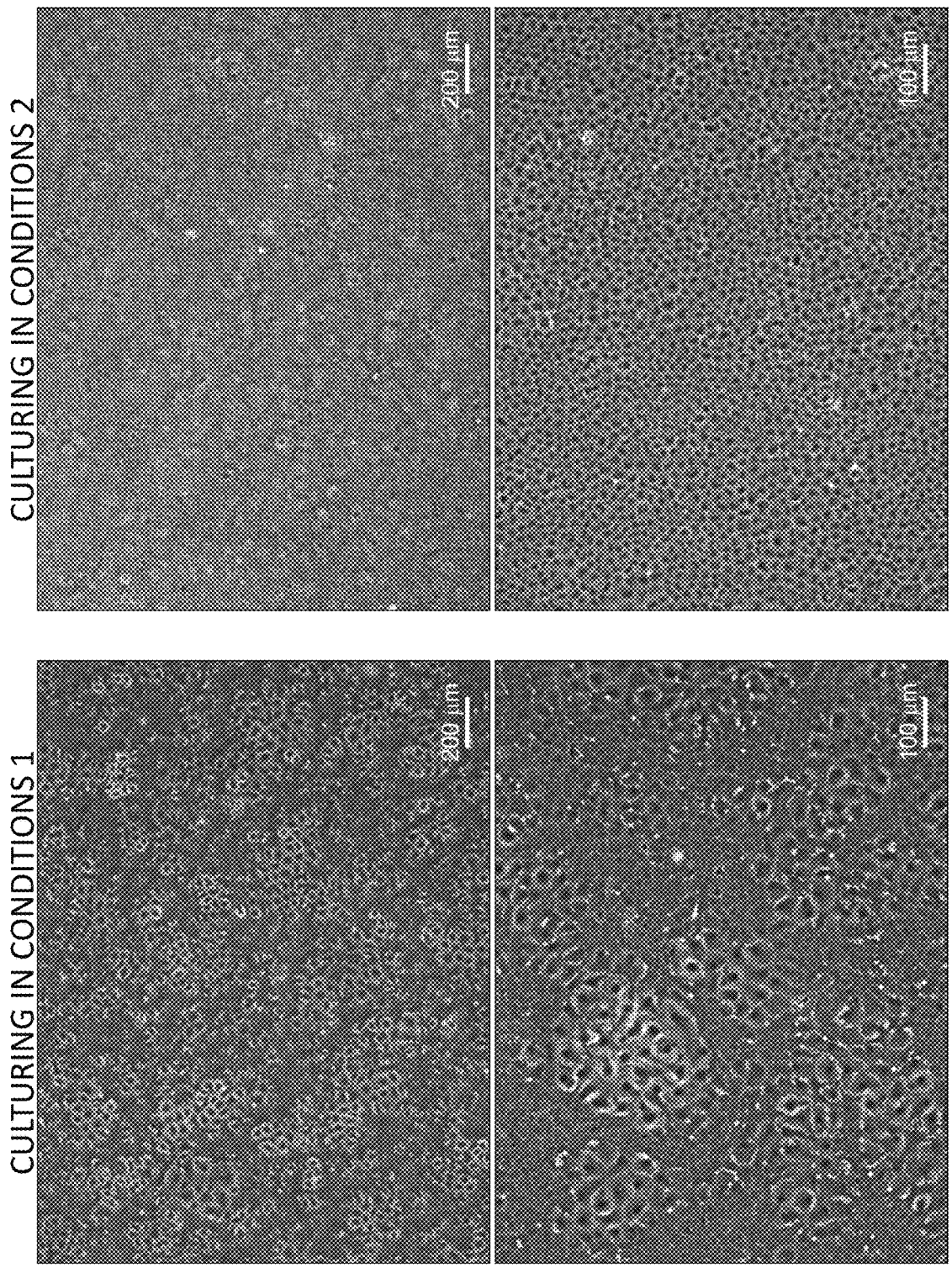
FIG. 1 contains phase-contrast microscopic images showing differences in cell morphology arising from the culturing conditions when culturing cultured human corneal endothelial cells (Passage 3).

Hereinafter, an embodiment of the present disclosure will be described.

A storage method according to the present embodiment is a method of preserving human corneal endothelial cells and/or human corneal endothelial precursor cells.

These human corneal endothelial cells and/or human corneal endothelial precursor cells are cultured in accordance with the methods described in Patent Document 2 or Patent Document 3, using a culture medium that contains a ROCK inhibitor, and in which the content of epidermal growth factor (EGF) is less than a concentration that will cause a transformation.

Note that, in the present specification, descriptions given in International Publication No. 2009/028631, which is listed as Patent Document 2, and in Patent Application No. 2020-032139, which is listed as Patent Document 3, are taken into appropriate consideration and cited.

It is preferable that the human corneal endothelial cells and/or human corneal endothelial precursor cells be created using, as a source, cells selected from a group containing corneal endothelial cell-derived cells, pluripotent stem cells, mesenchymal stem cells, corneal endothelial precursor cells harvested from a corneal endothelium, cells harvested from a corneal endothelium, and corneal endothelial precursor cells and corneal endothelial-like cells produced via a direct programing method.

In the present specification, the term 'human corneal endothelial precursor cells' indicates cells that are destined to become human corneal endothelial cells upon being differentiated and matured, and includes cells at a partway stage of their differentiation destiny being decided.

The culture medium that is used can be obtained by adding appropriate addition agents to a basic culture medium used when culturing human corneal endothelial cells such as, for example, Opti-MEM-I, Essential 6, or DMEM/F12 or the like.

Examples of the ROCK inhibitor (also known as a Rho kinase inhibitor) include compounds disclosed in the following documents: U.S. Pat. No. 4,678,783, Japanese Patent No. 3421217, International Publication No. 95/28387, International Publication No. 99/20620, International Publication No. 99/61403, International Publication No. 02/076976, International Publication No. 02/076977, International Publication No. 2002/083175, International Publication No. 02/100833, International Publication No. 03/059913, International Publication No. 03/062227, International Publication No. 2004/009555, International Publication No. 2004/022541, International Publication No. 2004/108724, International Publication No. 2005/003101, International Publication No. 2005/039564, International Publication No. 2005/034866, International Publication No. 2005/037197, International Publication No. 2005/037198, International Publication No. 2005/035501, International Publication No. 2005/035503, International Publication No. 2005/035506, International Publication No. 2005/080394, International Publication No. 2005/103050, International Publication No. 2006/057270, International Publication No. 2007/026664, and the like. These compounds can be manufactured via the methods described in the respective documents in which the compounds are disclosed. Specific examples of these compounds include 1-(5-isoquinoline sulfonyl) homopiperazine or salts thereof (for example, fasudil (1-(5-isoquinoline sulfonyl) homopiperazine)), (+)-trans-4-(1-aminoethyl)-1-(4-pyridylcarbamoyl) cyclohexane ((R)-(+)-trans-(4-pyridil)-4-(1-aminoethyl)-cyclohexane carboxamide) or salts thereof (for example, Y-27632 ((R-(+)-trans-(4-pyridil)-4-(1-aminoethyl)-cyclohexane carboxamide 2 hydrochloride 1 hydrate and the like. These compounds can be purchased from Wako Pure Chemical Corporation and Asahi Kasei Pharma Corporation and the like.

The concentration of ROCK inhibitor in the culture medium is, for example, preferably 1-100 µM, more preferably 5-20 µM, and particularly preferably 10 µm.

The term 'a concentration that is less than a concentration that will cause a transformation' refers to a concentration of epidermal growth factor (EGF) that is less than a concentration that causes a transformation (for example, an endothelial-mesenchymal transition) of the subject corneal endothelial cells to occur, or to a case in which no EGF is contained therein at all. In some embodiments, an EGF concentration that is less than a concentration that causes a transformation to occur is, for example, between about 0 ng/mL and about 5 ng/mL, between about 1 ng/mL and about 4 ng/mL, between about 2 ng/mL and about 3 ng/mL, between about 0 ng/mL and about 2 ng/mL, between about 0 ng/mL and about 1 ng/mL, and any amounts therebetween. More specifically, an EGF concentration that is less than a concentration that causes a transformation to occur is, for example, less than 2 ng/mL, and is preferably less than 1 ng/mL, and is even more preferably less than 0.5 ng/mL. From the standpoint of enabling adverse effects on the differentiation and maturation process of the human corneal endothelial cells that are caused by the addition of EGF to be eliminated completely, it is particularly preferable for this concentration to be 0 ng/mL (i.e., for there to be no added EGF). In several embodiments, the media is also free of other growth factors that mimic EGF effects, for example by operating on an upstream or downstream signaling entity.

The term 'transformation' (also known as a phase transition) refers to a transition to a state in which the cell morphology differentiates from a previous state, and includes carcinogenesis in which the cells continue to divide unrestrictedly, and dynamic metamorphoses in which the cells change so as to exceed the walls of the basic form of the tissue. Specific examples of a transformation include cell state transitions (CST) such as, for example epithelial mesenchymal transitions (EMT), fibrosis, senescence, and endothelial-mesenchymal transitions and the like.

In this way, the method of preserving human corneal endothelial cells according to the present embodiment is characterized in that a cell population that includes human corneal endothelial cells and/or human corneal endothelial precursor cells that have been cultured using a culture medium that contains a ROCK inhibitor, and in which the content of epidermal growth factor (EGF) is less than a concentration that will cause a transformation is harvested at a timing stipulated by any one of or a plurality of the respective indices (a)~(d) given below (e.g., prior to a transformation event), and is placed in a suspension state and preserved.

It is preferable that the timing at which the cells are harvested satisfies all of the indices (a)~(d), however, it is not necessary that all of these be satisfied, and it is possible for any one or more (for example, only (a)) to be satisfied.

(a) During a period from immediately after a morphology of the human corneal endothelial cells and/or human corneal endothelial precursor cells has shifted from a spindle fibroblast-like shape having irregular elongated projections to a tessellated shape whose major axis-minor axis ratio including the projections is close to 1, until immediately before boundaries between the cells become indistinct.

(b) During a period from when an expression level of CD44 becomes equal to or less than half a maximum value observed after the most recent subculturing until this expression level reaches a plateau.

(c) When the cell density of the human corneal endothelial cells and/or human corneal endothelial precursor cells is not less than 900 cells/mm$^2$ and not more than 2500 cells/mm$^2$.

(d) When the number of culturing days since the most recent subculturing is not less than 4 days and not more than 14 days.

Hereinafter, the respective indices described in (a)~(d) will be described.

Firstly, (a) will be described.

If human corneal endothelial cells are cultured using a culture medium that contains a ROCK inhibitor, and in which the content of EGF is less than a concentration that will cause a transformation, then the cell morphology changes in the following manner during the maturation and differentiation process.

Immediately after having been seeded on a culturing plate in which the above-described culture medium had been introduced, the human corneal endothelial cells and/or corneal endothelial precursor cells have a spindle fibroblast-type irregular elongated projections. As the number of culturing days increases, these elongated projections become smaller, so that the cell morphology changes to a tessellated shape (for example, to a polygonal shape such as a hexagon or the like, or to an elliptical shape) that resembles the corneal endothelial cells in the human body, and whose major axis-minor axis ratio (i.e., whose long diameter/short diameter ratio) including the projections is close to 1 (e.g., about 1.5:1, 1.25:1, 1.1:1, 1:1.1, 1:1.25, 1:1.5, and any ratio in between those listed). Thereafter, the size of the cells becomes more uniform, and when the cells become sufficiently differentiated and matured functional corneal endothelial cells, the cells adhere together and boundaries between the cells become indistinct.

In this way, the fact that the cells are harvested at a timing when the morphology of the cells that changes in accordance with the number of culturing days since the subculturing started falls within the above-described (a), in other words, during a period when the morphology of the cells is similar to the morphology of corneal endothelial cells within a human body, but is not yet completely differentiated and matured, is one of the features of the storage method according to the present embodiment.

If cells are harvested at this timing and are preserved in a suspension state, as provided for herein, then human corneal endothelial cells and/or human corneal endothelial precursor cells that enable a cell population having a functional human corneal endothelial cell (hereinafter, also referred to as effector cell) percentage content (hereinafter, also referred to as an E-ratio) of greater than about 90% to be obtained by reculturing these cells after preservation can be preserved for a period of at least several days with a high survival rate being maintained for these cells.

Next, (b) will be described.

If human corneal endothelial cells are proliferated using the above-described type of culture medium that contains a ROCK inhibitor, and in which the content of EGF is less than a concentration that will cause a transformation, then the expression level of CD44, which is a surface antigen, changes in the following manner during the maturation and differentiation process.

It has been observed that the expression level of CD44 increases greatly immediately (i.e., on the first or second day) after the human corneal endothelial cells have been seeded on a culturing plate in which the above-described culture medium had been introduced, and then decreases logarithmically as the number of culturing days increases, and that when the cells have experienced a certain degree of differentiation and maturation, the expression level drops to a constant level (i.e., reaches a plateau).

The fact that the cells are harvested at a timing when the expression level of CD44 falls within the above-described (b), in other words, during a period when the expression level of CD44 has decreased since immediately after subculturing, and the expression level of CD44 is greater than the number of cells that have already reached a plateau after sufficient differentiation and maturing, is one of the characteristic features of the storage method according to the present embodiment. Note that the expression level of CD44 can be quantified, for example, by performing flow cytometric analysis or the like using antibodies on the CD44. For example, in a case in which PE-Cy7-conjugated CD44 antibodies are dyed at the antibody-cell ratio given in Example 3, and are then analyzed using a FACSCanto™ II, and if a value of the average fluorescence intensity which represents the CD44 expression level of human corneal endothelial cells and/or human corneal endothelial precursor cells at the point in time when cell culturing has been performed for 35 days using the above-described culture medium is taken as 1, the above-described timing can be said to be a timing when a relative value of the average fluorescence intensity representing the CD44 expression level is greater than 1 and equal to or less than 60, or more preferably, equal to or less than 50. If cells are harvested at this timing and are preserved in a suspension state, then human corneal endothelial cells and/or human corneal endothelial precursor cells that enable a cell population having a functional human corneal endothelial cell percentage content of greater than about 90% to be obtained by culturing these cells again after preservation can be subsequently preserved for a period of at least several days with a high survival rate being maintained for these cells. This CD44 expression level can also be measured using a different method from flow cytometric analysis such as, for example, quantitative PCR or the like, noting however that absolute quantification is not necessary for all embodiments, rather the pattern of expression can be qualitatively assessed.

Next, (c) will be described.

After human corneal endothelial cells have been seeded on a culturing plate in which the above-described culture medium had been introduced, they increase in an approximate rectilinear manner and once they have been sufficiently differentiated and matured, it is known that the value of a corneal endothelial cell density (hereinafter, this may be referred to as an ECD) thereof levels off at a constant value.

The fact that the cells are harvested at a timing when this ECD value corresponds to the above-described (c), in other words, during a proliferation period in which the cell density is still increasing, but the cells that are destined to be differentiated as functional human corneal endothelial cells have already been decided, is one of the characteristic features of the storage method according to the present embodiment. If cells are harvested at this timing and are preserved in a suspension state, then human corneal endothelial cells and/or human corneal endothelial precursor cells that enable a cell population having a functional human corneal endothelial cell percentage content of greater than 90% to be obtained by culturing these cells again after preservation can be subsequently preserved for a period of at least several days while a high survival rate is maintained for these cells.

It is preferable that the cells be harvested during a period in which this ECD value corresponds to the above-described (c) (i.e., when the ECD value is not less than about 900 cells/mm$^2$ and not more than about 2500 cells/mm$^2$), however, it is also possible for the cells to be harvested during other periods, such as when the ECD value is not less than about 1000 cells/mm$^2$ and not more than about 2400 cells/mm$^2$, or is not less than about 1200 cells/mm$^2$ and not more than about 2000 cells/mm$^2$, or is not less than about 1200 cells/mm$^2$ and not more than about 1800 cells/mm$^2$. ECD values in between any of the combinations of ranges listed can be used as well, in several embodiments.

The corneal endothelial cell density when culturing is started is not particularly restricted, however, it is preferable that it be within a range of, for example, not less than 300 cells/mm$^2$ and not more than 500 cells/mm$^2$.

Note that the corneal endothelial cell density (ECD) may be determined, for example, by dissociating the cells from the culturing vessel using a cell dissociation solution such as TrypLE or the like and preparing a cell suspension solution, and then measuring the cell count of a portion thereof using a hemocytometer, or by using analyzing software (for example, KSSE-400EB or the like) based on photographic images or the like acquired using a phase-contrast microscope.

Next, (d) will be described.

It is preferable that the cells be harvested at a timing when the number of culturing days since the cells were seeded on a culturing plate in which the above-described culture medium had been introduced is not less than about 4 days and not more than about 14 days and, more preferably, is not less than about 6 days and not more than about 11 days, as this enables the human corneal endothelial cells and/or human corneal endothelial precursor cells to be harvested at timings that correspond to the above-described (a)~(c).

Human corneal endothelial cells and/or human corneal endothelial precursor cells harvested at the above-described timings may be preserved at an appropriate optimum temperature, however, it is preferable that they be preserved, for example, at low temperature at about 10° C. or less or the like, at ice temperature at about 4° C. or less, or about 0° C. or less or the like, or cryopreserved at about −10° C. or less, or about −30° C. or less, or about −80° C. or less or in a liquid nitrogen tank and the like.

The preservation temperature may be varied slightly during the preservation period, however, it is preferable that the preservation temperature be kept within the above-described temperature ranges between, for example, when the cells are frozen and when they are unfrozen in order to be used.

The period for which the human corneal endothelial cells are preserved in a suspension state can be appropriately set in accordance with the time required for them to be transported from the production facility to the treatment facility where they will be used. However, irrespective of whether the cells are preserved at low temperature, preserved at ice temperature, or are cryopreserved, it is preferable that this preservation be for 24 hours or longer, and more preferably two days or longer, three days or longer, four days or longer, or long-term preservation of a week or longer. In particular, in the case of cryopreservation, preservation for periods of several months to several years may also be considered.

As the preservation solution or suspension solution when the human corneal endothelial cells are preserved in suspension, in the case of ice temperature preservation, the conditioned culture medium used for the culturing is preferable, however, the present disclosure is not limited to this, and it is also possible, for example, to use a preservation solution that is typically used when cultured cells are preserved.

In the case of cryopreservation, it is possible to use a suspension solution containing a cryoprotective agent that is widely used in the cryopreservation of animal cells.

The following cryoprotective agents which have cell membrane permeability are examples of the above-described type of cryoprotective agent. Namely, any one type or two or more types of cryoprotective agent selected from a group containing dimethyl sulfoxide, ethylene glycol (EG), propylene glycol (PG), 1, 2 propanediol (1, 2-PD), 1, 3 propanediol (1, 3-PD), butylene glycol (BG), isoprene glycol (IPG), dipropylene glycol (DPG), and glycerin.

According to the above-described method of preserving human corneal endothelial cells and/or human corneal endothelial precursor cells, it is possible to preserve human corneal endothelial cells and/or human corneal endothelial precursor cells for a prolonged preservation period while maintaining an unexpectedly high survival rate for these cells. It is thought that one reason for this type of prolonged preservation period being able to be achieved is the fact that cells are harvested and preserved at a timing when the ERK (p44/42 MAPK) activation (i.e., phosphorylation) is more advanced compared to ERK activation after maturation and differentiation.

Furthermore, although it is necessary to overcome a tendency for phase transition to occur easily in order to obtain functional corneal endothelial cells, because human corneal endothelial cells and/or human corneal endothelial precursor cells harvested at the above-described timings, which are also the timings stipulated by the above-described respective indices (a)~(d), are harvested after their destiny to be differentiated as functional human corneal cells has already been decided, even if the culturing thereof is started again after they have been preserved in a suspension state, phase transition is suppressed, and it is as a result advantageously possible to obtain a cell population whose functional human corneal endothelial cell percentage content is higher than 90%. Furthermore, because cells whose destiny to be differentiated as functional human corneal endothelial cells has already been decided are harvested, it is possible to administer preserved cells to a patient without any further modification. The stored cells or cells cultured again after storage can be suitable for delivery to the eye of a subject (patient) to treat an ocular disease or injury, for example, by their administration as medicine, by transplantation, and so on.

In the case of administrating the cells as medicine, these cells may be administered as they are, or they may be used for the preparation of pharmaceuticals containing these cells. The above-mentioned disease or injury is preferably related to the cornea.

Whether or not human corneal endothelial cells and/or human corneal endothelial precursor cells that have been preserved using the above-described storage method, and have then been restored from a low-temperature preservation (e.g., about −20° C. or colder) state to a temperature range between room temperature such as 25° C. or the like and approximately 37° C., and have then been once again seeded in a culture medium and cultured for a predetermined period (hereinafter, described as cells that 'have been recovered') are able to provide a cell population whose functional human corneal endothelial cell percentage content is higher than 90%, can be verified by determining whether or not any one of, or a plurality of, the Conditions (1)~(8) (also called indices) given below has been satisfied.

Note that the predetermined period mentioned above is a period that enables human corneal endothelial cells and/or human corneal endothelial precursor cells to be sufficiently differentiated and matured, and is preferably, for example, about four weeks (e.g., 28 days) or more since seeding, and more preferably about five weeks (e.g., 35 days) or more since seeding.

(1) No fibroblast, foreign matter, discoloration, or other abnormality is found upon an external visual inspection being performed using phase-contrast imaging.
(2) The cell survival rate is 70% or more in Trypan blue dye exclusion assay.
(3) PDGF-BB of the cell supernatant is found to be at least about 100 pg/mL or more in a purity test performed via an ELISA.
(4) Results of a purity test of the cells performed via a FACS satisfies all of the following ranges:
$CD166^+>99\%$
$CD24^+<5\%$
$CD26^+<5\%$
$CD44^{high}<5\%$
$CD44^{neg\sim low}>90\%$
$CD90^+<5\%$
(5) Effector cells (i.e., the E-ratio) are more than about 90%.
(6) The pumping function ($Na^+/K^+$ ATPase) is positive.
(7) The barrier function (ZO-1) is positive.
(8) The human corneal endothelial cell density (ECD) is 1500 cells/mm$^2$ or greater.

Note that the functional human corneal endothelial cells (i.e., the effector cells) referred to in the present specification are human corneal endothelial cells having the same type of corneal endothelial characteristics as human corneal endothelial cells present in the human body, or that are able to induce human corneal functions by being injected into a human eye anterior chamber. More specifically, these effector cells are cells that satisfy, out of the Conditions (1)~(8) given above, in particular, one or more of the $CD166^+$, the $CD24^-$, and the $CD44^{neg\sim low}$ indices of the aforementioned Condition 4. Note that, of these indices, it is confirmed in Patent Document 2 that the index $CD26^+<5\%$ has already been achieved in a cell population in which the $CD44^{high}<5\%$.

The term 'able to induce human corneal functions' includes the capability of inducing corneal endothelial characteristics (for example, improving corneal opacity and hydrated edemas, and as a result, maintaining corneal endothelial cell density continuously over a prolonged period; and having efficacy in relation to improving vision and the like).

As is described in the aforementioned Patent Document 3, in functional human corneal endothelial cells having corneal endothelial characteristics, it is known that expressions of functional proteins related to corneal endothelial characteristics are recognized.

Examples of the functional protein include $Na^+/K^+$ ATPase, ZO-1, a sodium/hydrogen exchanger 1 (NHE1) and/or aquaporin 1 (AQP-1), and carbonic anhydrase 5B (CA5B).

In addition, as has been verified in Patent Document 3, it is considered that, in human corneal endothelial cells that have been proliferated and/or differentiated and matured in the presence of a ROCK inhibitor and in the presence of an EGF whose concentration is less than a concentration that would cause a transformation, a phase transition of the cultured cells is suppressed as a result of the activation of metabolites generated by enzymes relating to a TCA metabolic pathway that works in the cytoplasm and nucleus and, especially, the activation of epigenetic multigenes such as a histone acetylation generated by acetyl coenzyme A (Ac-CoA) being avoided. The proof of this is that it has been verified that expressions of any one or a plurality of metabolism-related enzymes selected from a group containing citrate synthase (CS), aconitase 2 (ACO2), isocitrate dehydrogenase 2 (IDH2), malate dehydrogenase 2 (MDH2), malic enzyme 3 (ME3), ACSS1, acetyl-CoA acetyltransferase 1 (ACAT1), pyruvate dehydrogenase (PDH), BCAT2, and branched chain keto acid dehydrogenase (BCKDH2) are more advanced in the mitochondria of these functional human corneal endothelial cells, so that these are also included among the functional proteins. Because of this, it is considered that inhibitor proteins that is at least one or more metabolism-related enzyme selected from a group containing ATP citrate lyase (ACLY), aconitase 1 (ACO1), isocitrate dehydrogenase 1 (IDH1), malate dehydrogenase 1 (MDH1), malic enzyme 1 (ME1), ACSS2, acetyl-CoA acetyltransferase 2 (ACAT2), and lactate dehydrogenase (LDH), are not expressed or substantially not expressed.

The invention is not limited to those described above.

For example, the culture medium used need not necessarily have the composition described in the above embodiments. Needless to say, the composition of the medium is sufficient as long as it can be obtained human corneal endothelial cells and/or human corneal endothelial precursor cells that meet the aforementioned evaluation criteria at the time of cell collection or re-culturing.

In addition, it should be understood that various modifications and combinations of embodiments may be made insofar as they do not depart from the spirit or scope of the present disclosure.

EXAMPLES

Hereinafter, the various embodiments of the present disclosure will be described in more detail using examples, however, it should be noted that the present disclosure is not limited by the following descriptions.

The tests described in the following examples were conducted while respecting medical codes of ethics such as the Helsinki Declaration and the like, regulations such as GCH and the like, as well as regulations stipulated by Kyoto Prefectural University of Medicine and others, and with the approval of Ethics Committees associated with organizations with which the present inventors are affiliated. These tests were conducted after the necessary informed consents had been obtained.

Example 1: Verification of the Effects of the Culturing Conditions on the Phase Transition Cell Occurrence Rate In this Example 1, it was verified that it is possible to culture a cell population containing an extremely high proportion of functional human corneal endothelial cells (i.e., effector cells) by proliferating and/or differentiating and maturing cells using a culture medium that contains a ROCK inhibitor, and in which the content of EGF is less than a concentration that will cause a transformation. Corneal endothelial cells harvested from corneas derived from the same donor were cultured using two types of culturing solutions having different additive compositions, and their effects on the cell quality such as the percentage content of functional human corneal endothelial cells (i.e., effector cells) was examined
(Materials Used in the Tests)

Donor corneas from an 18-year-old male were used.

The culture medium that was used was Opti-MEM-I+8% content by mass of FBS+200 mg/ml of $CaCl_2$+0.08% content by mass of chondroitin sulfate+20 μg/ml of ascorbic acid+50 μg/ml of gentamicin.

In Culturing Conditions 1 of the following test, the above-described culture medium to which 0.5 ng/ml of EGF, 10 μM of SB203580, and 10 μM of Y-27632 had been added as additives was used as the culture medium.

In contrast, in Culturing Conditions 2, the above-described culture medium to which only 10 μM of Y-27632 had been added as an additive, with no addition of EGF or SB203580, was used as the culture medium.
(Cell Culturing)

Using donor corneas obtained from a Seattle eye bank, corneal endothelial cells were dissociated therefrom together with the Descemet's membrane and were processed for one evening at 37° C. using collagenase. Thereafter, the cells were suspended in the Culturing Conditions 1 culture medium, and were seeded on a 6-well plate that had been coated with type I collagen at a rate of one well per eye. These wells were set inside a $CO_2$ incubator and were then cultured for 34 days. The culture medium was replaced at a frequency of twice per week.

After the cells had been dissociated from the culture dishes using 10× TrypLE™ Select (from Thermo Fisher Scientific), the number of harvested cells was measured using a hemocytometer. The cell suspension solutions were then divided into 2, with one suspension solution being seeded in the Culturing Conditions 1 culture medium, and the other suspension solution being seeded in a new culturing vessel containing the Culturing Conditions 2 culture medium at respective cell densities of 400 cells/mm². The cells were then cultured again inside the $CO_2$ incubator for a period of 42 days.

Subculturing of the cells were then repeated by repeatedly performing operations below: dissociation of the cells After the cells from the culture dishes using 10× TrypLE™ Select (from Thermo Fisher Scientific), measuring the number of harvested cells using a hemocytometer, seeding the cells at respective cell densities of 400 cells/mm², and culturing the cells inside a $CO_2$ incubator for periods of 29~42 days under the respective Culturing Conditions.
(Verification of Cell Morphology by Phase-Contrast Microscopic Imaging)

Phase-contrast images of cells of Passage 3 (i.e., third generation cells after the cells had been divided between Culturing Conditions 1 and Culturing Conditions 2) that had been cultured using Culturing Conditions 1 or Culturing Conditions 2 are shown in FIG. 1.

It can be understood from FIG. 1 that, in Culturing Conditions 1, a large number of phase transition cells with a clearly larger cell size have emerged. In contrast, it can also be understood that, in Culturing Conditions 2, it even when subculturing is repeatedly performed, the size of the cells stays uniform, so that the emergence and increase of phase transition cells are suppressed, and foreign matter, discoloration, or other abnormality is not observed.

Figure 2:
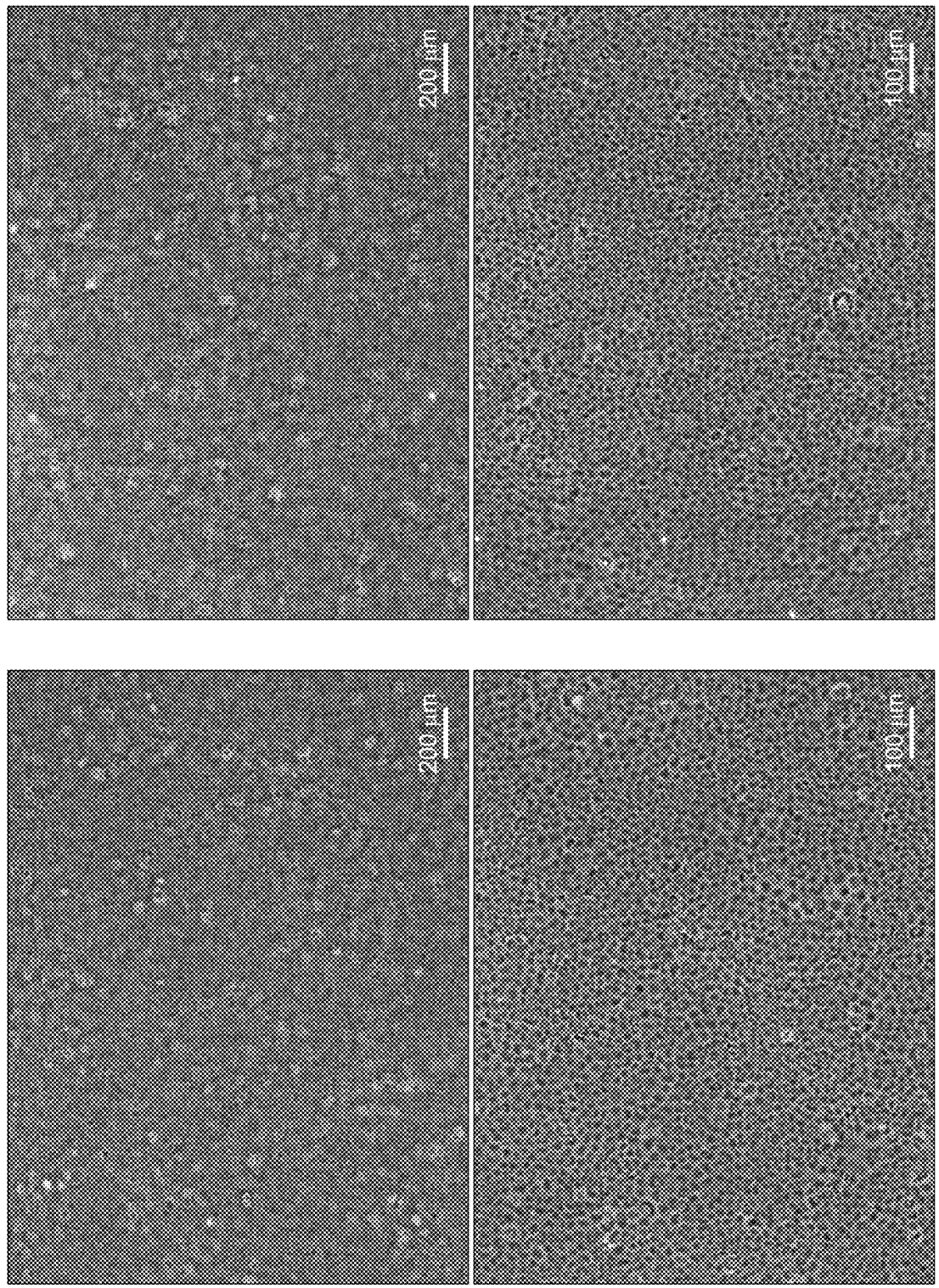
FIG. 2 contains phase-contrast microscopic images showing cultured human corneal endothelial cells subcultured to Passage 7 in Culturing Conditions 2.

FIG. 2 contains phase-contrast images of cells that have been subcultured and cultured to Passage 7 in Culturing Conditions 2, however, even at this stage, it can be understood that there is substantially no change from the cells shown in FIG. 1, and the size of the cells is kept uniform so that the emergence and increase of phase transition cells are suppressed.
(Analysis of Surface Antigens)

Figure 3:
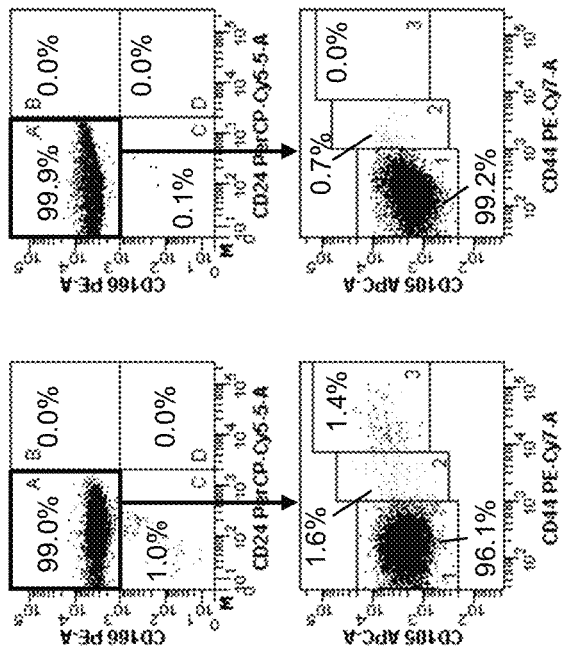
FIG. 3 contains graphs showing results of analyses of cell surface antigens of cells at Passage 3 cultured in Culturing Conditions 1, and cells at Passage 3 or at Passage 7 cultured in Culturing Conditions 2.

FIG. 3 shows results of analyses performed using flow cytometry of cell surface antigens of cells in Passage 3 cultured in Culturing Conditions 1, and cells in Passage 3 or in Passage 7 cultured in Culturing Conditions 2. These analyses of the cell surface antigens were performed in the same way as in Example 4 described below.

From the results shown in FIG. 3 as well, it can be understood that even if subculturing and culturing are repeated until Passage 7 in Culturing Conditions 2, there is a high proportion of effector cells showing $CD166^+$ $CD24^-$ $CD44^{neg-low}$ characteristics, or $CD44^{neg-low}$ $CD90^{neg-low}$ characteristics in the surface antigens of human corneal endothelial cells, and that a cell population having a high percentage content of the target functional human corneal endothelial cells has been cultured.

Note that, in the indices showing that cells are $CD166^+$ $CD24^-$ $CD44^{neg-low}$, the expression level of CD44 in the graphs in the middle row was examined after extracting the cell populations contained in the Gate A of $CD166^+$ $CD24^-$ in the graphs in the upper row in FIG. 3. Moreover, in the indices showing that cells are $CD44^{neg-low}$ $CD90^{neg-low}$, the graphs in the bottom row in FIG. 3 were examined independently of the graphs in the upper row and middle row in FIG. 3. This also applies for FIG. 6, FIG. 10, FIG. 16, FIG. 20, FIG. 21, FIG. 22, FIG. 30, and FIG. 38 and the like.

Expression levels of these surface antigens may be defined in the following manner.

[−] or [neg] indicates that essentially no expression was observed, in other words, the examination result was negative.

[+] indicates those that were not negative, in other words, those in which expressions were observed, and indicates a positive examination result.

[low] indicates that, if cases in which expression is recognized are divided into three levels, namely, weak positivity, medium positivity, and strong positivity, then [low] indicates a weak positive result, and an expression level that does not satisfy this weak level is considered a negative result.

[high] indicates that, if cases in which expression is recognized are divided into three levels, namely, weak positivity, medium positivity, and strong positivity, then [high] indicates a strong positive result.

Due to variations in the fluorescence intensity arising from the type of marker fluorescence and the instrument settings and the like, it is difficult for an expression intensity of surface antigens such as CD markers and the like to be defined numerically. However, it is possible for each of the weak positivity, medium positivity, and strong positivity in the conditions described below to be defined within ranges of fluorescence intensity such as those given below.

Conditions: in a case in which, using PE-Cy7-conjugated antihuman CD44 antibodies (BD Biosciences), the setting value of the area scaling factor of a FACSCanto™ II was set to blue laser=0.75, and the voltage setting value was set to PE-Cy7=495.

Weak positivity: the fluorescence intensity was less than approximately 3800.

Medium positivity: the fluorescence intensity was from approximately 3800 to less than 27500.

Strong positivity: the fluorescence intensity was equal to or greater than approximately 27500.

For example, in FIG. 3, the marker used to determine whether an examination result is negative or positive is a solid line that separates areas (also known as gates) of negativity and positivity in the graphs.

In addition, as the markers used to differentiate between the three stages of weak positivity, medium positivity, and strong positivity in FIG. 3, frames that distinguish three areas (also known as gates) are described.

Note that the percentages shown in the drawings indicate the proportions of cells belonging to the above-described respective areas.

(Verification of Expressions of Functional Proteins Using Immunostaining)

Furthermore, expressions of $Na^+/K^+$ ATPase and ZO-1 were examined via immunostaining for the cells of Passage 7 cultured in Culturing Conditions 2. After the cells were subcultured to Passage 7, they were then cultured in the same culture medium for 40 days with the culture medium being replaced at a frequency of twice per week. Thereafter, excluding culture supernatants, the cells were fixed in ice cold methanol, or in a 4% paraformaldehyde/phosphate buffer solution. After being washed in PBS (−), the cells were subjected to permeabilization processing for 10 minutes in PBS (−)+0.02 percentage by mass of Triton X-100. Thereafter, blocking was performed for a period of not less than one hour at room temperature in PBS (−)+1 percentage by mass of bovine serum albumin. After the blocking, the cells were reacted overnight at 4° C. with mouse anti-$Na^+/K^+$ ATPase antibodies, or mouse anti-ZO-1 antibodies, or mouse anti-N-Cadherin antibodies. After the cells were subsequently washed four times in PBS (−), they were reacted for one hour at room temperature with AlexaFluor 555-conjugated anti-mouse IgG antibodies. After again being washed in PBS (−), the cells were reacted for 10 minutes using 5 μg/ml of DAPI so as to stain the cell nuclei. The cells were then once again washed three times in PBS (−) and were observed using a fluorescence microscope. The results of this are shown in FIG. 4.

Figure 4:
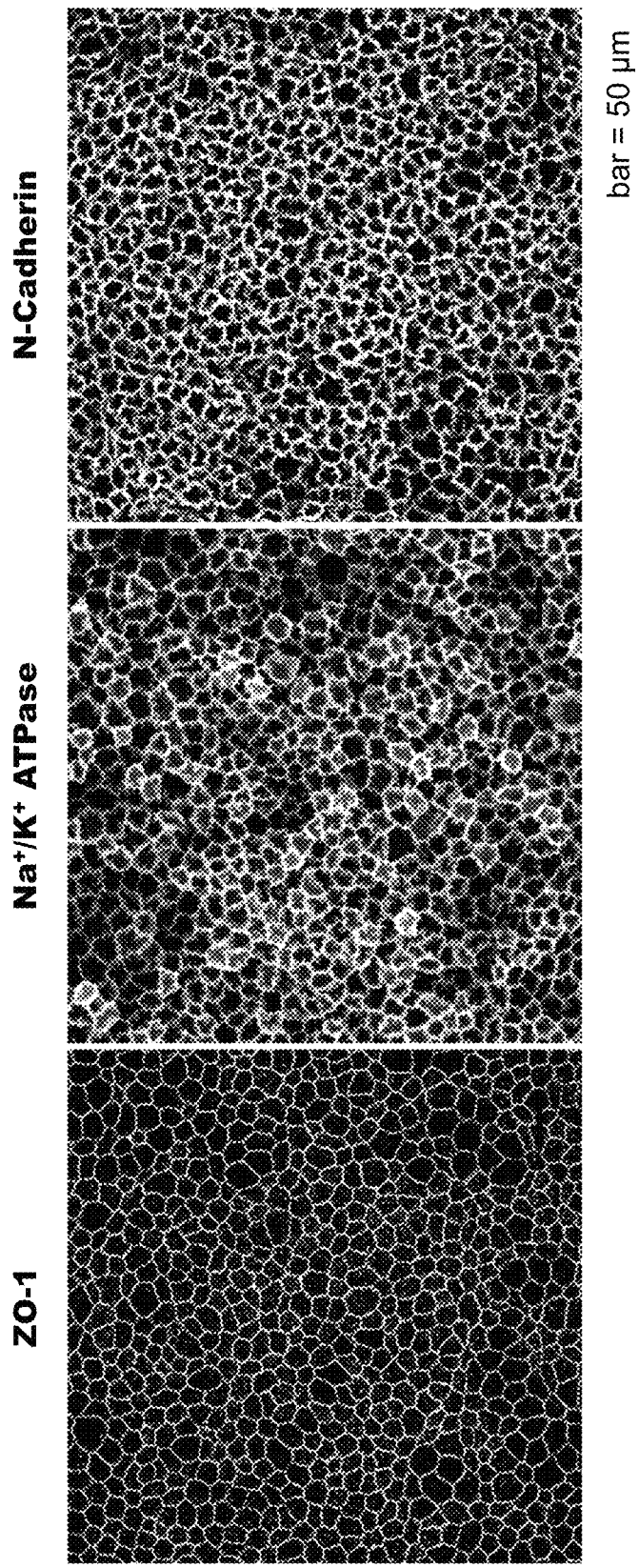
FIG. 4 contains photographic images of immunofluorescence analysis of $Na^+/K^+$ ATPase, ZO-1, and N-Cadherin expression in the cells at Passage 7 cultured in Culturing Conditions 2.

From the results shown in FIG. 4 as well, it was verified that, in substantially all of the cells of Passage 7 that were cultured in Culturing Conditions 2, $Na^+/K^+$ ATPase, ZO-1, and N-Cadherin, which are essential functional proteins in functional human corneal endothelial cells, were expressed.

(Verification of the PDGF-BB Production Quantity)

Culture supernatants that were cultured in Culturing Conditions 2 were harvested on day 34 after subculturing to Passage 7, and the concentration of PDGF-BB secreted in the culture supernatants was examined using a Human PDGF-BB ELISA Kit (Abcam, #ab184860). As a result, it was confirmed that the concentration of PDGF-BB in the culture supernatants was 328.4±19.6 pg/mL, so that the standard value 100 pg/mL or more was satisfied.

(Conclusion)

From the above results, it was verified that, in accordance with several embodiments disclosed herein, by proliferating and/or performing differentiation and maturation using a culture medium that contains a ROCK inhibitor, and in which the content of EGF is less than a concentration that will cause a transformation, it is possible to suppress the emergence of phase transition cells, and to culture a cell population containing an extremely high proportion of functional human corneal endothelial cells. In addition, it can also be sufficiently predicted that based on the experience of the present inventors.

It can be appreciated that compounds exhibiting properties of ROCK inhibition besides Y 27632 may be similarly, or more, efficacious. In some embodiments, ROCK inhibitors may comprise one or a combination of the following: AT-13148, BA-210, β-Elemene, Chroman 1, DJ4, Fasudil, GSK-576371, GSK429286A, H-1152, Hydroxyfasudil, Ibuprofen, LX-7101[24], Netarsudil, RKI-1447, Ripasudil, TCS-7001, Thiazovivin, Verosudil (AR-12286), Y-27632, Y-30141, Y-33075, or Y-39983.

Example 2: Verification of Culturing Conditions to Inhibit Phase Transitions

In Example 2, it was verified that a cell population cultured in the above-described Culturing Conditions 2 from an initial culturing (Passage 0) from donor corneas contained a high proportion of functional human corneal endothelial cells.

(Materials Used in the Tests)

Donor corneas from a 27-year-old male were used.

The culture medium that was used was the same as that used for Culturing Conditions 2 of Example 1.

(Cell Culturing)

Using donor corneas obtained from a Seattle eye bank, corneal endothelial cells were dissociated therefrom together with the Descemet's membrane and were processed for one evening at 37° C. using collagenase. Thereafter, the cells were suspended in a Culturing Conditions 2 culture medium, and were seeded on a 6-well plate that had been coated with type I collagen at a rate of one well per eye. These wells were set inside a $CO_2$ incubator and were then cultured for 40 days. The culture medium was replaced at a frequency of once per week.

After the cells had been dissociated from the culture dishes using 10× TrypLE™ Select (from Thermo Fisher Scientific), the number of harvested cells was measured using a hemocytometer. This cell suspension solution was then seeded in new culturing vessels each containing the Culturing Conditions 2 culture medium at a cell density of 400 cells/mm$^2$. The cells were then cultured once again inside a $CO_2$ incubator for a period of 32 days.

Subculturing of the cells were then repeated by repeatedly performing operations below: After the dissociation of the cells from the culture dishes using 10× TrypLE™ Select (from Thermo Fisher Scientific), measuring the number of harvested cells using a hemocytometer, seeding the cells at respective cell densities of 400 cells/mm 2, and culturing the cells inside a $CO_2$ incubator for periods of 38~44 days under the respective Culturing Conditions.

(Verification of Cell Morphology by Phase-Contrast Microscopic Imaging)

Phase-contrast images of cells of Passage 7 that had been cultured in the manner described above are shown in FIG. 5.

Figure 5:
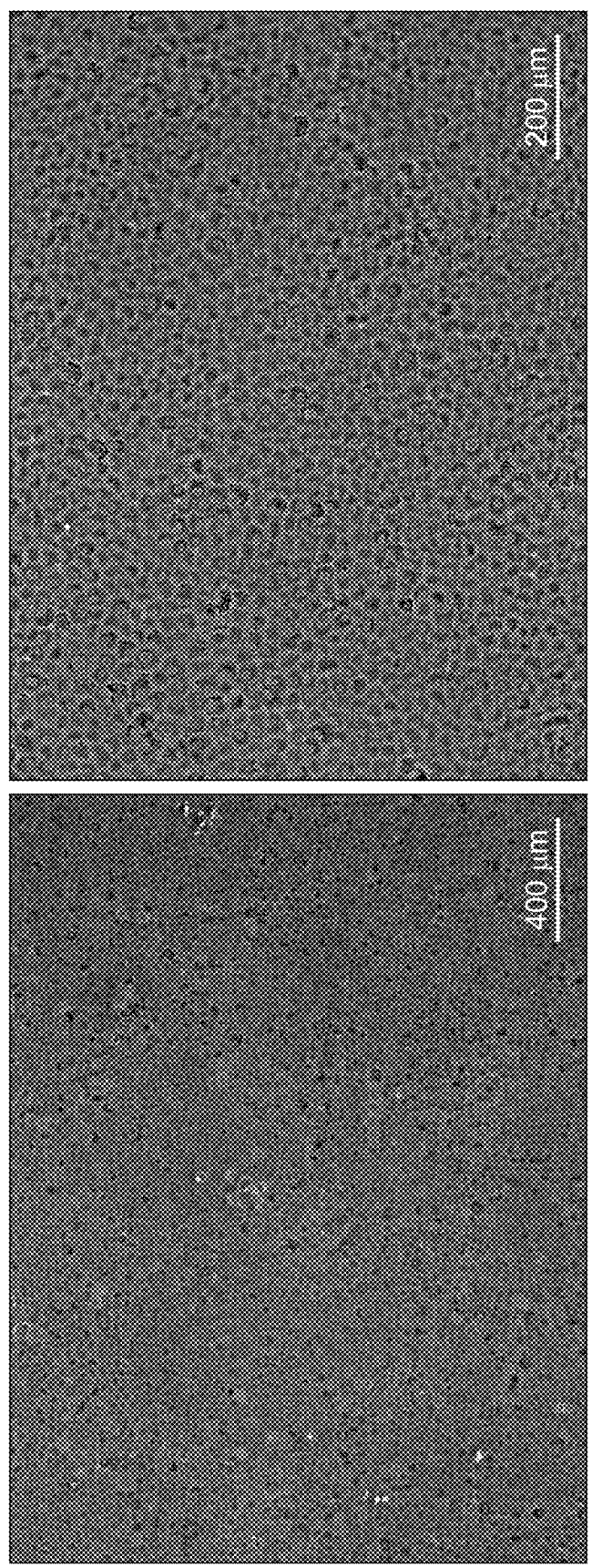
FIG. 5 contains phase-contrast microscopic images showing cells at Passage 7 that were cultured in Culturing Conditions 2 from Passage 0.
Figure 6:
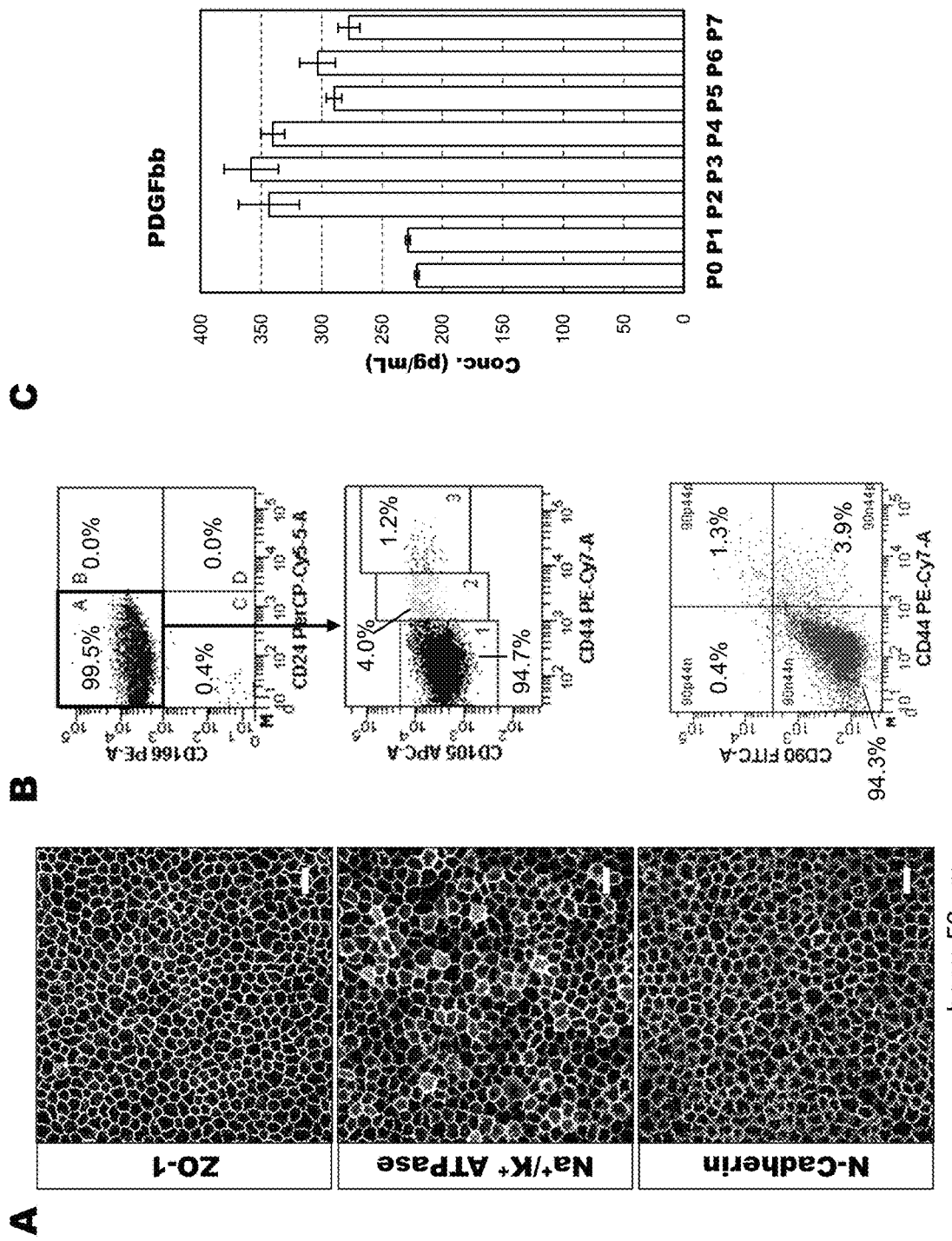
FIG. 6 contains photographic images and graphs showing expression of cell surface antigens and the like on the cells shown in FIG. 5.

It can be understood from the phase-contrast images in FIG. 5 that in the cells of Passage 7 cultured in this example, the size of the cells stays uniform, so that the emergence and increase of phase transition cells are suppressed.

(Analysis of Surface Antigens)

Results obtained when surface antigens were analyzed in the cells of Passage 7 of the present example using the same procedure as that employed in Example 1 are shown in graphs in FIG. 6B. From these results it is evident that, in substantially all the cells of Passage 7 of the present example, characteristics of surface antigens are shown in the functional human corneal endothelial cells.

From these results it was verified that, in the present example as well, even if subculturing is performed for a prolonged period in these Culturing Conditions 2 until Passage 7, a cell population having a high percentage content of the target functional human corneal endothelial cells can be cultured while the quality thereof is maintained at a high standard.

(Verification of Expressions of Functional Proteins Using Cell Immunostaining)

Furthermore, expressions of Na$^+$/K$^+$ ATPase, ZO-1, and N-Cadherin were examined in the Passage 7 cells cultured in the present example using immunostaining in the same way as in Example 1. The results obtained are shown in FIG. 6A.

From these results as well, it was confirmed that, in substantially all of the cells of Passage 7 that were cultured in the present example, Na$^+$/K$^+$ ATPase, ZO-1, and N-Cadherin, which are essential functional proteins in human corneal endothelial cells, were expressed.

(Verification of the PDGF-BB Production Quantity)

In the culture supernatants of Passages 0~7 that were cultured in the present example, the concentration of PDGF-BB secreted in the culture supernatants was examined using a Human PDGF-BB ELISA Kit (Abcam, #ab184860), and the results thereof are shown in FIG. 6C. It was confirmed that a concentration that was equal to or greater than the standard value of 100 pg/mL was achieved in all the Passages.

(Conclusion)

From the results obtained from Example 2, it was verified that, by using the culture medium of Culturing Conditions 2 (i.e., a culture medium that contains a ROCK inhibitor, and in which the content of EGF is less than a concentration that will cause a transformation) even from the initial culturing (i.e., from Passage 0), it is possible to suppress phase transitions even in culturing that takes place over a prolonged period until Passage 7, and to obtain a cell population containing an extremely high proportion of the target functional human corneal endothelial cells.

It is considered that phase transitions of human corneal endothelial cells are irreversible, so that even if cells that have actually undergone a phase transition are cultured in the culture medium of Culturing Conditions 2, they are not able to be restored to being functional human corneal endothelial cells. Because of this, in order to obtain a cell population having a high percentage content of functional human corneal endothelial cells, it is preferable that the culturing be performed in a culture medium such as that used in Culturing Conditions 2, namely, a culture medium that contains a ROCK inhibitor, and in which the content of EGF is less than a concentration that will cause a transformation, from as early a stage as possible, such as from Passage 0 or Passage 1 or the like.

Example 3: Verification of Cryopreservation and Survival Rate of Cells

In Example 3, it was confirmed that, by harvesting a cell population that had been cultured in the above-described Culturing Conditions 2 at a specific culturing timing after subculturing, it is possible to cryopreserve functional human corneal endothelial cells at a high survival rate, and that by culturing these cells in Culturing Conditions 2 after they had been thawed, a cell population having a high percentage content of functional human corneal endothelial cells is obtained.

(Materials Used in the Tests)

Donor corneas from a 29-year-old female were used.

The culture medium that was used was the same as that used for Culturing Conditions 2 of Example 1.

(Culturing and Cryopreservation)

Cells that had been cultured in the same conditions as in Example 2 to Passage 3 (i.e., on day 136 after subculturing) were dissociated from the culture dishes using 10× TrypLE™ Select (from Thermo Fisher Scientific). The cells were then divided into two cell portions, with one portion thereof being suspended in a culture medium having the Culturing Conditions 2 of Example 1, and then seeded on a culturing plate that had been coated with type I collagen at a cell density of 400 cells/mm$^2$. The remaining cells were suspended at a cell density of 1,000,000 cells per 1 ml in CELLBANKER 1 (Nippon Zenyaku Kogyo Co., Ltd.), and this cell suspension solution was dispensed into cell cryopreservation tubes (Corning Inc.) at a rate of 400 μl per tube. After the cell cryopreservation tubes containing this cell suspension solution had then been rested on ice for one hour, a portion of the tubes were placed in an air layer portion of a liquid nitrogen tank, and were frozen and preserved. The remaining tubes were placed in a BICELL animal cell bio freezing vessel (NIHON FREEZER Co., Ltd.), and were frozen and preserved at −80° C. using an ultra-deep freezer (PHC Holdings Corporation) (Control Example).

The culture medium of the former portion of these seeded cells was replaced with the same culture medium on the fourth day after seeding, and the cells were harvested from the culturing plate on day 5 using 10× TrypLE™ Select (from Thermo Fisher Scientific). The harvested cells were then frozen and preserved using the same method as that described above (Example 3).

(Verification of the Survival Rate)

The respective cells that were cryopreserved in this way were thawed while still in their tubes in a warm water bath that was maintained at 37° C., and were then washed once in 4 ml of the culturing solution of Culturing Conditions 2.

After being washed, the cells were suspended in 400 µl of the culturing solution of Culturing Conditions 2.

Figure 7:
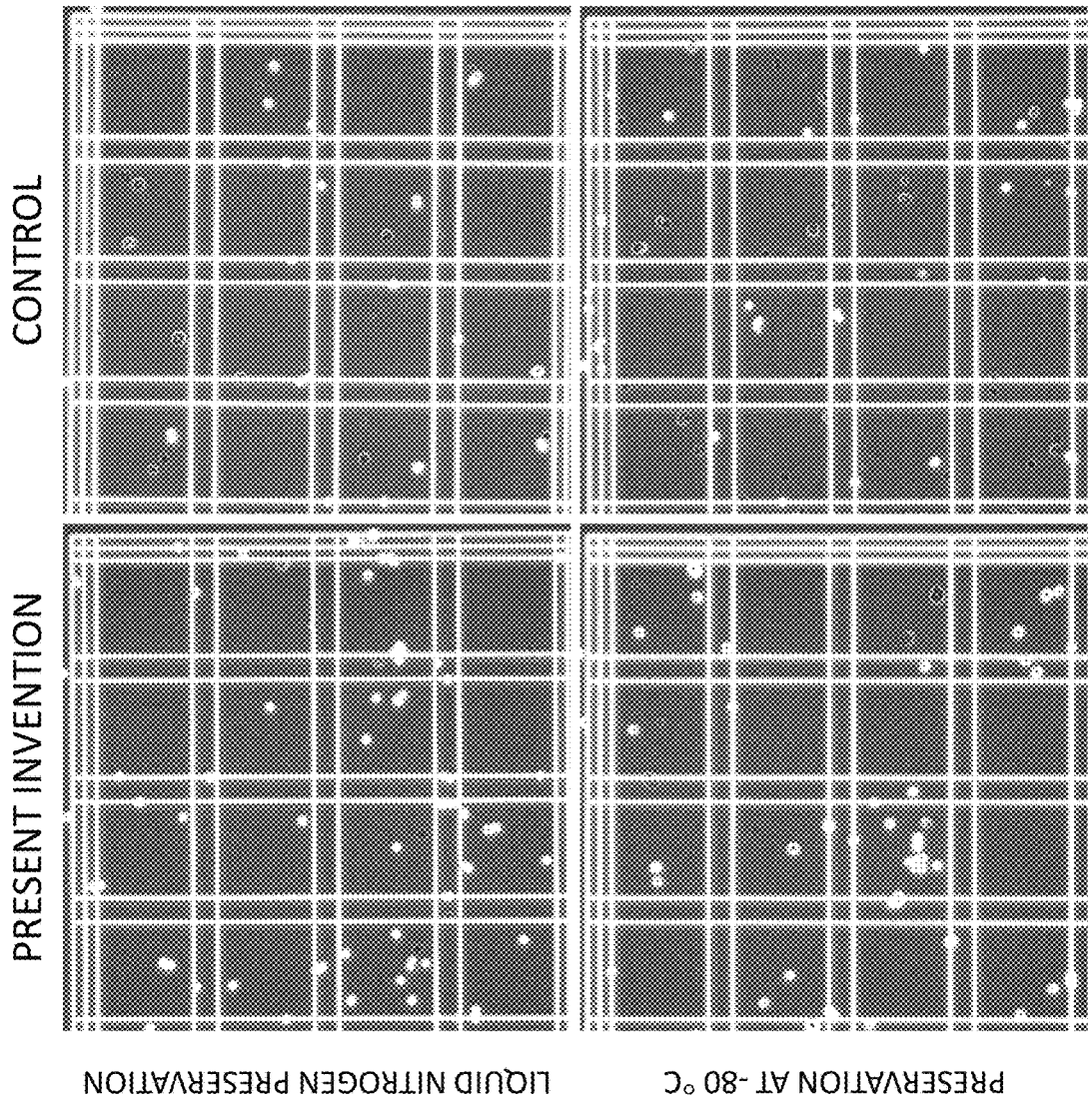
FIG. 7 contains photographic images showing results obtained when Trypan blue staining was performed on cells that had been cryopreserved in accordance with an example of the present disclosure.

10 µl of this suspended solution were then mixed with 10 µl of a 0.4% by mass solution of Trypan Blue (Sigma Aldrich Corp.), and the live cells and dead cells were measured respectively using a hemocytometer. The results are shown in FIG. 7 and in Table 1. In FIG. 7, cells that appear white represent live cells, while cells that have been dyed blue represent dead cells.

TABLE 1

|  | Present Disclosure | Control Example |
|---|---|---|
| Liquid Nitrogen Preservation | 94.5% | 66.4% |
| −80° C. Preservation | 89.4% | 53.1% |

(Conclusion)

From the results obtained from Example 3 it was verified that, when the cells were harvested on day 5 after seeding in a culture medium of the above-described Culturing Conditions 2 at a cell density of 400 cells/mm$^2$ and were cryopreserved, a high cell survival rate was maintained in spite of the cells having been cryopreserved. In contrast, in the Control Example in which cells were harvested after having been matured and differentiated in the same way (i.e., 136 days after having been cultured), and were preserved, it was found that the cell survival rate was greatly decreased. Moreover, in a case in which, using corneas derived from a 14-year-old male donor, cells were harvested on day 35 after being seeded for subculturing (i.e., Passage 5) and were then matured and differentiated using the same method, and were then cryopreserved, the survival rate of the cells after being thawed was at the same level as in the Control Example shown in Table 1, namely, 49.5% when preserved in liquid nitrogen, and 63% when preserved at −80° C.

Example 4: Evaluation of Cells Recovered after being Cryopreserved

In Example 4, whether or not the percentage content of functional human corneal endothelial cells was maintained at a high level in a cell population obtained by thawing and recovering the cells cryopreserved in Example 3 was examined (Verification of Cell Morphology by Phase-Contrast Microscopic Imaging)

380 ml of a cell suspension solution obtained by cryopreserving cells (of Passage 3) derived from the same donor as in Example 3 and using the same method were thawed via the same method as in Example 3. The quantity of this cell suspension solution was then made up to 2 ml using the culture medium of Culturing Conditions 2, and the cell suspension solution was seeded on one well of a 6-well cell culturing plate that had been coated with type I collagen. The cell suspension solution was then cultured at 37° C. in a humidified atmosphere containing 5% v/v of $CO_2$. The culture medium was replaced twice a week with the same culture medium as that used in the above-described Culturing Conditions 2, and was periodically observed using a phase-contrast microscope. Changes over time that were observed in the cell morphology are shown in FIG. 8.

Figure 8:
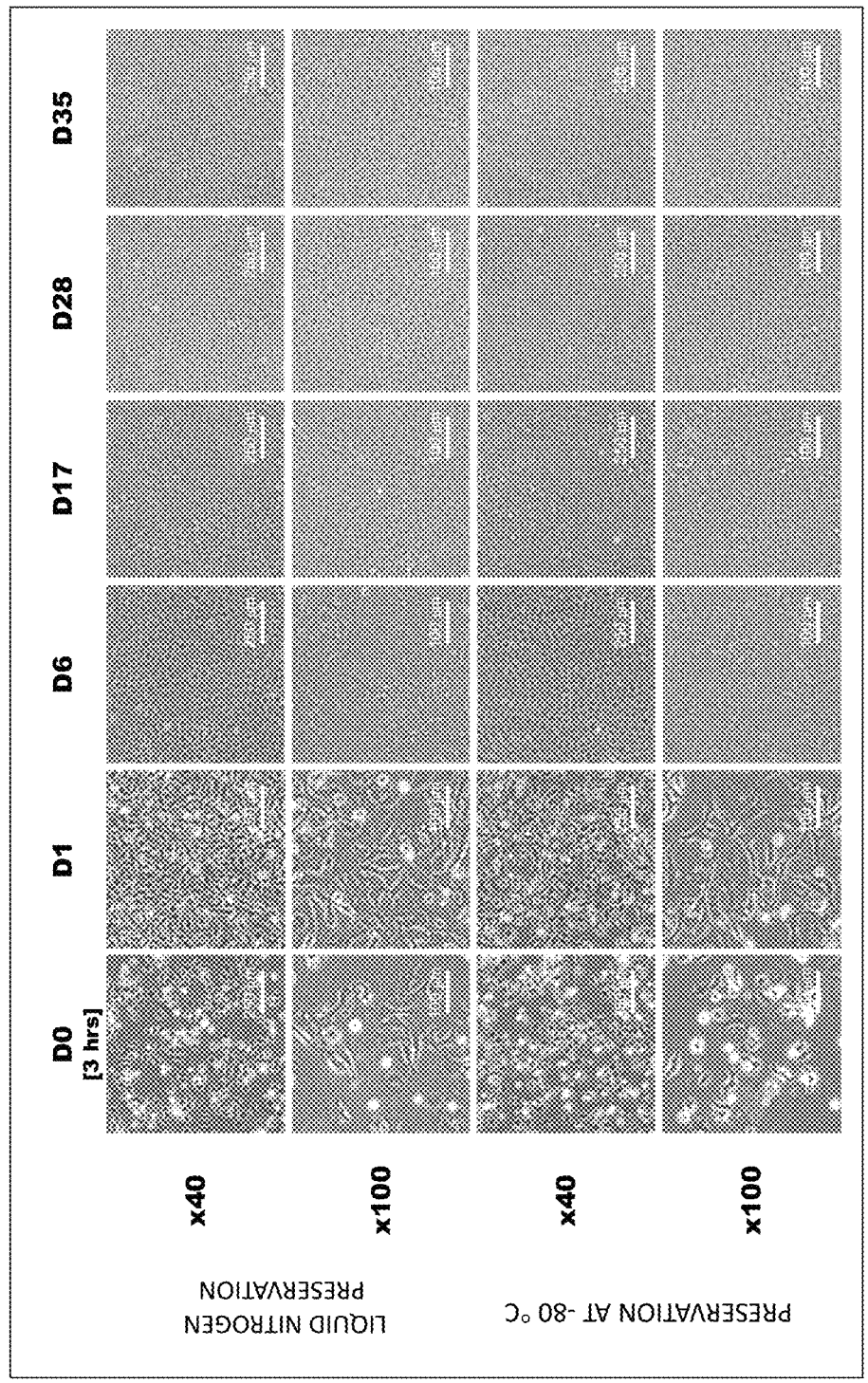
FIG. 8 contains phase-contrast microscopic images showing changes over time in the cell morphology of cultured human corneal endothelial cells that were cultured in Culturing Conditions 2 after having been cryopreserved.

From the results shown in FIG. 8 it can be seen that, after having been cryopreserved, the cells proliferated and had a tessellated shape (for example, a polygonal shape or an elliptical shape) of uniform size.

Figure 9:
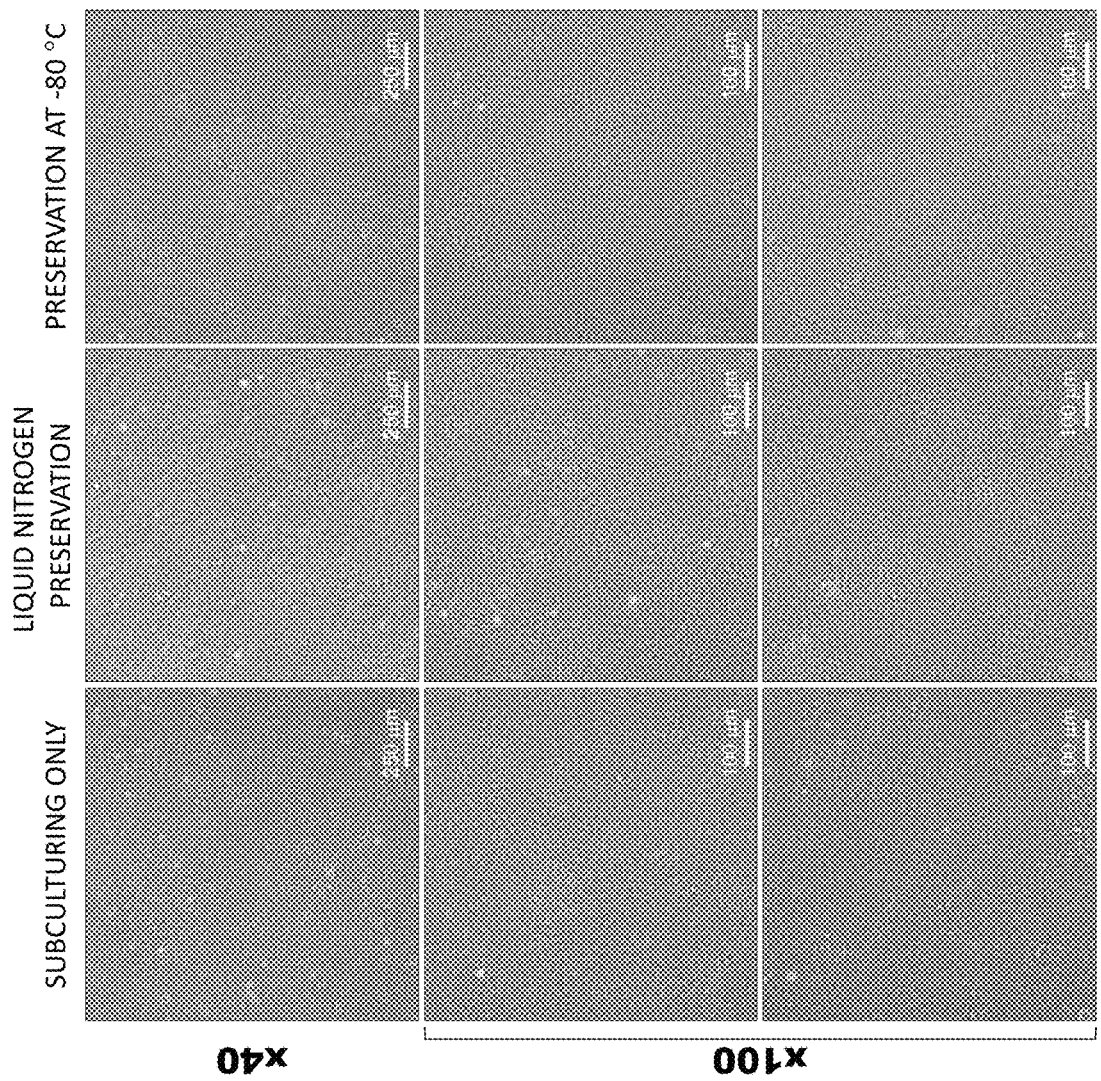
FIG. 9 contains phase-contrast microscopic images comparing morphologies of cryopreserved cells and of cells that were not cryopreserved but were continuously cultured.

Furthermore, the results obtained when a comparison was made using a phase-contrast microscope between cells cultured for 35 days in Example 3 without being cryopreserved, and cells that were not harvested on day 4 after seeding in Example 3, but continued to be cultured for 35 days while the culture medium continued to be replaced are shown in FIG. 9.

From the results shown in FIG. 9 it was verified that no difference in morphology was observed between the cryopreserved cells and the cells that were not cryopreserved but were continuously cultured.

(Verification of Surface Antigens: FACS Analysis)

Cells in Example 3 that were cultured for 35 days without being cryopreserved, and cells of the present example that were cultured for 35 days were harvested from the culturing plate using 10× TrypLE™ Select (from Thermo Fisher Scientific), and were suspended at a rate of 4×10$^6$ cells/ml in a FACS buffer (PBS+0.5% by mass of BSA+0.05% by mass of $NaN_3$). 20 µL of this cell suspension solution were then mixed with 20 mL of Antibody Solution 1 or Antibody Solution 2 (see below), and the resulting solution was incubated for 1.5~2 hours at 4° C. in light-shielded conditions.

The antibody solution that was used has the following composition. Note that antibodies whose manufacturer is not given were all obtained from BD Bioscience.

(Antibody Solution 1)

FITC-conjugated antihuman CD 90 mAb (4 jut), PE-conjugated antihuman CD66 mAb (4 jut), PerCP-Cy 5.5-conjugated antihuman CD 24 mAb (1 jut), PE-Cy 7-conjugated antihuman CD44 mAb (0.25 jut), and APC-conjugated antihuman CD105 (eBioscience 1 µL) were brought up to a quantity of 20 jut using a FACS buffer.

Figure 10:
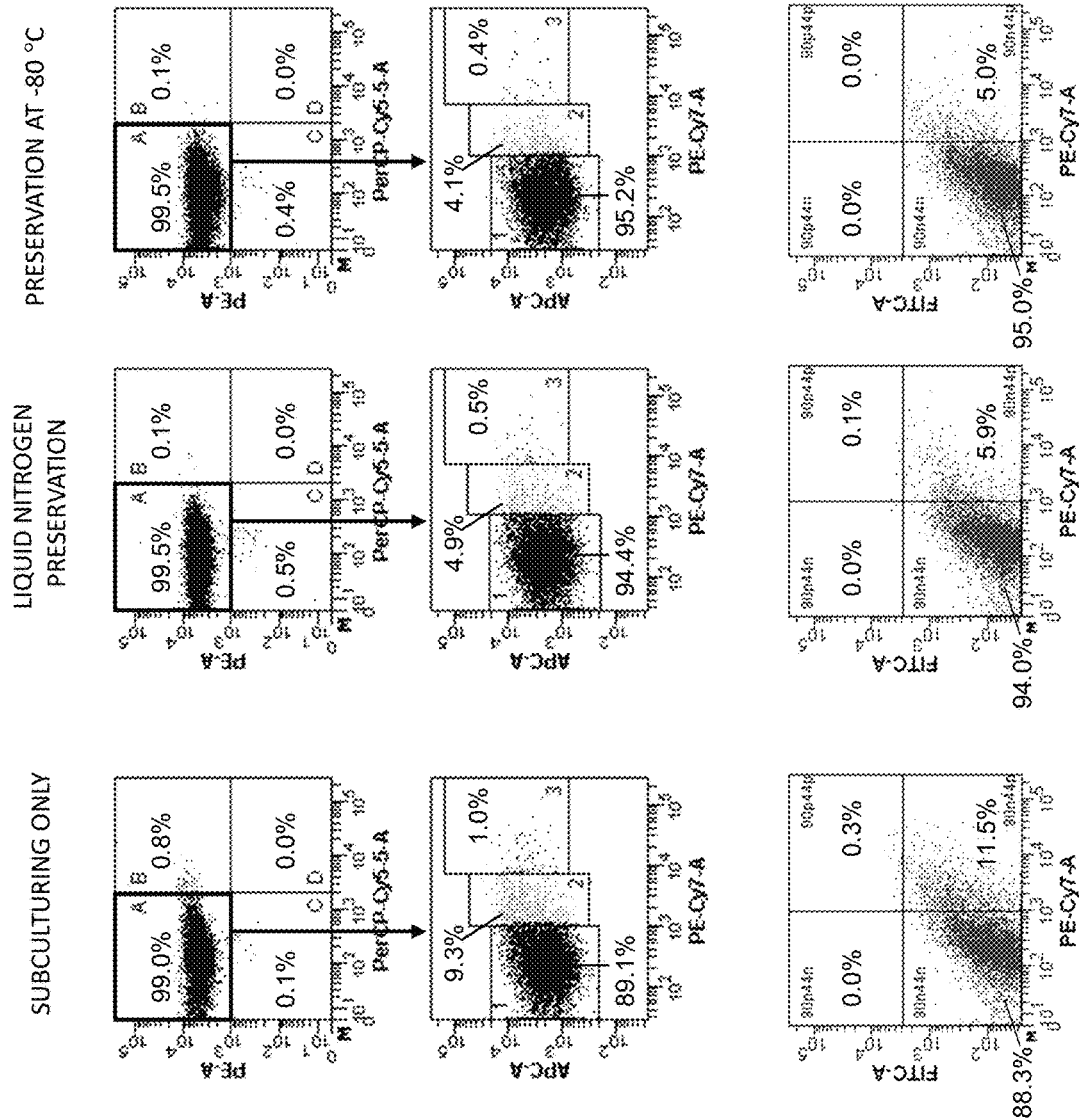
FIG. 10 contains graphs showing results of analyses of cell surface antigens of cryopreserved cells and cells that were not cryopreserved but were continuously cultured.

After the cells were washed in the FACS buffer, they were analyzed using a FACSCanto™ II (BD Biosciences, S/N=V33896101710). The results obtained are shown in FIG. 10. Note that the voltage setting values of each fluorescence of the FACSCanto™ II were as follows: FSC=270, SSC=380, FITC=290, PE=290, PerCP-Cy 5.5=410, PE-Cy 7=495, and APC=430. In addition, the Area Scaling Factor setting values were as follows: FSC=0.5, Blue Laser=0.75, and Red Laser=0.8.

From the results of the analysis of the surface antigens shown in FIG. 10, it was verified that no difference in the percentage content of effector cells, which show characteristics of CD166$^+$ CD24$^-$ CD44$^{neg\sim low}$ (gate 1), or of CD44$^{neg\sim low}$ CD90$^{neg\sim low}$ (i.e., the gate in the bottom row left-side panel), was observed between the cryopreserved cells and the cells that were not cryopreserved but were continuously cultured.

(Evaluation via Immunostaining: Cell immunostaining)

Cells that were cultured for 35 days in the present example were harvested using TrypLE™ Select (from Thermo Fisher Scientific), and were suspended in the Culturing Conditions 2 culture medium at a cell density of 400 cells/mm$^2$, and were seeded on a culturing plate that had been coated with type I collagen.

Figure 11:
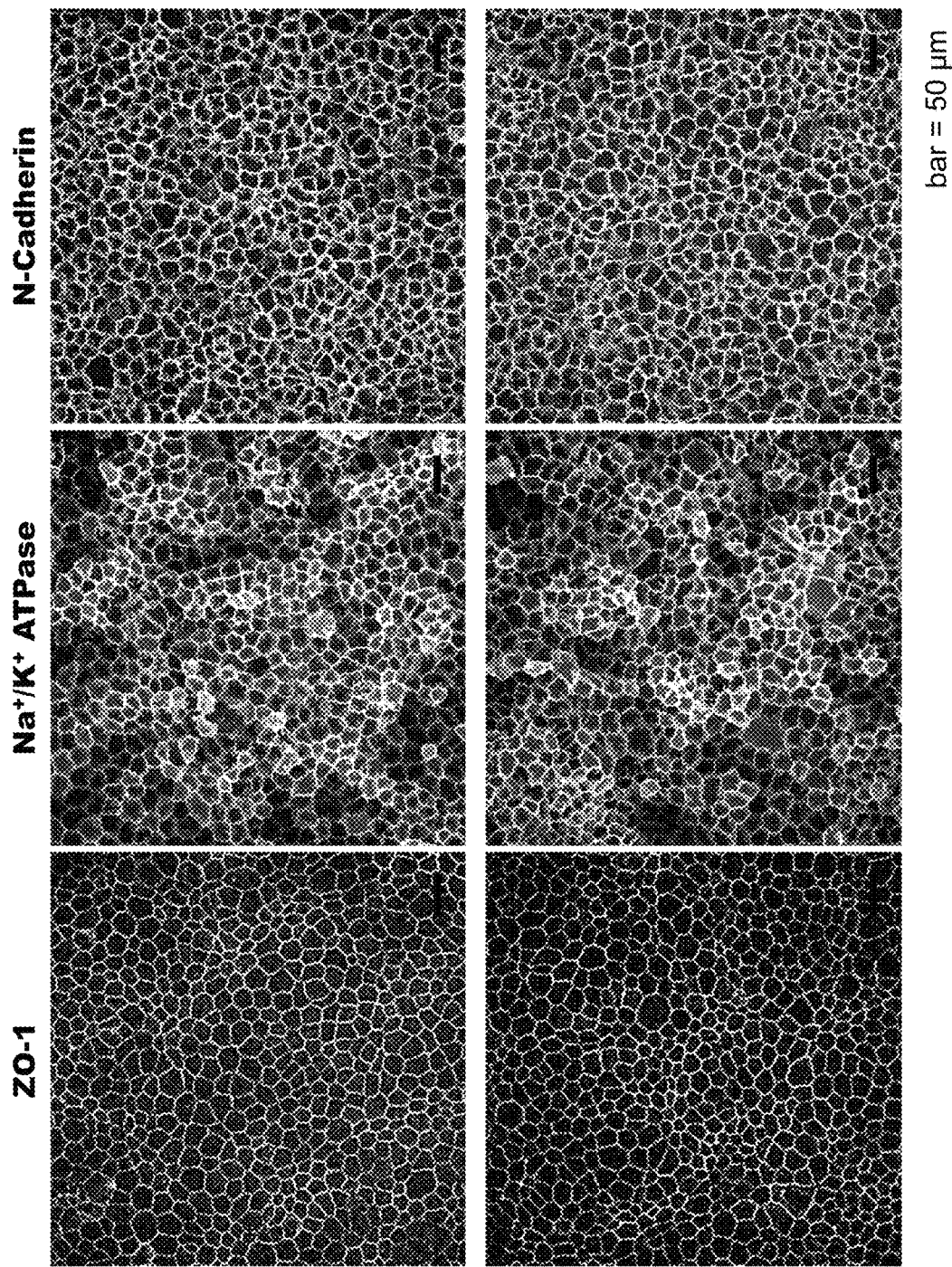
FIG. 11 contains fluorescence microscopic images in which expressions of $Na^+/K^+$ ATPase, ZO-1 and N-Cadherin were verified in cells that had been cryopreserved.

The cells were then cultured for 5 weeks with the culture medium being replaced with the same culture medium at a frequency of twice a week. Thereafter, immunostaining was performed using the same method as in Example 1. However, for the antibodies, mouse anti-Na$^+$/K$^+$ ATPase antibodies and rabbit anti-ZO-1 antibodies were used as the primary antibodies, while Alexa Fluor 488-conjugated anti-rabbit IgG antibodies and AlexaFluor 555-conjugated anti-mouse IgG antibodies were used as the secondary antibodies. The results obtained when these were observed using a fluorescence microscope are shown in FIG. 11.

From these results, it can be verified that, even in cells that had been cryopreserved, expressions of $Na^+/K^+$ ATPase and ZO-1, which are functional proteins of human corneal endothelial cells, are expressed normally when the cells are recovered after being thawed and are cultured.

(Conclusion)

From these results, it can be verified that, after being cryopreserved in Example 3, in the same way as cells that were not cryopreserved but continued to be cultured, the thawed and recovered cell population had a high percentage content of functional human corneal endothelial cells.

Example 5: Verification of Cryopreservation and Survival Rate when Another Culture Medium is Used In Example 5, the effect that the type of cell medium has on the survival rate after cryopreservation was examined.
(Materials Used in the Test)

Donor corneas from an 18-year-old male and from a 10-year-old male were used.

The culture medium that was used was Essential 6+8 percent by mass of FBS+50 μg/ml of gentamycin+10 μM of Y-27632.

Note that the Essential 6 culture medium has, as its base, a DMEM/F12 culture medium, which is widely used for cell culturing, and has additives such as ascorbic acid, insulin, transferrin, and selenium and the like, and the composition thereof is publicly available.
(Verification of Survival Rate After Cryopreservation)

The survival rate was examined via Trypan blue staining using the same procedure as that employed in the above-described Example 3. Results are shown in Table 2 below.

TABLE 2

|  | Survival rate | |
| --- | --- | --- |
|  | Donor 1 (18 Y) | Donor 2 (10 Y) |
| Liquid Nitrogen Preservation | 76.5% | 81.7% |
| −80° C. Preservation | 77.7% | 76.6% |

(Conclusion)

Because substantially the same survival rate as that obtained in Example 3 was observed, it can be verified that the effects of the present disclosure are demonstrated even in a case in which a different base culture medium is used.

Example 6: Optimization of Cell Harvesting Timing

In Example 6, investigations were conducted in order to optimize the cell harvesting timing when cryopreserving cells.

Example 6-a: Examination of Cell Harvesting Timing (Materials Used in the Test)

Donor corneas from a 41-year-old female were used.

The culture medium that was used was the same as that used in Culturing Conditions 2 of Example 1.
(Culturing and Cryopreservation)

The donor corneas obtained from a Seattle eye bank were cultured in the same conditions as in Example 2 until Passage 2. When the cells were subcultured to Passage 3, the cell suspension solution was divided into 5 flasks. The culturing of one flask was continued unchanged, while cells were harvested from the remaining 4 flasks on days 3, 7, 10, and 14 respectively from subculturing. The harvested cells were suspended at a cell density of 1,000,000 cells per 1 ml in CELLBANKER 1.

These cell suspension solutions were placed in an air layer portion of a liquid nitrogen tank, and were cryopreserved inside this liquid nitrogen tank.

On day 35 after subculturing, the cells of the first flask for which culturing had continued were subcultured on a 24-well plate that had been coated with type I collagen at a cell density of 400 cells/mm$^2$.

The cells that had been cryopreserved inside the liquid nitrogen tank were also subjected to a thawing operation on the same days respectively as the cells that had continued to be subcultured. For this thawing, an Astero Bio ThawSTAR Cell Transport and Automated Thawing System (model: CFT2) was used.

The cells that, after being thawed, had been washed in the culture medium of the above-described Culturing Conditions 2 were then seeded on a 24-well plate that had been coated with type I collagen at a cell density of 400 cells/mm$^2$.

Figure 12:
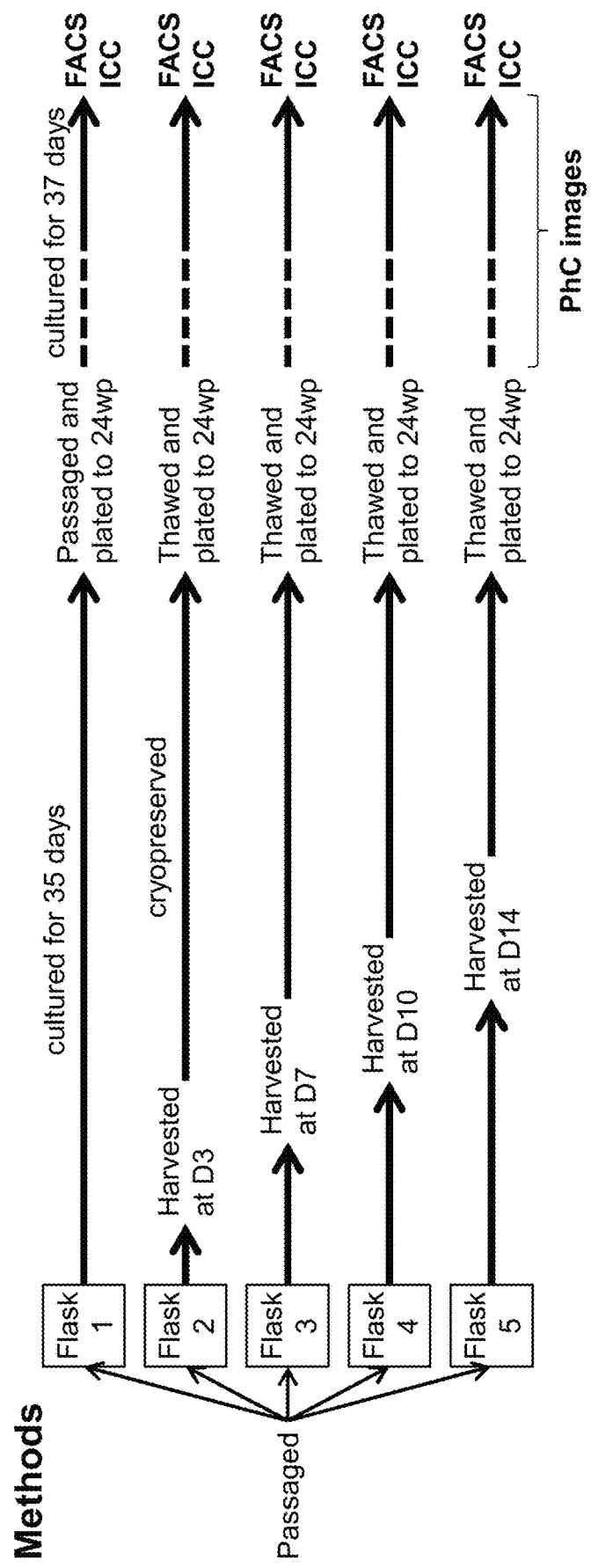
FIG. 12 illustrates a procedure for performing a comparative analysis of harvesting timings suitable for cell preservation.
Figure 13:
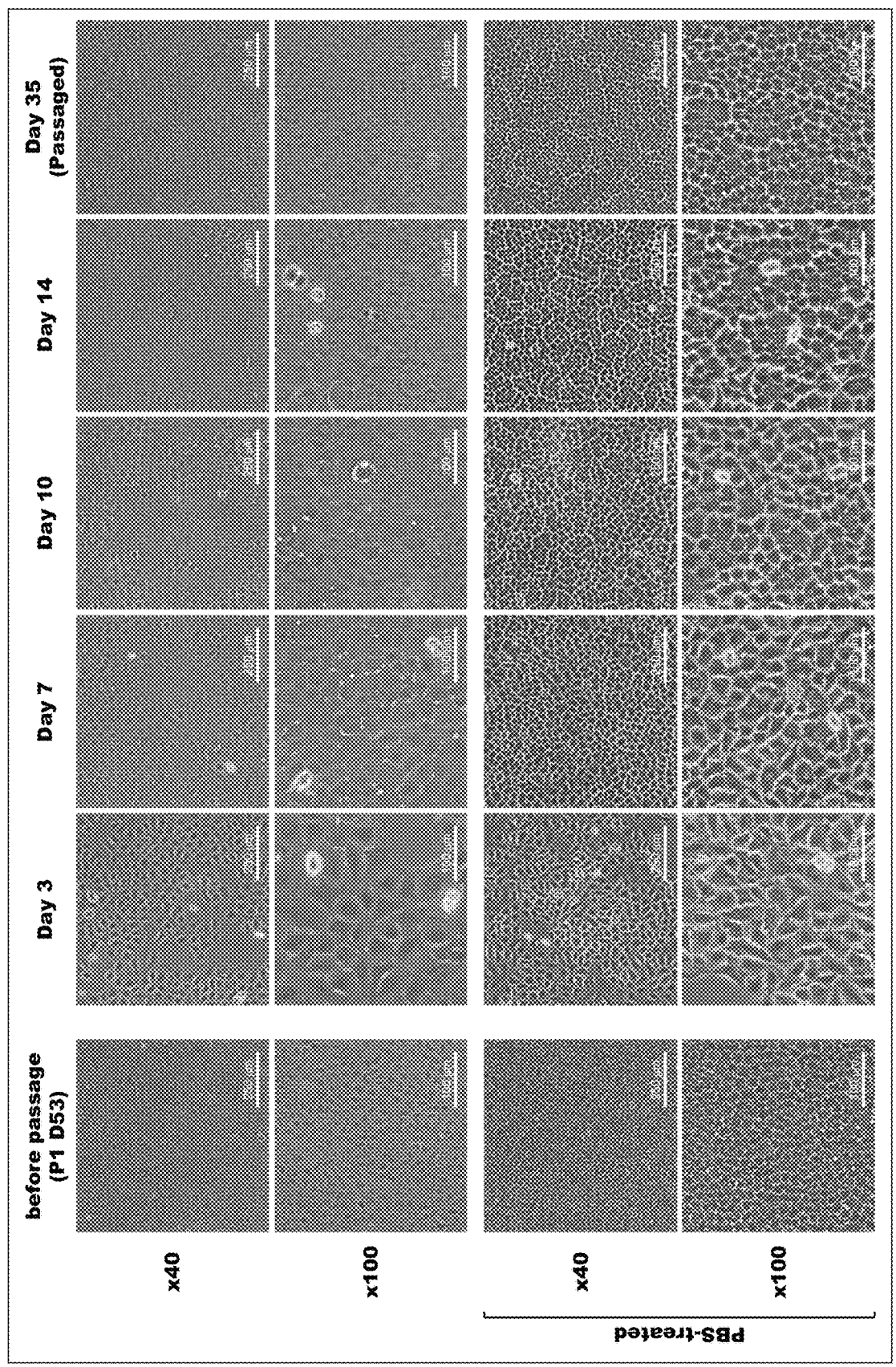
FIG. 13 contains phase-contrast microscopic images showing cell morphologies at each of the harvesting timings shown in FIG. 12.
Figure 14:
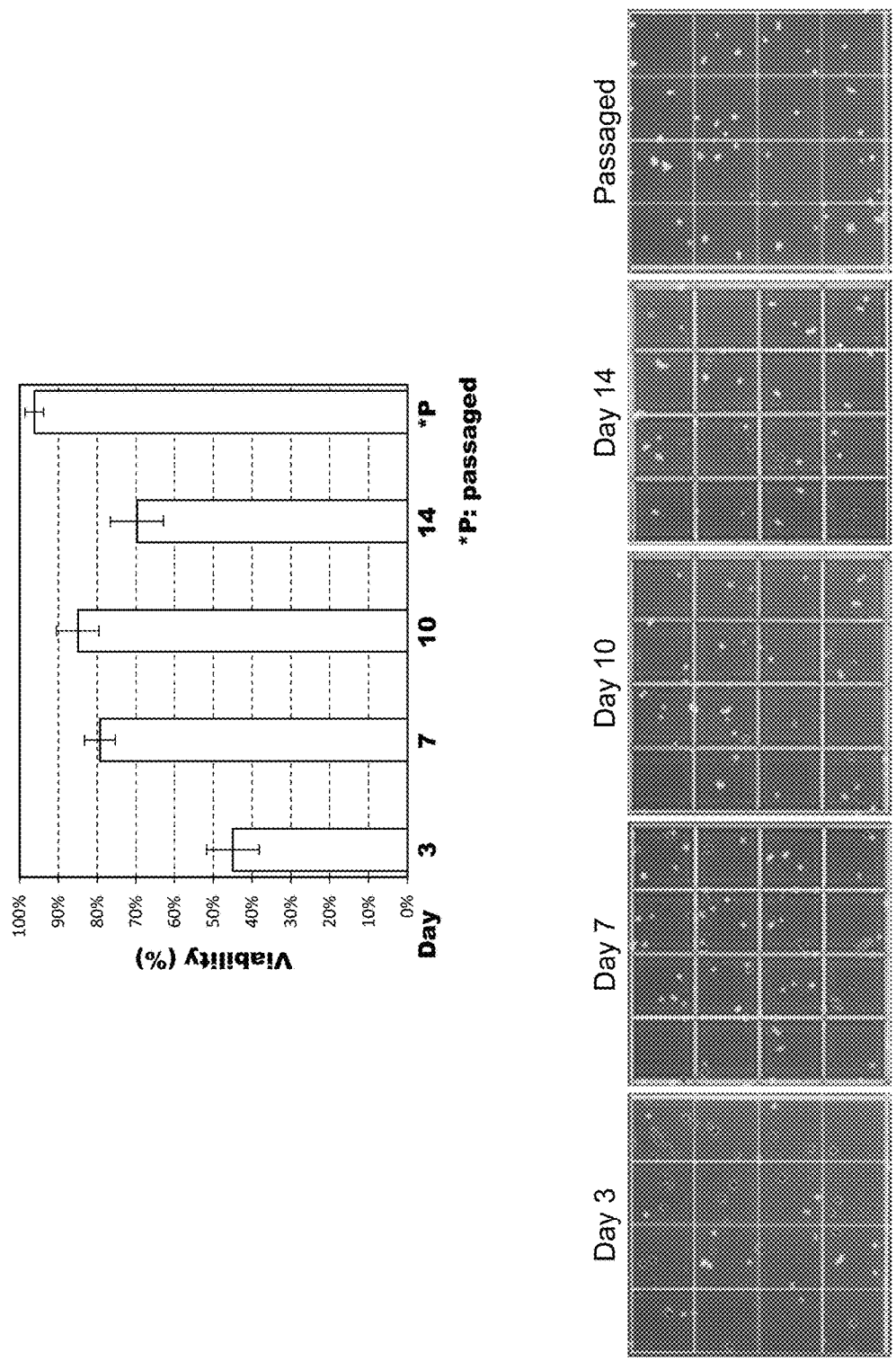
FIG. 14 contains graphs and photographic images showing survival rates of the cells after these had been cryopreserved at the respective harvesting timings.
Figure 15:
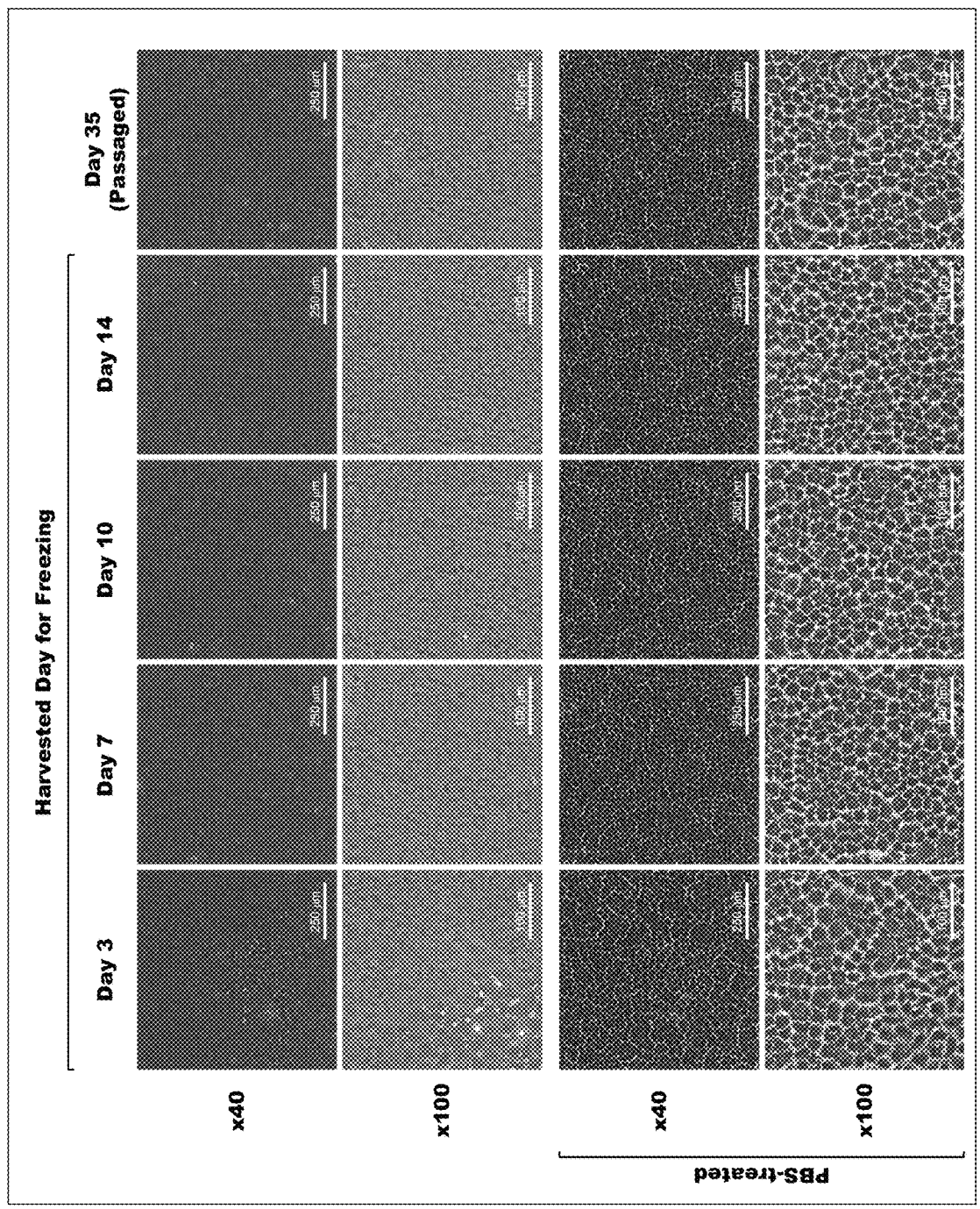
FIG. 15 contains phase-contrast microscopic images comparing morphologies of the cells shown in FIG. 14 that were thawed after having been cryopreserved and cultured for 35 days in Culturing Conditions 2, and of cells that were not cryopreserved but were continuously cultured.
Figure 16:
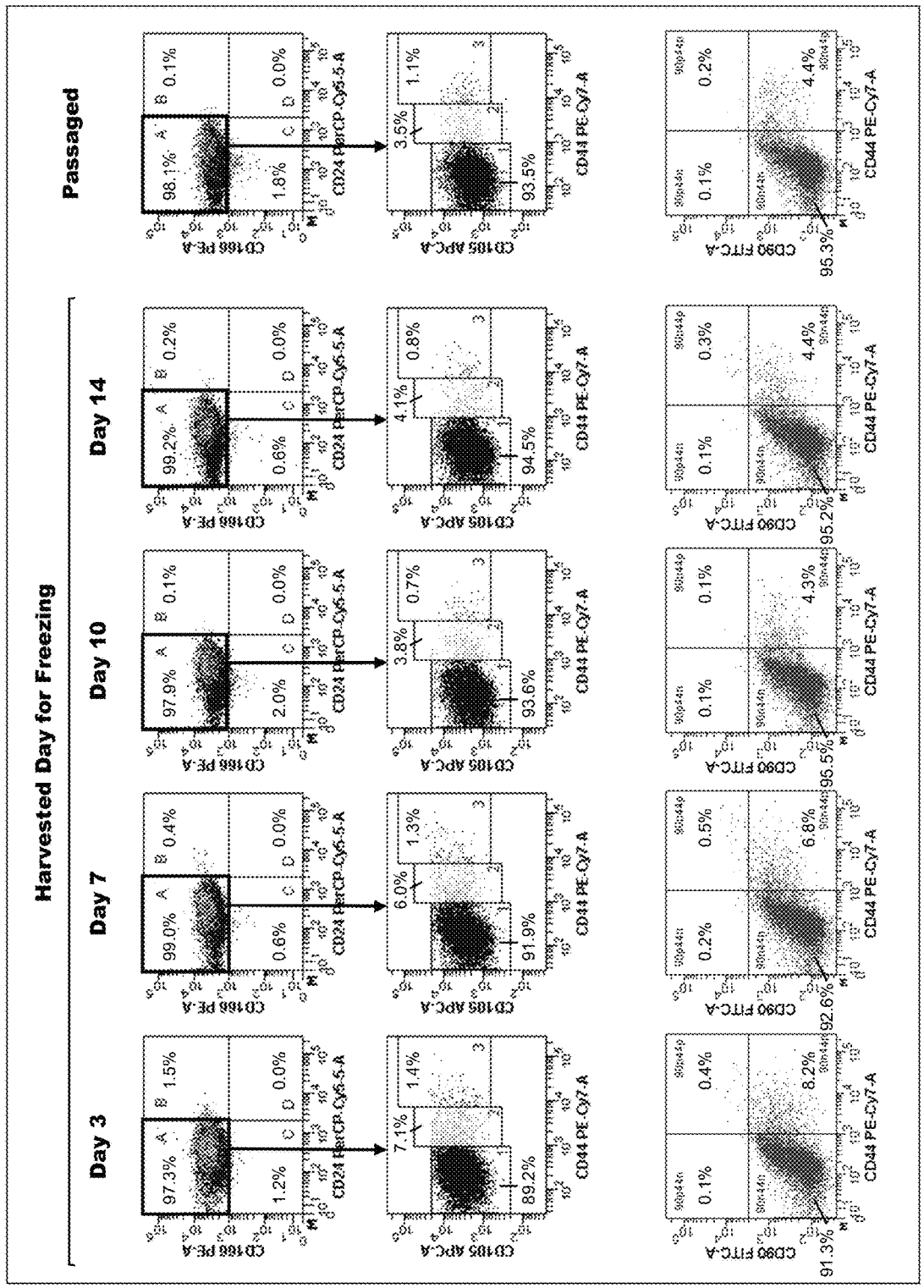
FIG. 16 contains graphs comparing surface antigens of the cells shown in FIG. 14 that were thawed after having been cryopreserved and cultured for 35 days in Culturing Conditions 2, and of cells that were not cryopreserved but were continuously cultured.
Figure 17:
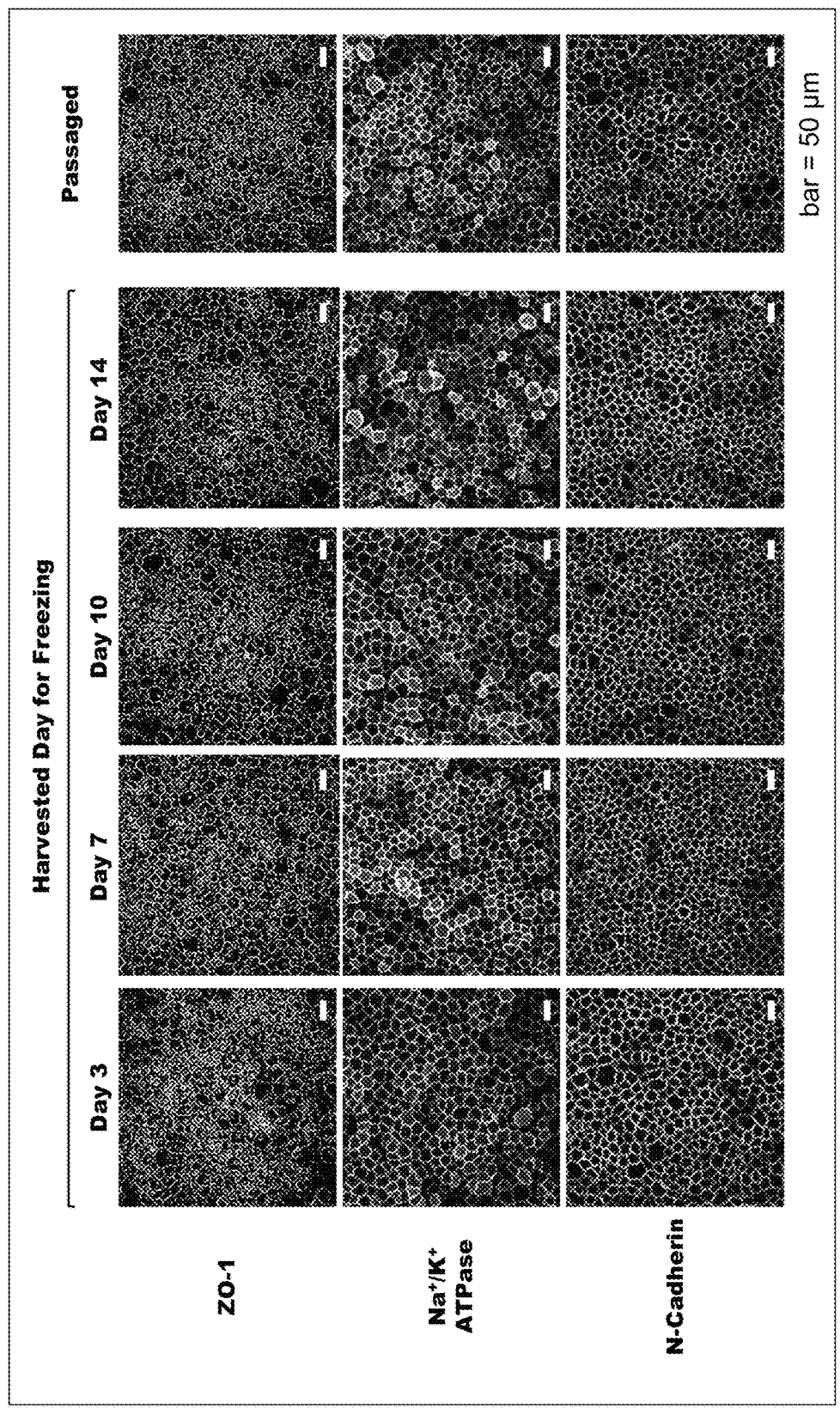
FIG. 17 contains photographic images comparing immunostaining results for the cells shown in FIG. 14 that were thawed after having been cryopreserved and cultured for 35 days in Culturing Conditions 2, and for cells that were not cryopreserved but were continuously cultured.

These cells were then cultured at 37° C. in a humidified atmosphere containing 5% v/v of $CO_2$. The culture medium was replaced at a frequency of twice a week. A comparative analysis was made of protein expressions using FACS analysis and cell immunostaining on day 35 from the seeding of the cells onto the 24-well plate. An outline of the procedure is shown in FIG. 12. Phase-contrast microscopic images of the cell morphology on the days that each cell lot was harvested in order to be cryopreserved are shown in FIG. 13. In addition, photographic images of the cell survival rate and Trypan blue staining results after the cryopreserved cells were thawed are shown in FIG. 14, and the phase-contrast microscopic images, and the results of the FACS analysis and cell immunostaining on day 37 after recovery and culturing are shown in FIG. 15 through FIG. 17. Note that the FACS analysis and the cell immunostaining were conducted using the same procedures as those described in Example 4.
(Conclusion)

From the results shown in FIG. 13 it can be seen that there are sizeable changes in both the cell size and morphology by day 14 after seeding for subculturing. Moreover, because the cells on day 14 have a similar shape to that of the functional human corneal endothelial cells on day 35, it can be conjectured that the cells are at a differentiation stage by this time.

From the results shown in FIG. 14, it can be seen that the survival rate of cells that were harvested and cryopreserved on day 3 after subculturing dropped below 50% after these cells were thawed and harvested, however, the survival rate of cells that were harvested and cryopreserved on day 14 was higher than this at approximately 70%, while the survival rate of cells that were harvested and cryopreserved on day 7 to 10 was even higher still. As a consequence, it can be verified that the survival rate varies considerably depending on the harvesting timing after subculturing.

Moreover, from the results shown in FIG. 15 through FIG. 17, it can be seen that the cells that were harvested and cryopreserved on day 7, 10, or 14, and were recovered and cultivated after being thawed, provided a cell population containing functional human corneal endothelial cells in an equivalent proportion to cells that were cultivated without having been cryopreserved.

From these results, it was found that, in order to obtain a cell population that has a high survival rate after being cryopreserved, and that by being recovered and cultivated after being thawed, contains functional human corneal endothelial cells in an equivalent proportion to cells that are cultivated without having been cryopreserved, it is preferable that the cells be harvested and preserved within a period of not less than 4 and not more than 14 days after the most recent subculturing thereof.

Example 6-b: Optimization of Cell Harvesting Timing

This Example was conducted in order to achieve a further optimization of the cell harvesting timing that was discovered in Example 6-a.
(Materials Used in the Test)
Donor corneas from an 8-year-old male were used.
The culture medium that was used was the same as that used in Culturing Conditions 2 of Example 1.
(Culturing and Cryopreservation)
The donor corneas obtained from a Seattle eye bank were cultured in the same conditions as in Example 2 until Passage 4. When the cells were subcultured to Passage the cell suspension solution was divided into 5 flasks. Cells were harvested from each of the 5 flasks on days 6~10 respectively from subculturing. The harvested cells were suspended at a cell density of 1,000,000 cells per 1 ml in STEMCELL-BANKER, 10% DMSO/90% FBS, or BAMBANKER hRM (only on day 8).

These cell suspension solutions were placed in an air layer portion of a liquid nitrogen tank, and were cryopreserved inside this liquid nitrogen tank.

Thawing operations were performed 200 days after the harvesting and cryopreservation on day 10 (204 days in the case of the cells that were harvested at day 6 and cryopreserved). This thawing was conducted using a warm water bath at 37° C.

After being thawed, the cells, which had been washed in the culture medium of Culturing Conditions 2, were then seeded on a 24-well plate that had been coated with type I collagen at a cell density of 400 cells/mm$^2$.

Figure 18:
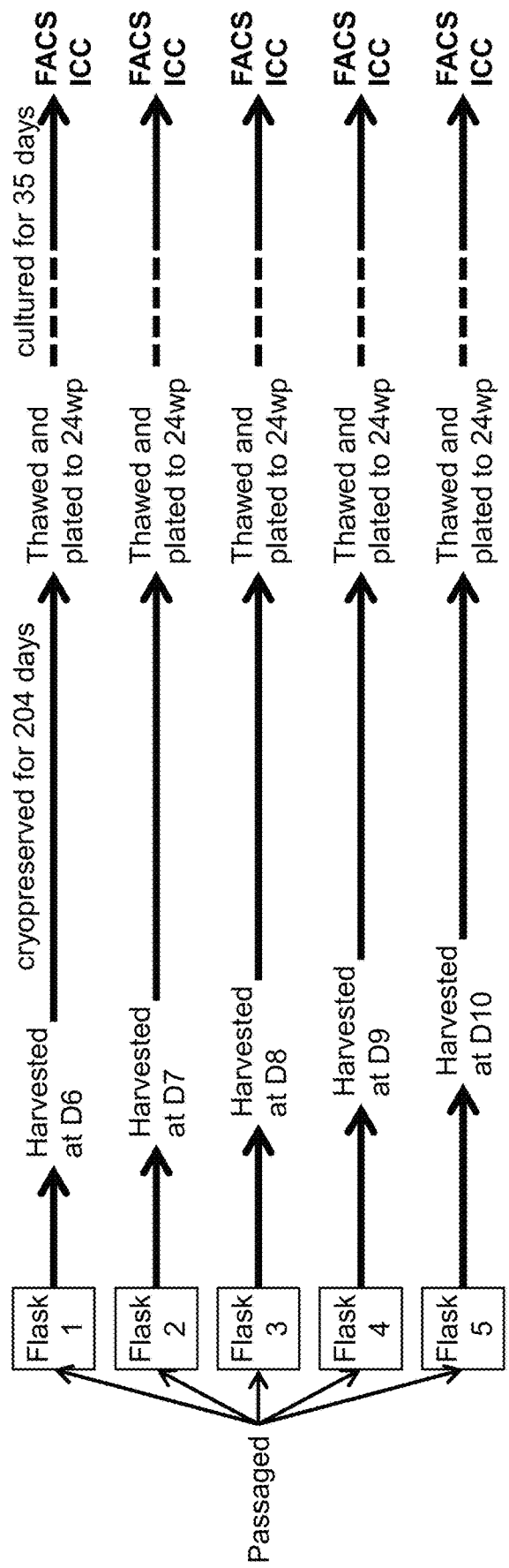
FIG. 18 illustrates a procedure for performing comparative analysis of harvesting timings suitable for cell preservation.
Figure 19:
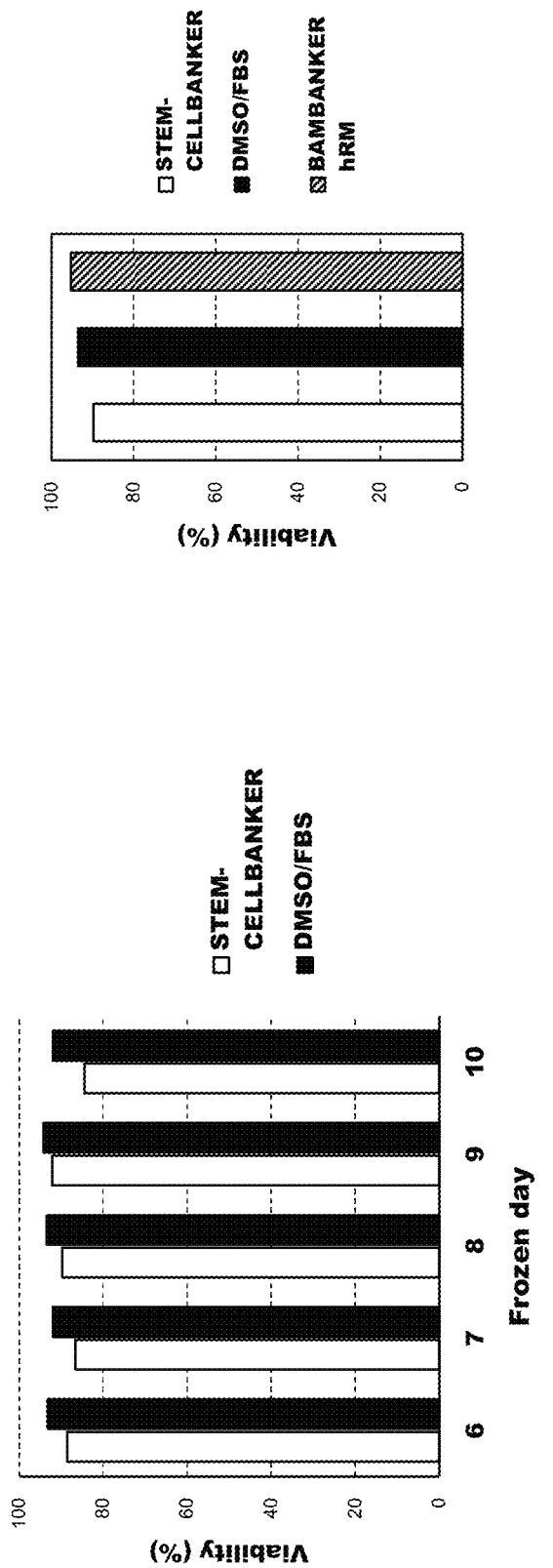
FIG. 19 contains graphs showing survival rates of cells after these had been harvested at the respective harvesting timings shown in FIG. 18 and cryopreserved.
Figure 20:
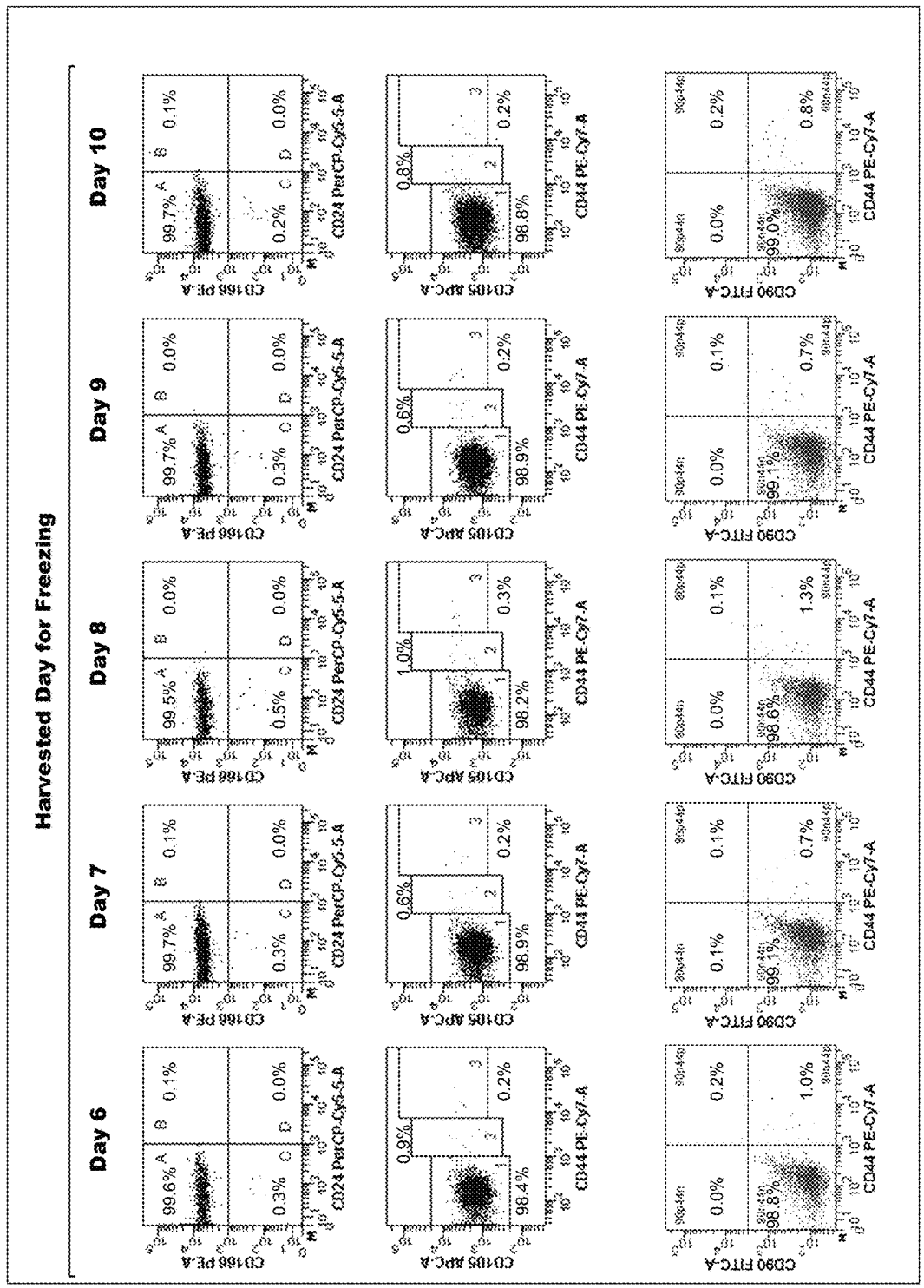
FIG. 20 contains graphs showing states of expressions of cell surface antigens and the like of cells after these had been harvested at the respective harvesting timings shown in FIG. 18 and cryopreserved.
Figure 21:
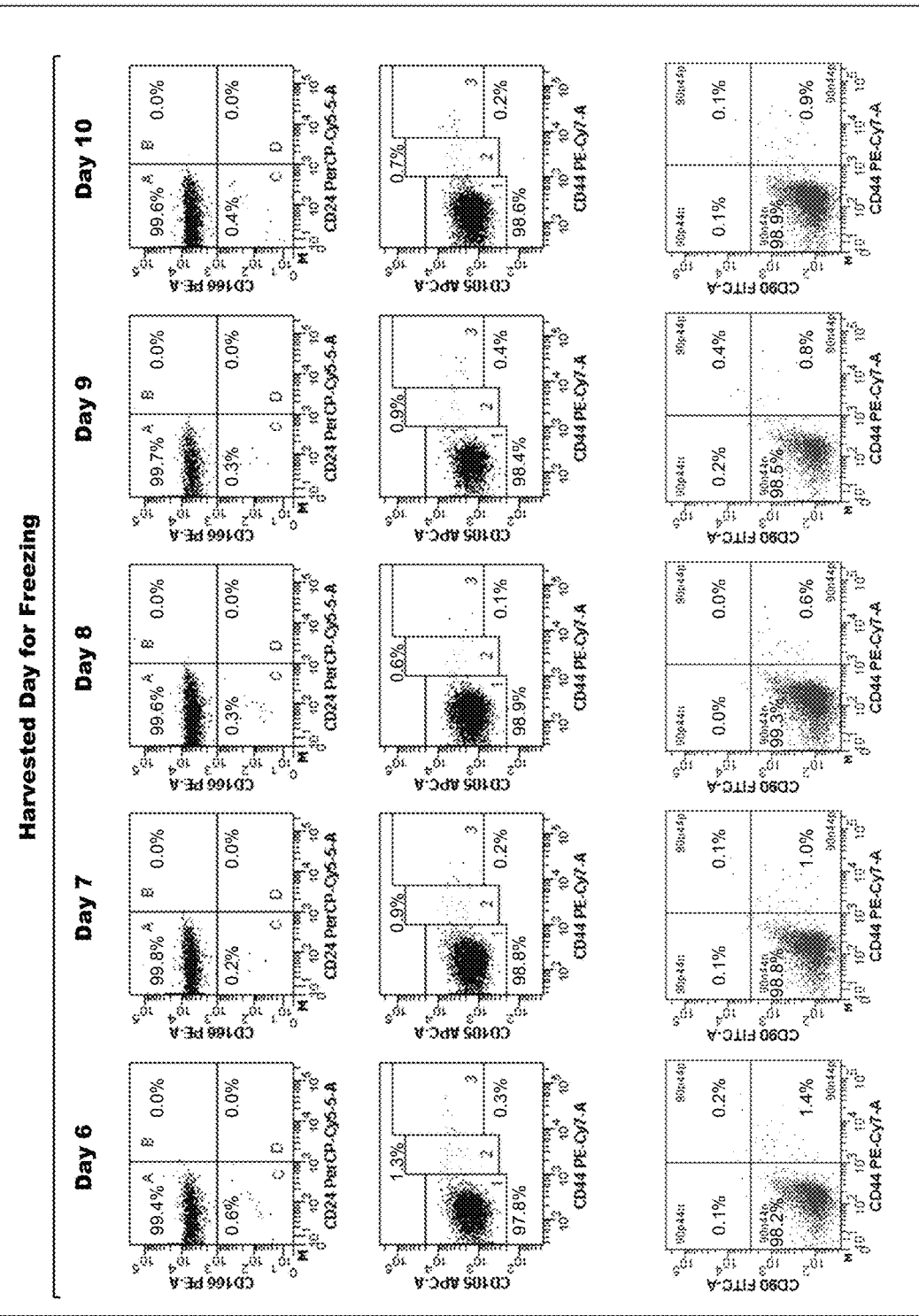
FIG. 21 contains graphs showing states of expressions of cell surface antigens and the like of cells after these had been harvested at the respective harvesting timings shown in FIG. 18 and cryopreserved.
Figure 22:
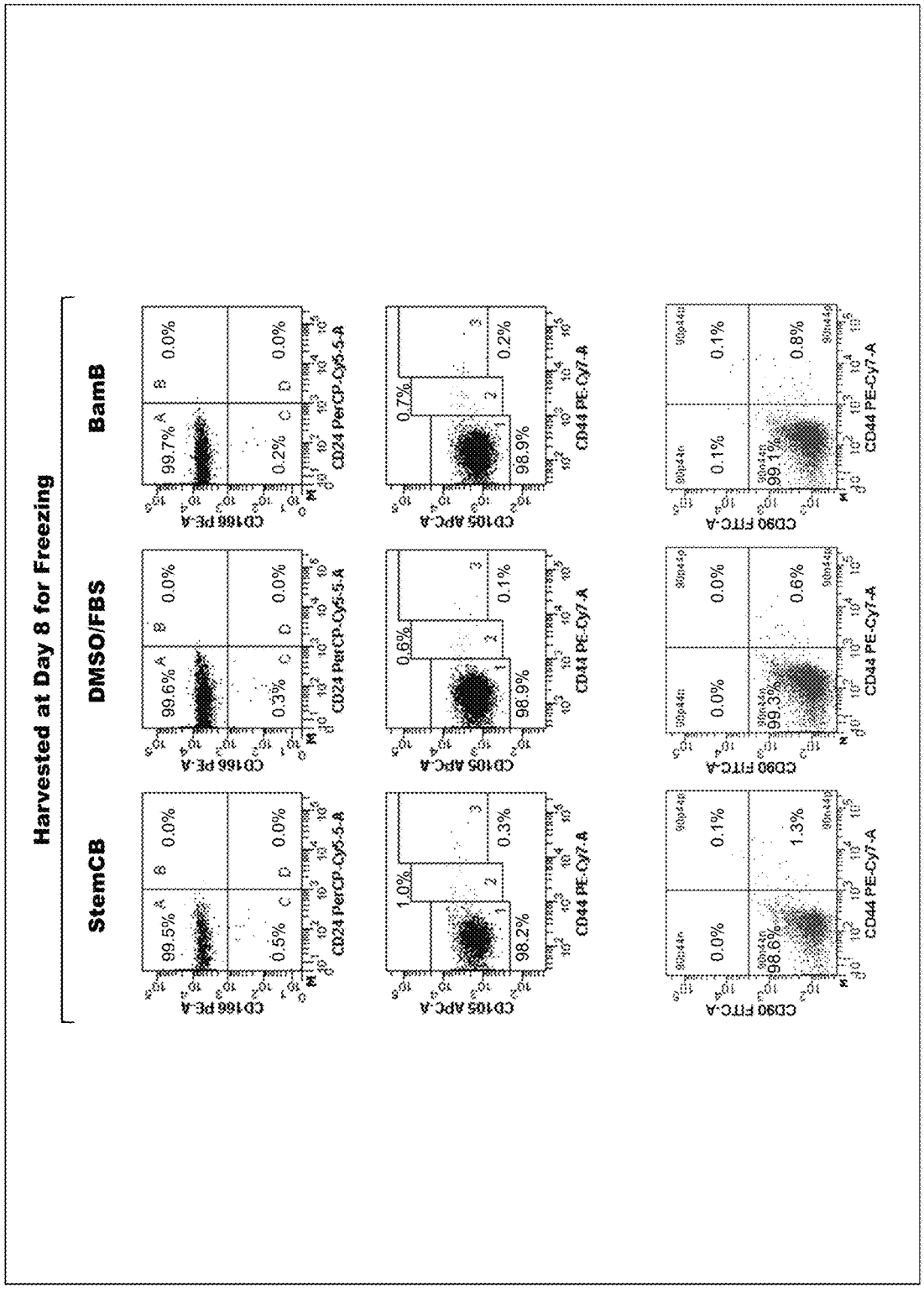
FIG. 22 contains graphs showing states of expressions of cell surface antigens and the like of cells after these had been harvested at the respective harvesting timings shown in FIG. 18 and cryopreserved.
Figure 23:
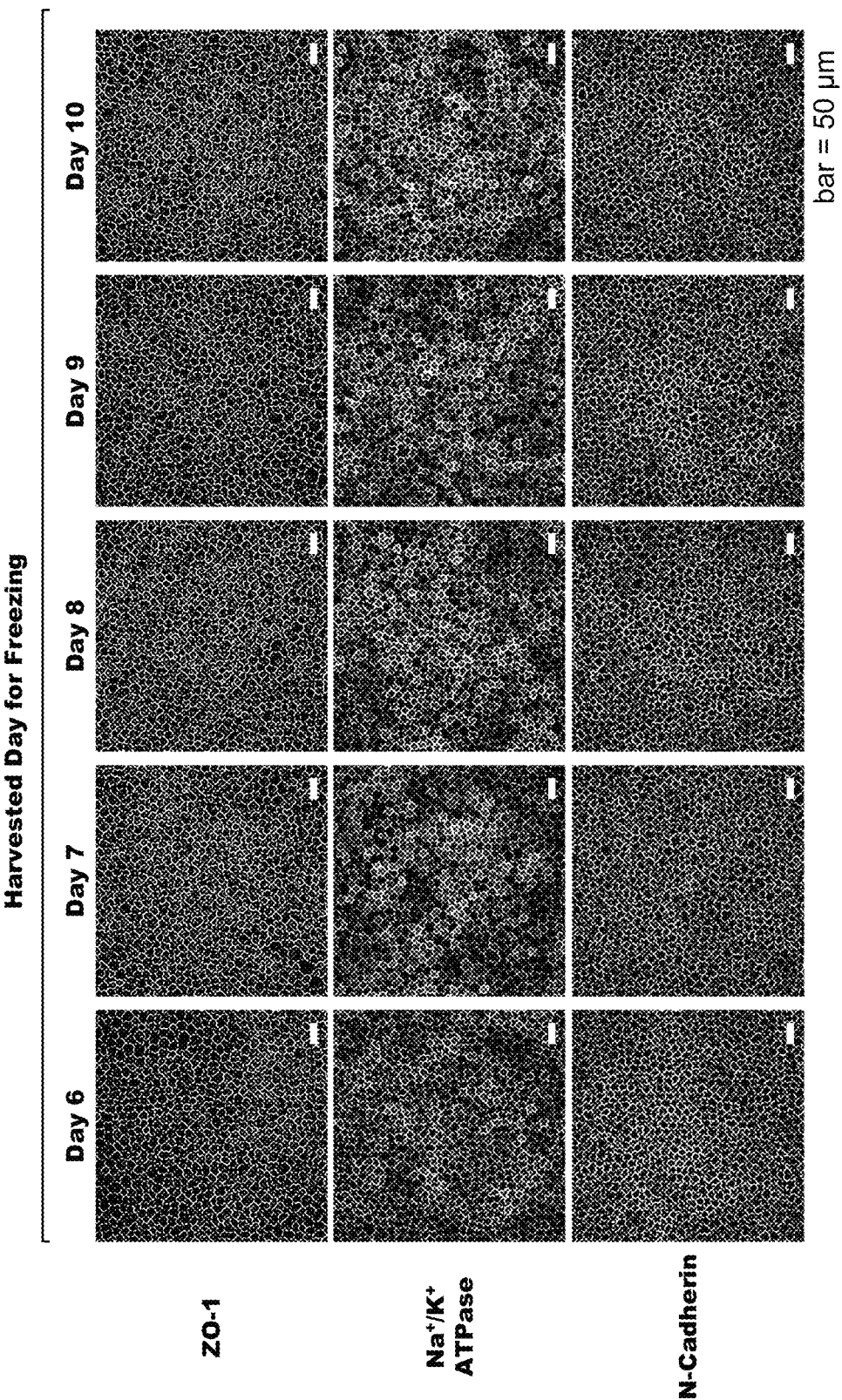
FIG. 23 contains fluorescence microscopic images in which expressions of $Na^+/K^+$ ATPase, ZO-1 and N-Cadherin were verified in cells after these had been harvested at the respective harvesting timings shown in FIG. 18 and cryopreserved.
Figure 24:
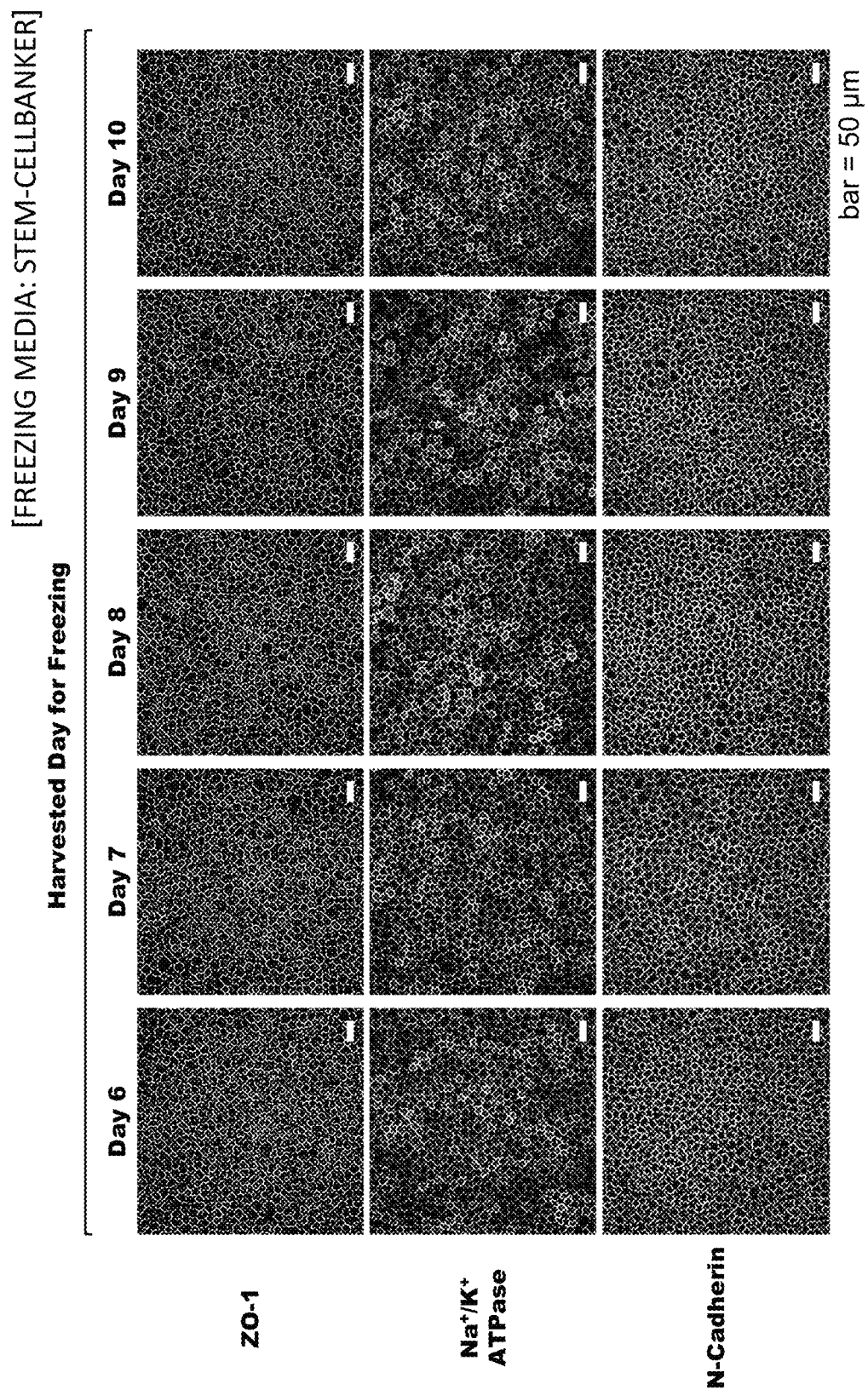
FIG. 24 contains fluorescence microscopic images in which expressions of $Na^+/K^+$ ATPase, ZO-1 and N-Cadherin were verified in cells after these had been harvested at the respective harvesting timings shown in FIG. 18 and cryopreserved.
Figure 25:
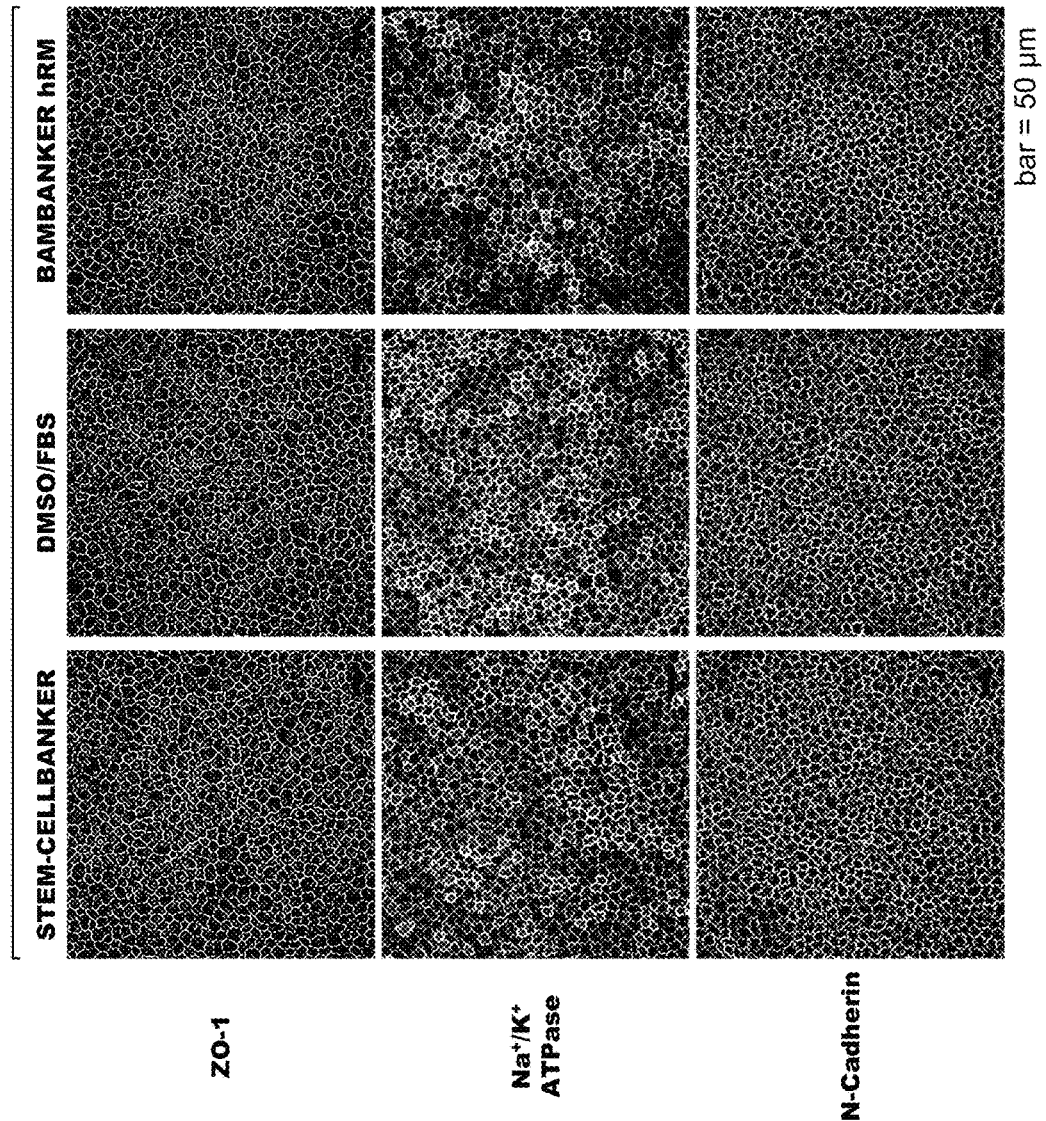
FIG. 25 contains fluorescence microscopic images in which expressions of $Na^+/K^+$ ATPase, ZO-1 and N-Cadherin were verified in cells after these had been harvested at the respective harvesting timings shown in FIG. 18 and cryopreserved.

These cells were then cultured at 37° C. in a humidified atmosphere containing 5% v/v of $CO_2$. The culture medium was replaced at a frequency of twice a week. A comparative analysis was made of protein expressions using FACS analysis and cell immunostaining on day 35 after seeding of the cells onto the 24-well plate. An outline of the procedure is shown in FIG. 18. Survival rates after thawing of the cryopreserved cells are shown in FIG. 19. In addition, the results of the FACS analysis and cell immunostaining on day 35 after recovery and culturing are shown in FIG. 20 through FIG. 25. The survival rates were verified via the same Trypan blue dyeing process as that employed in the other examples. Note that the FACS analysis and the cell immunostaining were conducted using the same procedures as those described in Example 4. The bar graph on the right side in FIG. 19 shows the respective survival rates for the cells harvested on day 8 in cases in which STEMCELL-BANKER, 10% DMSO/90% FBS, or BAMBANKER hRM respectively was used as the cryopreservation solution.
(Conclusion)
From the results shown in FIG. 19, it was found that cells that were harvested and cryopreserved between not less than 6 and not more than 10 days after the most recent subculturing all exhibited a high survival rate in excess of 80% after thawing and recovery, and that harvesting cells during this period was more preferable. Moreover, from the graph shown on the right side in FIG. 19 it can be seen that if cells are harvested during the above-described period, then even in a case in which the type of cryopreservation solution is changed, a sufficiently high survival rate is still demonstrated.

In addition, from the results shown in FIG. 20 through FIG. 25 it was found that, in the case of cells that were harvested and cryopreserved during this period, by recovering and culturing these cells after they have been thawed, a cell population is obtained that maintains a high level of functional human corneal endothelial cells. Moreover, it was also verified that, even in a case in which the type of preservation solution is changed, there are no significant changes in the survival rate after preservation or in the percentage content of functional human corneal endothelial cells after recovery and culturing.

Example 7: Other Indices Showing the Cell Harvesting Timing

In Example 6, as the index for the cell harvesting timing, the number of days after seeding (subculturing) on a plate was investigated. In Example 7, by examining the characteristics of the cells at the timings specified in Example 6, other indices for specifying timings for harvesting human corneal endothelial cells and/or human corneal endothelial precursor cells were investigated.

Example 7-a: Concerning Indices Based on Cell Morphology (Materials Used in the Test)
Donor corneas from a 29-year-old male were used.
The culture medium that was used was the same as that used in Culturing Conditions 2 of Example 1.
(Cell Culturing and Observation of Cell Morphology)
Using donor cornea obtained from a Seattle eye bank, corneal endothelial cells were dissociated therefrom together with the Descemet's membrane and were processed for one evening at 37° C. using collagenase. Thereafter, the cells were suspended in the above-described culture medium, and were seeded on a 6-well plate that had been coated with type I collagen at a rate of one well per eye. These cells were then cultured until the fourth subculturing via the same procedure as that used in the above-described Example 2. The culture medium was replaced at a frequency of twice per week.

Figure 26:
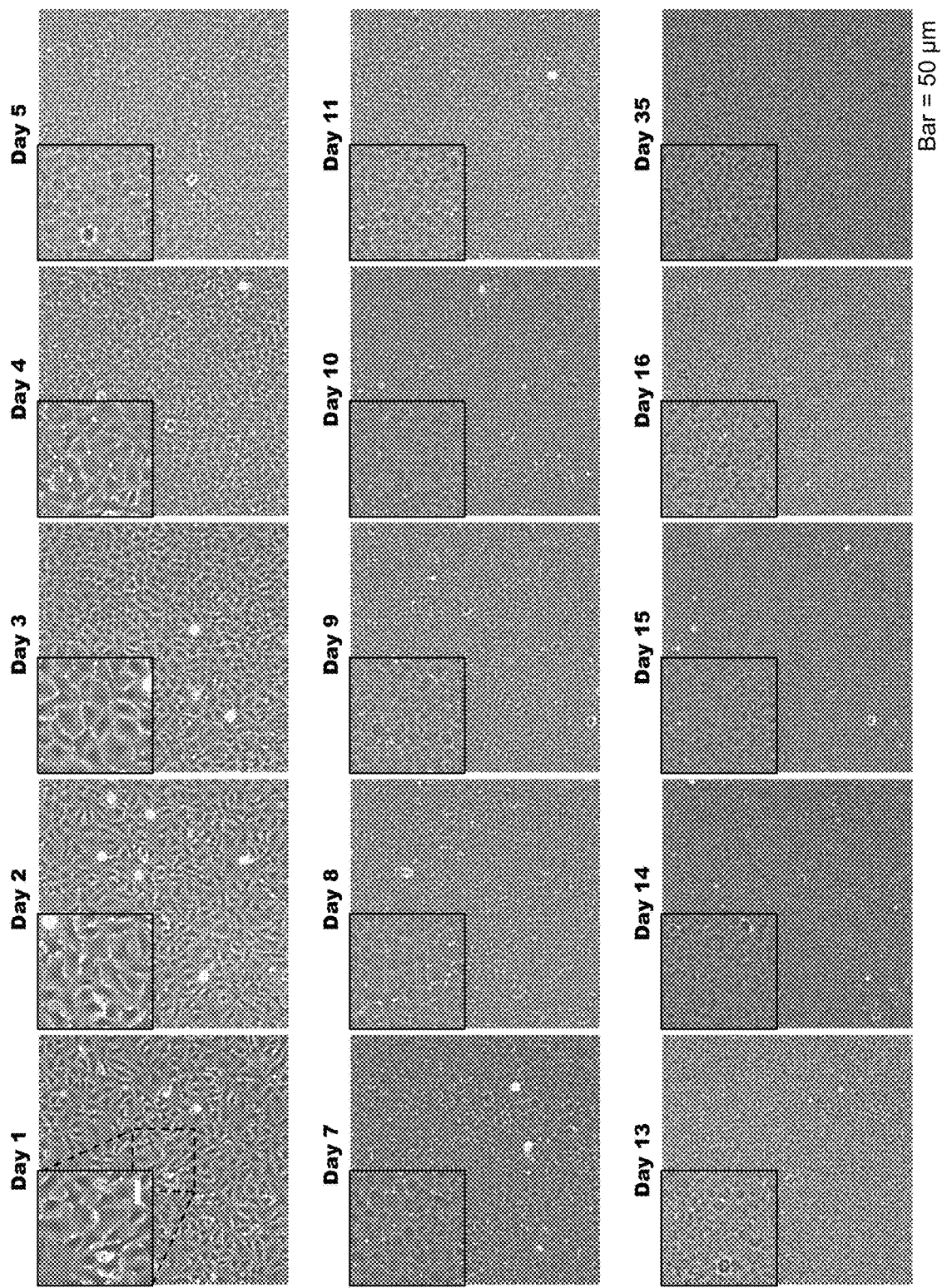
FIG. 26 contains phase-contrast microscopic images showing changes over time (in days) in the cell morphology in cells that were cultured in Culturing Conditions 2.
Figure 27:
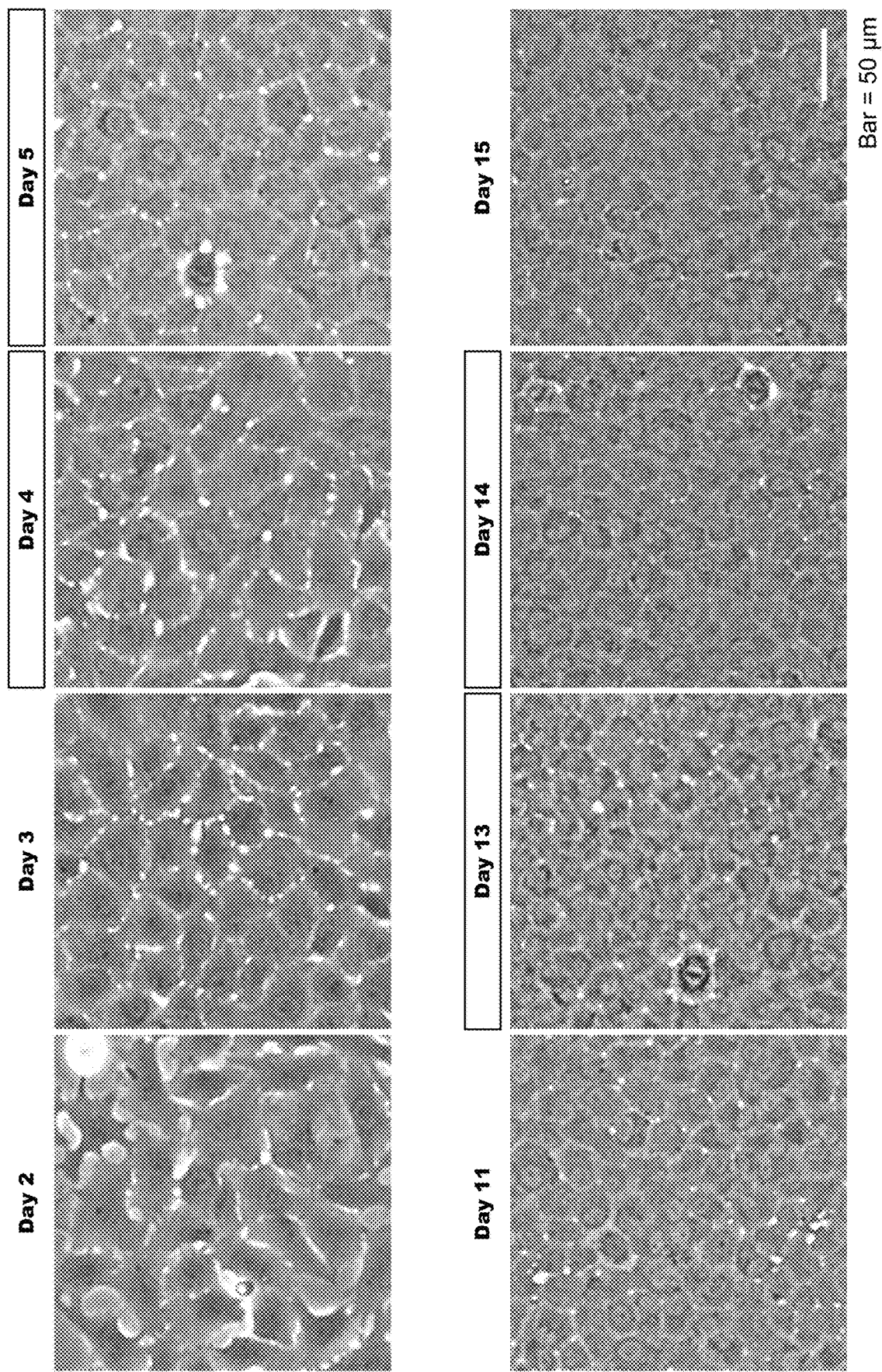
FIG. 27 contains phase-contrast microscopic images showing changes over time (in days) in the cell morphology in cells that were cultured in Culturing Conditions 2.

After being subcultured for the fifth subculturing, the cells were cultured in the same conditions, and images of the cell morphology on each day were acquired via a phase-contrast microscope. The results of this are shown in FIG. 26. In addition, in order to make the results even clearer, a portion of FIG. 26 is shown in enlargement in FIG. 27.
(Conclusion)
From the results shown in FIG. 26 and FIG. 27 it can be seen that, on days 1 and 2 after seeding from subculturing, the cells have a spindle fibroblast-like shape having irregular elongated projections, however, from day 3 onwards, the cell major axis and minor axis change to values that more closely approximate each other, and on day 5 the cells change to a shape whose major axis-minor axis ratio is close to 1, and that resembles what are known as tessellated (i.e., polygon-shaped or elliptically shaped) corneal endothelial cells present within a human body. This kind of sizeable morphology change can be seen until day 5 after seeding.

In two week after seeding, the size of the cells becomes uniform, and from three week onwards, there is a change from a state in which boundaries between individual cells is still distinct to a state in which the boundaries between the cells are indistinct, and it may be thought that intercellular adhesion is created so that the cells are in a mature stage in which they gradually become somewhat more concentrated.

From the observations described above it can be conjectured that, in the present culturing conditions, differentiation occurred until two week (i.e., day 14) after seeding, and thereafter the cells transitioned to a maturation process.

As a consequence of these results being checked against the results obtained in Example 6-a, the timing when it is possible to harvest the target human corneal endothelial cells and/or human corneal endothelial precursor cells can be defined as "a period lasting from immediately after the cell morphology has transitioned from a spindle fibroblast-like shape having irregular elongated projections to a shape having only minute projections and whose major axis-minor axis ratio is close to 1, and that resembles what are known as tessellated (i.e., polygonal shape or elliptical shape) corneal endothelial cells present within a human body, until immediately before intercellular adhesion is created so that the boundaries between the cells become indistinct".

Here, the number of days in Example 6-a is used as a guideline, however, it may be thought that, depending on the cell density during subculturing and on the culturing conditions and the like, there is a possibility that the number of culturing days required until the cells reach maturity may vary. In a case such as this as well, it may be thought that cells can be harvested at a suitable timing if the cells are harvested using the cell morphology obtained in this example as an index.

Example 7-b: Concerning a Harvesting Period Index Based on the CD44 Expression Level It is also possible for the cell harvesting timing to be verified based on the expression level of CD 44.

After being subcultured for the fifth subculturing of Example 7-a, the CD44 expression level on each day was measured using a flow cytometer for the cells that were cultured in the same conditions.
(Materials Used in the Test)

The same cells as those of Example 7-a were used.
The FACS buffer and antibody solution that were used were the same as those used in Example 4.
(Measurement of the Expression Level of CD44)

Figure 28:
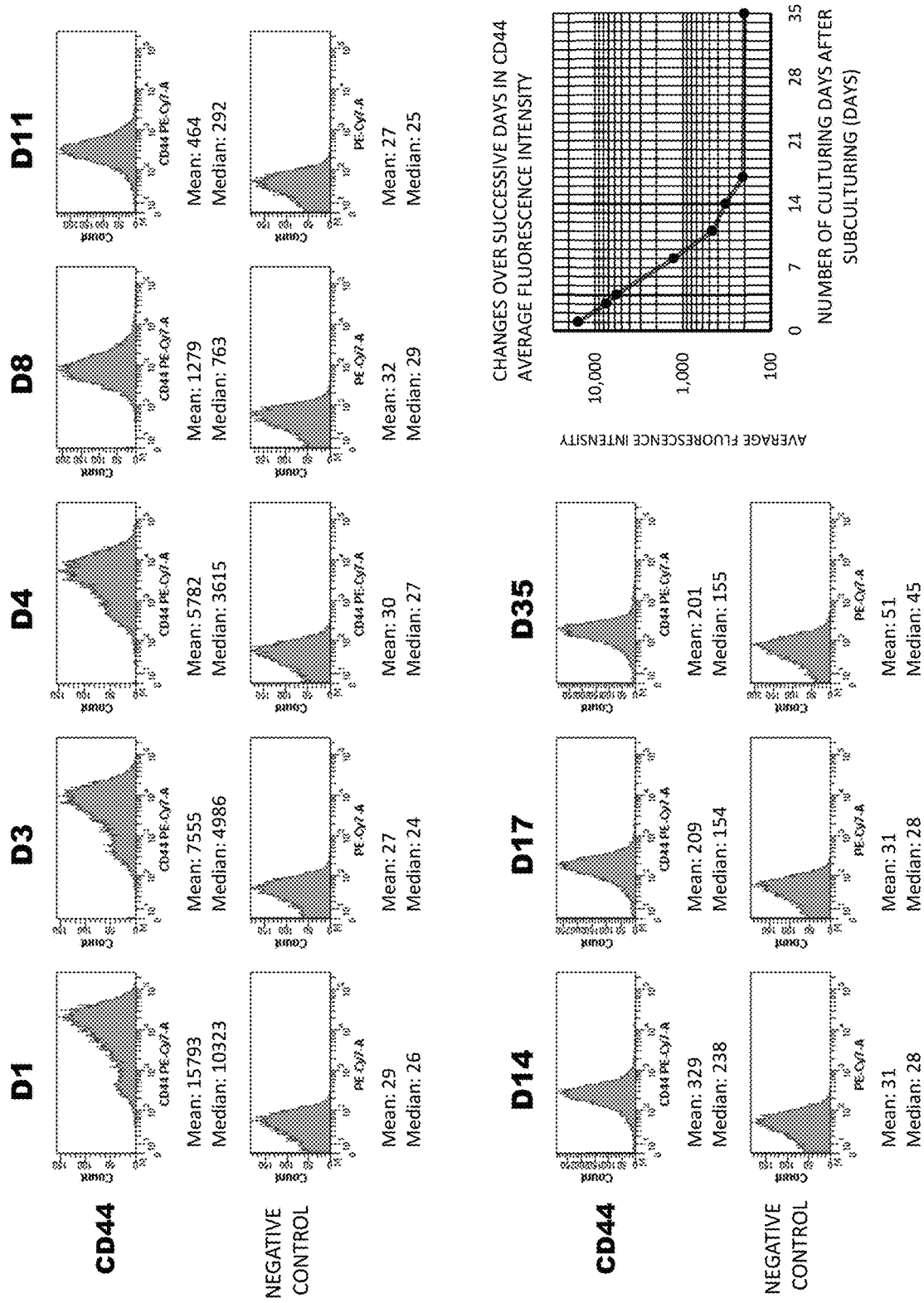
FIG. 28 is a graph showing changes in CD44 expression levels over time (in days) when cultured in Culturing Condition 2.

After being subcultured for the fifth subculturing of Example 7-a, cells that were cultured for a predetermined number of days in the same conditions were washed in PBS (−), and were then harvested from the culturing plate by being processed using 10× TrypLE™ Select (from Thermo Fisher Scientific). The cells were then suspended at a rate of $4 \times 10^6$ cells/ml in a FACS buffer. 20 µL of this cell suspension solution was then subjected to antibody staining via the same method as that employed in Example 4, and was then analyzed using a FACSCanto™ II (BD Biosciences). The results of this analysis are shown in FIG. 28.
(Results and Conclusion)

The average fluorescence intensity of the CD44 rose to 15000 or greater immediately after seeding (subculturing), and thereafter decreased logarithmically until day 11. On day 17, the intensity essentially plateaued, and it is thought that differentiation was completed approximately two weeks after subculturing and seeding, and that the cells had transitioned to a maturation process.

From the results obtained from Example 6-a and the results shown in FIG. 28, it can be thought that the timing when it is possible to harvest desired human corneal endothelial cells and/or human corneal endothelial precursor cells is during a period from when an expression level of CD44 becomes equal to or less than half a maximum value observed on the first or second day after subculturing until this expression level reaches a plateau.

Here, the number of days in Example 6-a is used as a guideline, however, it may be thought that, depending on the cell density during subculturing and on the culturing conditions and the like, there is a possibility that the number of culturing days required until the cells reach maturity may vary. In a case such as this as well, it may be thought that cells can be harvested at a suitable timing if the cells are harvested using the expression level of CD44 obtained in this example as an index.

Example 7-c: Concerning a Harvesting Period Index Based on the Cell Density

Daily changes in the ECD (corneal endothelial cell density) after subculturing were measured for the cells of Example 7-a using KSSE-400EB.
(Materials Used in the Test)

The same cells as those of Example 7-a were used.
Analysis Software: KSSE-400EB (KONAN Medical)
(Measurement of the Cell Density)

Figure 29:
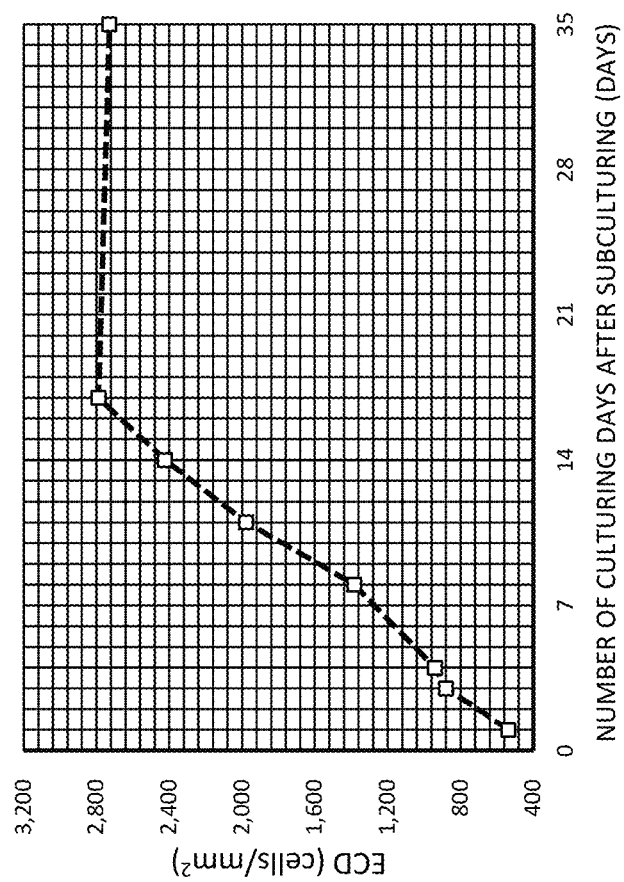
FIG. 29 is a graph showing changes over time (in days) in the ECD in cells that were cultured in Culturing Conditions 2.
Figure 30:
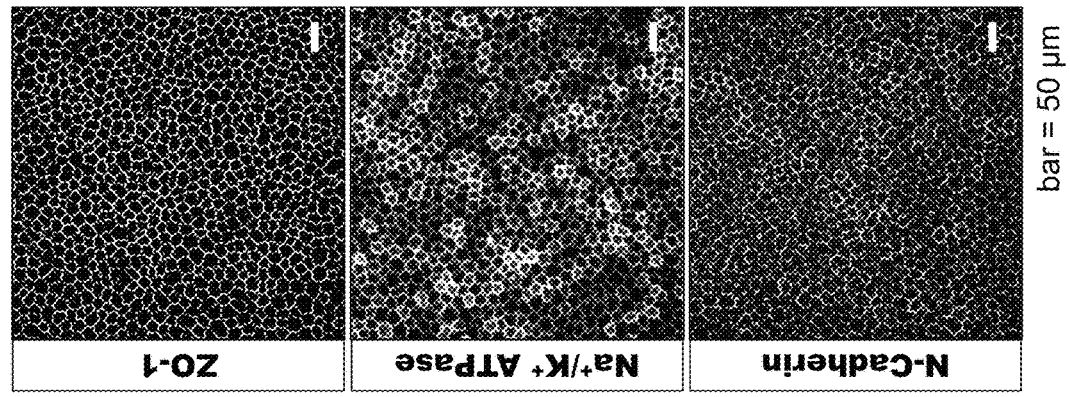
FIG. 30 contains phase-contrast microscopic images, graphs showing results of analyses of surface antigens, and photographic images showing immunostaining results of cells cultured in Culturing Conditions 2 after these had been cryopreserved.
Figure 30:
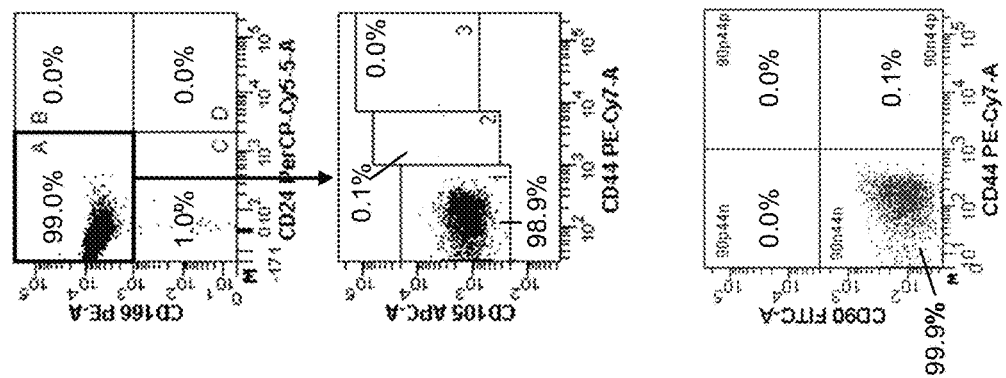
Figure 30:
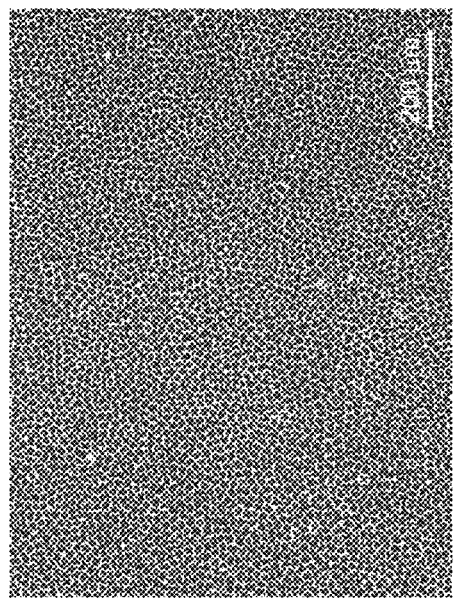

The cells of Example 7-a that were subcultured and seeded to a $5^{th}$ subculturing at a density of 400 cells/mm² were washed with PBS (−) on each of days 2, 4, 6, 9, 12, 17 and 35 after subculturing, and photographic images thereof were acquired using a phase-contrast microscope. The acquired images were analyzed using KSSE-400EB software. The results of this analysis are shown in FIG. 29.
(Results and Conclusion)

The ECD (corneal endothelial cell density) increased rectilinearly from immediately after the subculturing and seeding to the $5^{th}$ subculturing until day 17. From day 17 onwards, the cells plateaued. From these results it can be thought that the proliferation period after subculturing and seeding continues until day 17 when there is a transition to a maturation process. During this proliferation period as well, in order to harvest cells during the limited period from the timing when the destiny of the cells to be differentiated as human maturation and differentiation cells is decided, until before the cells transition to the maturation process, by checking these results against the results obtained in Example 6-a, it may be thought that a suitable timing to harvest the target human corneal endothelial cells and/or human corneal endothelial precursor cells is during a period when the value of the ECD is not less than 900 cells/mm² and not more than 2500 cells/mm².

Here, the number of days in Example 6-a is used as a guideline, however, it may be thought that, depending on the cell density during subculturing and on the culturing conditions and the like, there is a possibility that the number of culturing days required until the cells reach maturity may vary. In a case such as this as well, it may be thought that cells can be harvested at a suitable timing if the cells are harvested using the cell density obtained in this example as an index.

Example 8: Verification of Survival Rate of Long-Term Cryopreserved Cells and of Cell Quality after Recovery and Culturing In Example 8, the survival rate in a case in which cells which were cryopreserved in conditions that had been optimized in Examples 6 and 7 were preserved for a prolonged period, and the quality thereof once these cells were recovered and cultured was examined
(Materials Used in the Test)

Donor corneas from an 8-year-old male were used.

The culture medium that was used was the same as that used in Culturing Conditions 2 of Example 1.
(Cell Culturing and Cryopreservation)

Using donor cornea obtained from a Seattle eye bank, corneal endothelial cells were dissociated therefrom together with the Descemet's membrane and were processed for one evening at 37° C. using collagenase. Thereafter, the cells were suspended in the above-described culture medium, and were seeded on a 6-well plate that had been coated with type I collagen at a rate of one well per eye. These cells were then cultured until the $2^{nd}$ subculturing via the same procedure as that used in the above-described Example 2. The culture medium was replaced at a frequency of twice per week. The cells were harvested on day 7 after seeding. The cells were then frozen using the same method as that used in Example 6, and were preserved in a liquid nitrogen cell preservation vessel.

The cells were thawed in a warm water bath on 99, 160, and 171 days after being preserved, and the survival rate thereof was examined via Trypan blue staining using the same method as that employed in Example 3. In order to resolve the suspicion that the apparent survival rate may have increased due to the destruction of dead cells, the recovery rate (number of cells after cryopreservation/number of cells submitted to cryopreservation), which is the ratio of the number of cells submitted to cryopreservation to the number of cells when the survival rate was examined after cryopreservation, was also examined. The results are shown in Table 3.

TABLE 3

| Preservation Period in Liquid Nitrogen | Survival Rate | Harvest Rate |
| --- | --- | --- |
| 99 Days | 89.9% | 97.5% |
| 160 Days | 87.4% | 104.0% |
| 171 Days | 90.7% | 94.8% |

(Evaluation of the Quality of the Cells that were Recovered and Cultured after being Cryopreserved)

The results obtained for cells from among these cells, that had been preserved in liquid nitrogen for 99 days cultured for 33 days in Culturing Conditions 2 were evaluated using cell morphology, FACS analysis, and evaluation of functional protein expressions by cell immunostaining are shown in FIG. 30A~C. For the FACS analysis and cell immunostaining, the same procedure as that employed in Example 4 was followed. The cell density, which was analyzed using KSSE-400EB software, was 3344±150.8 cells/mm 2, and the PDGF-BB density in the culture supernatants on day 32 was 217.5±1.53 pg/mL. As has been described above, it can be verified that, by employing the present disclosure, a cell population from which it is possible to obtain a cell population having a high percentage content of functional human corneal endothelial cells after the cells have been recovered and cultured is able to be cryopreserved for a period of 5 months or more with a survival rate of 90% or more being maintained for these cells.

Example 9: Ice Temperature Preservation of Cells and Verification of Survival Rate In Example 9, the effects of the harvesting timing after subculturing on the survival rate in a case in which the cells were preserved at ice temperature in a suspension solution state were examined
(Materials Used in the Test)

Donor corneas from an 8-year-old male were used.

The culture medium that was used was the same as that used in Culturing Conditions 2 of Example 1.

The cells of the respective samples were as follows.

Sample 1: The cells were cultured using the same procedure as that employed in Example 2 for a period of 94 days in Passage 3 without being cryopreserved.

Sample 2: The cells were cultured using the same procedure as that employed in Example 2. They were then harvested on day 7 at Passage 2, and were then cryopreserved following the same procedure as that employed in Example 3. After being thawed, they were then cultured for a period of 33 days in Passage 3.

Sample 3: The cells were cultured using the same procedure as that employed in Example 2. They were then harvested on day 7 at Passage 2, and were then cryopreserved following the same procedure as that employed in Example 3. After being thawed, they were repeatedly subcultured until Passage 5, and were then cultured for 9 days at Passage 6.
(Ice Temperature Survival Rate and Survival Rate after Preservation)

The above-described Samples 1 through 3 were dissociated from the culture vessels using 10× TrypLE™ Select (from Thermo Fisher Scientific) and cell suspension solutions were prepared.

After a portion (10 μl) of each cell suspension solution had been dyed with Trypan blue, the live cell numbers and the dead cell numbers were measured using a hemocytometer. Based on the obtained measurement results, the cells were suspended in their respective conditioned culture media at a cell density of $3.33 \times 10^6$ cells/ml. They were then placed in 1.5 mL volume commercially available microtubes, and were preserved in ice.
(Verification of Survival Rate after Ice Temperature Preservation)

Figure 31:
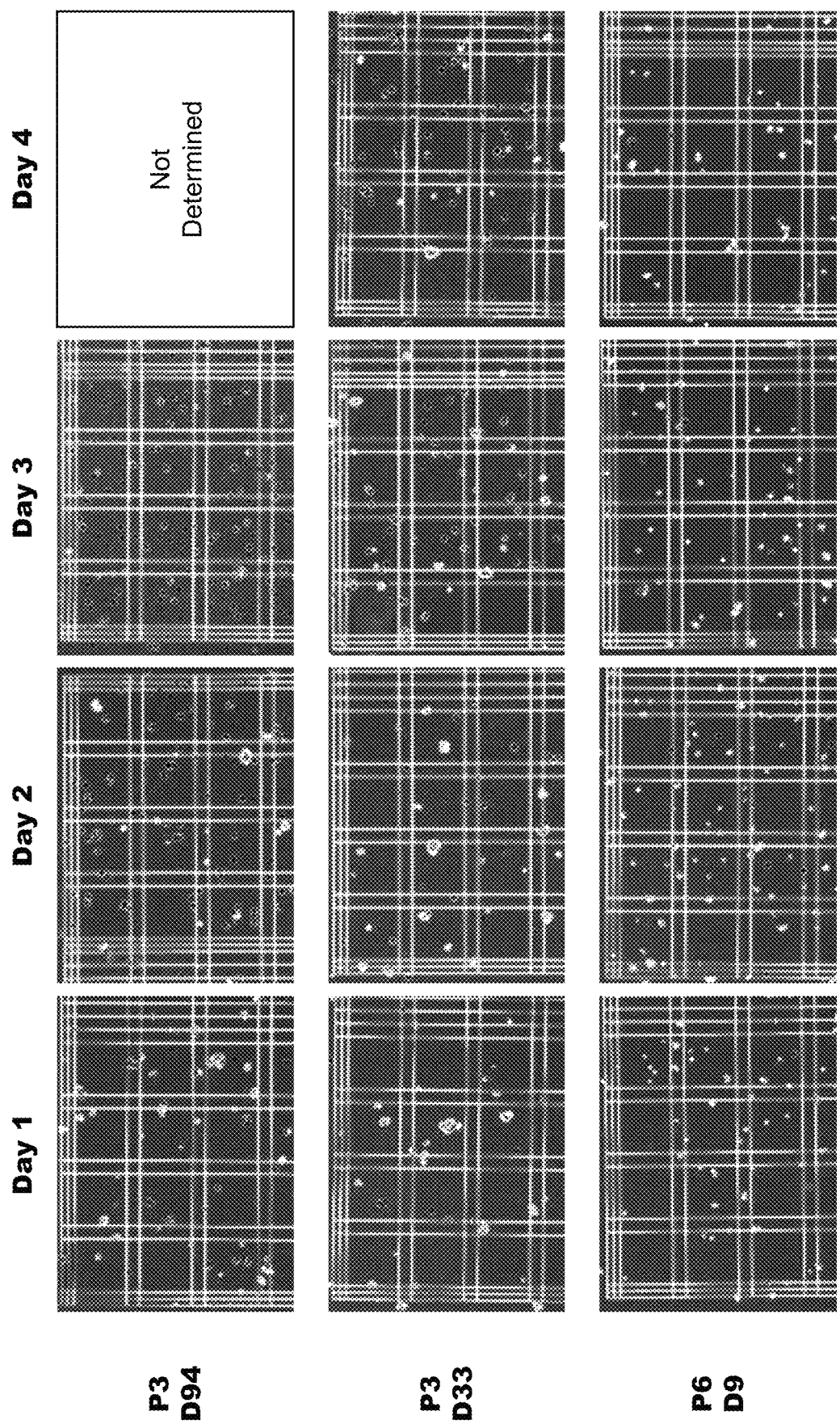
FIG. 31 contains photographic images of Trypan blue staining of the cultured human corneal endothelial cells after these had been preserved at ice temperature.
Figure 32:
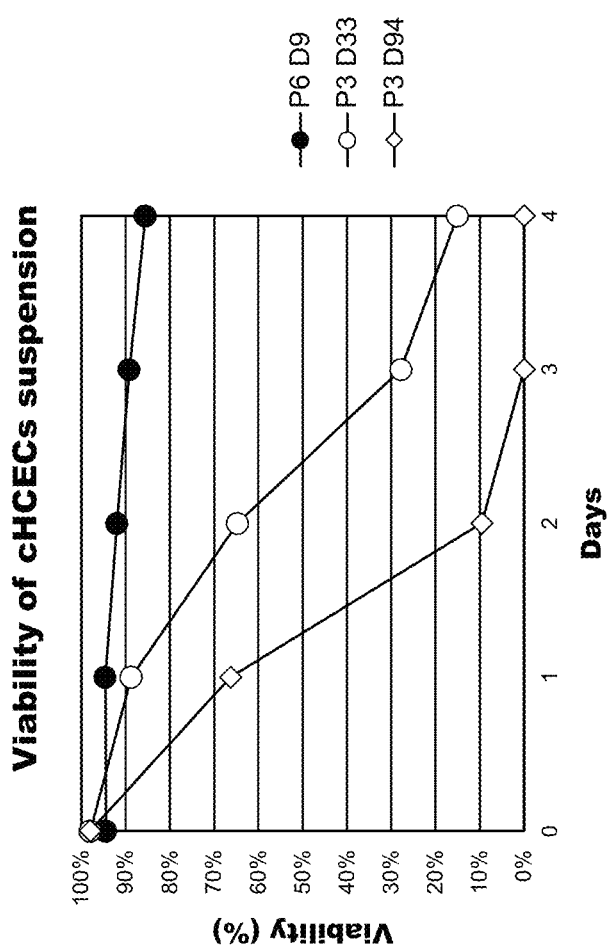
FIG. 32 is a graph showing survival rates calculated from the results shown in FIG. 31.

On days 1~4 after preservation was started, a portion (10 μl) of each cell suspension solution was harvested, and was dyed with Trypan blue. The live cell numbers and the dead cell numbers were then measured using a hemocytometer, and the cell survival rate was calculated. The results of this Trypan blue dyeing are shown in FIG. 31, while the respective survival rates calculated from the results shown in FIG. 31 are shown in FIG. 32.

From the results shown in FIG. 32 it was found that, while the survival rate in Sample 1 dropped to below 70% on day 1, and the survival rate in Sample 2 dropped to below 70% on the 2nd day, in Sample 3 the survival rate was maintained in excess of 80% even on day 4.
(Conclusion)

From the above-described results it was confirmed that, in the same way as when cryopreservation is employed, if cells are harvested and preserved during a period of not less than 4 days and not more than 14 days after the most recent subculturing, then compared with when the cells are harvested after maturation, a high survival rate can be maintained even in ice temperature preservation.

Figure 33:
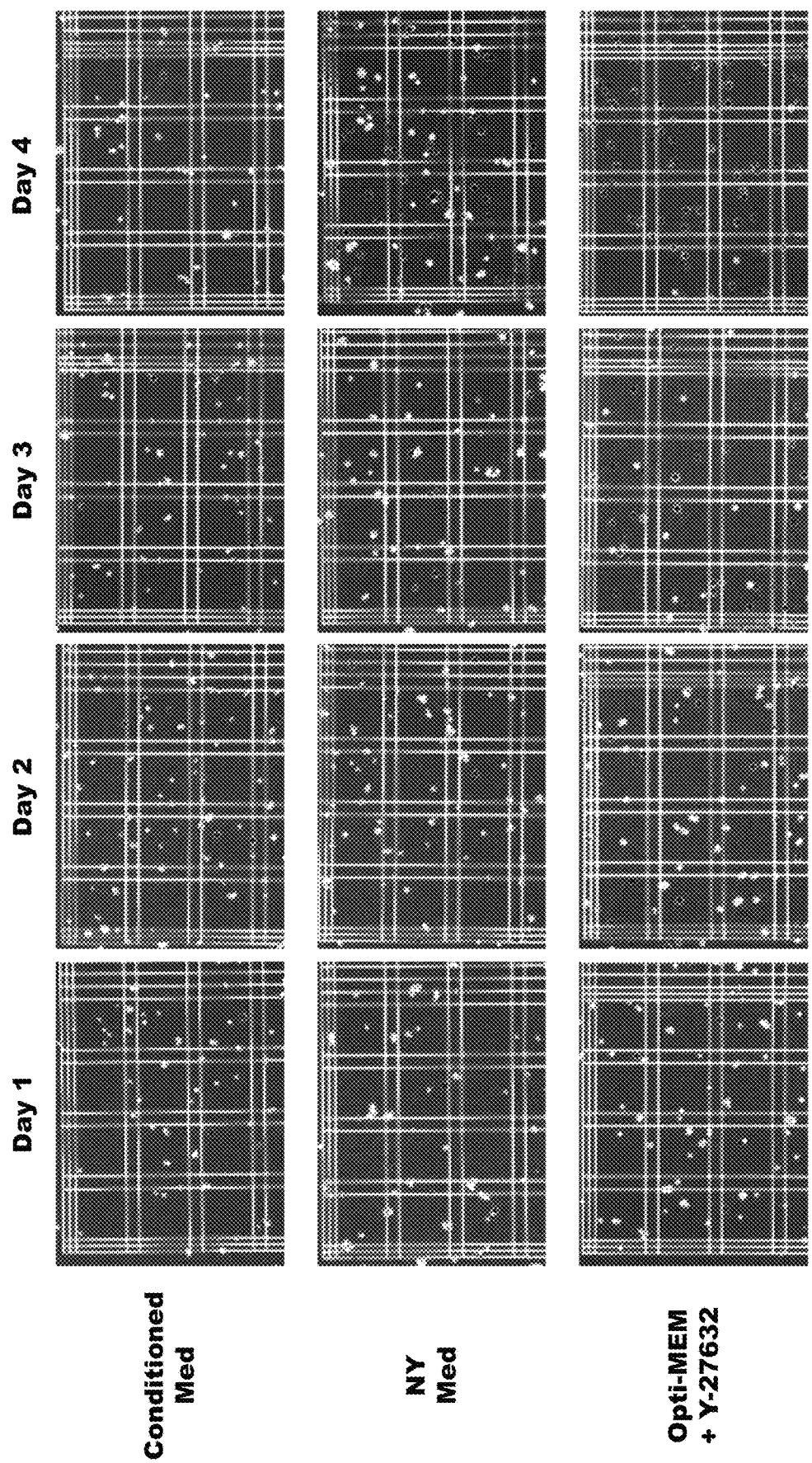
FIG. 33 contains photographic images of Trypan blue staining of the cells after these had been preserved in different preservation solutions at ice temperature.
Figure 34:
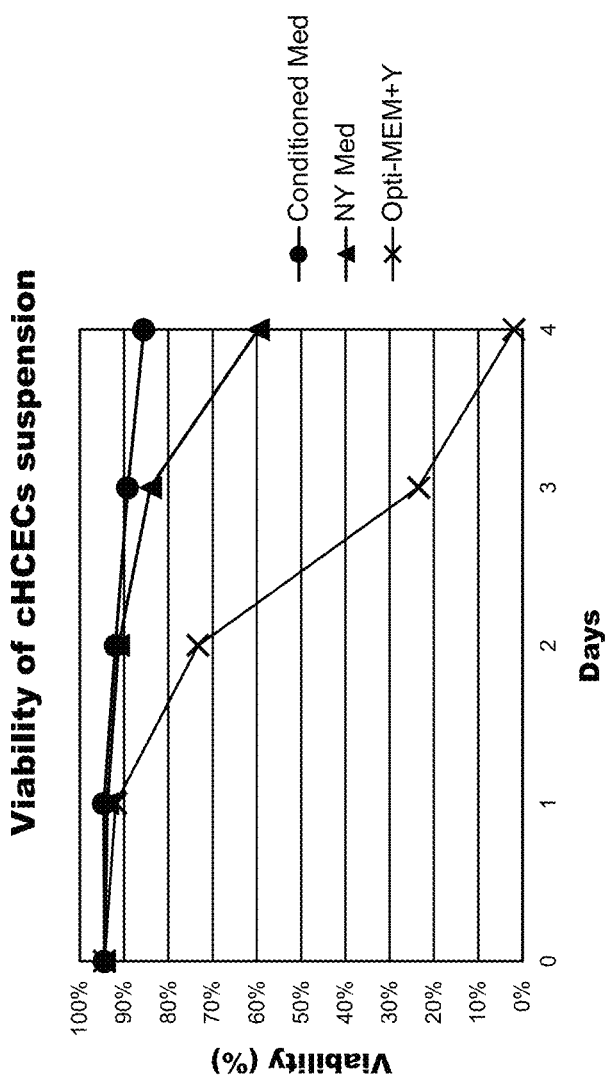
FIG. 34 is a graph showing survival rates calculated from the results show in FIG. 33.

Example 10: Effects of Preservation Solution in Cell Ice Temperature Preservation In Example 10, the effects on the survival rate from the type of preservation solution that is used when performing ice temperature preservation were examined
(Materials Used in the Test)
The cells used in this test were those from Sample 3 of Example 9.
The preservation solutions used in the test were as follows.
Preservation Solution A: Conditioned culture medium
Preservation Solution B: The culture medium of Culturing Conditions 2 of Example 1 which was prepared on the day of the test.
Preservation Solution C: Opti-MEM+100 µM of Y-27632 which was prepared on the day of the test
(Ice Temperature Preservation and Verification of Survival Rate)
The cells of Sample 3 of Example 9 were suspended in the above-described Preservation Solutions A, B, or C at a cell density of $3.33 \times 10^6$ cells/ml, and were then preserved in ice.
On days 1~4 after preservation was started a portion (10 µl) of each cell suspension solution was harvested, and was dyed with Trypan blue. The live cell numbers and the dead cell numbers were then measured using a hemocytometer, and the cell survival rate was calculated. The results of this Trypan blue dyeing are shown in FIG. 33, while the respective survival rates calculated from the results shown in FIG. 33 are shown in FIG. 34.
From the results shown in FIG. 34 it was found that, irrespective of which preservation solution is used, a survival rate of 70% or more is able to be maintained for at least 2 days.
Moreover, in the case of the conditioned culture medium, it was found that a high survival rate of 80% or more is able to be maintained even on day 4 and thereafter.
(Conclusion)
From the above-described results it can be inferred that a broad range of preservation solutions can be used in ice temperature preservation.
In addition, it was found that, by utilizing more appropriate preservation solutions, even when ice temperature preservation is employed, it is still possible to maintain a high survival rate for human corneal endothelial cells of 80% or more over a prolonged period in excess of 4 days.

Example 11: Evaluation of the Period of Differentiation and Maturation of Ice Temperature Preserved Cells into Functional Human Corneal Endothelial Cells In Example 11, in a case in which cells that have been preserved at ice temperature are seeded at the same cell density as when cells are transplanted into a human, then in the same way as in a case in which they transplanted into a human, whether the cells are rapidly differentiated and matured into functional human corneal endothelial cells was examined.
(Evaluation of Cell Morphology)
When transplanting cells into a human, 300 µl of a suspension solution having a cell density of $3.33 \times 10^6$ cells/ml are injected into the anterior chamber. Therefore, 300 µl of a cell suspension solution (having an equivalent cell density as when transplanting into a human) that had been preserved at ice temperature for 4 days using Preservation Solution A in Example 9 were seeded on a 24-well plate (having a diameter of approximately 7.78 mm and a bottom surface area of 190 mm$^2$, and which had been coated with I-type collagen) having a surface area close to that of a human endothelial surface. After this seeding, the cells were cultured for 7 days in the Culturing Conditions 2 of Example 1. Phase-contrast microscopic images acquired at this time are shown in FIG. 35.

Figure 35:
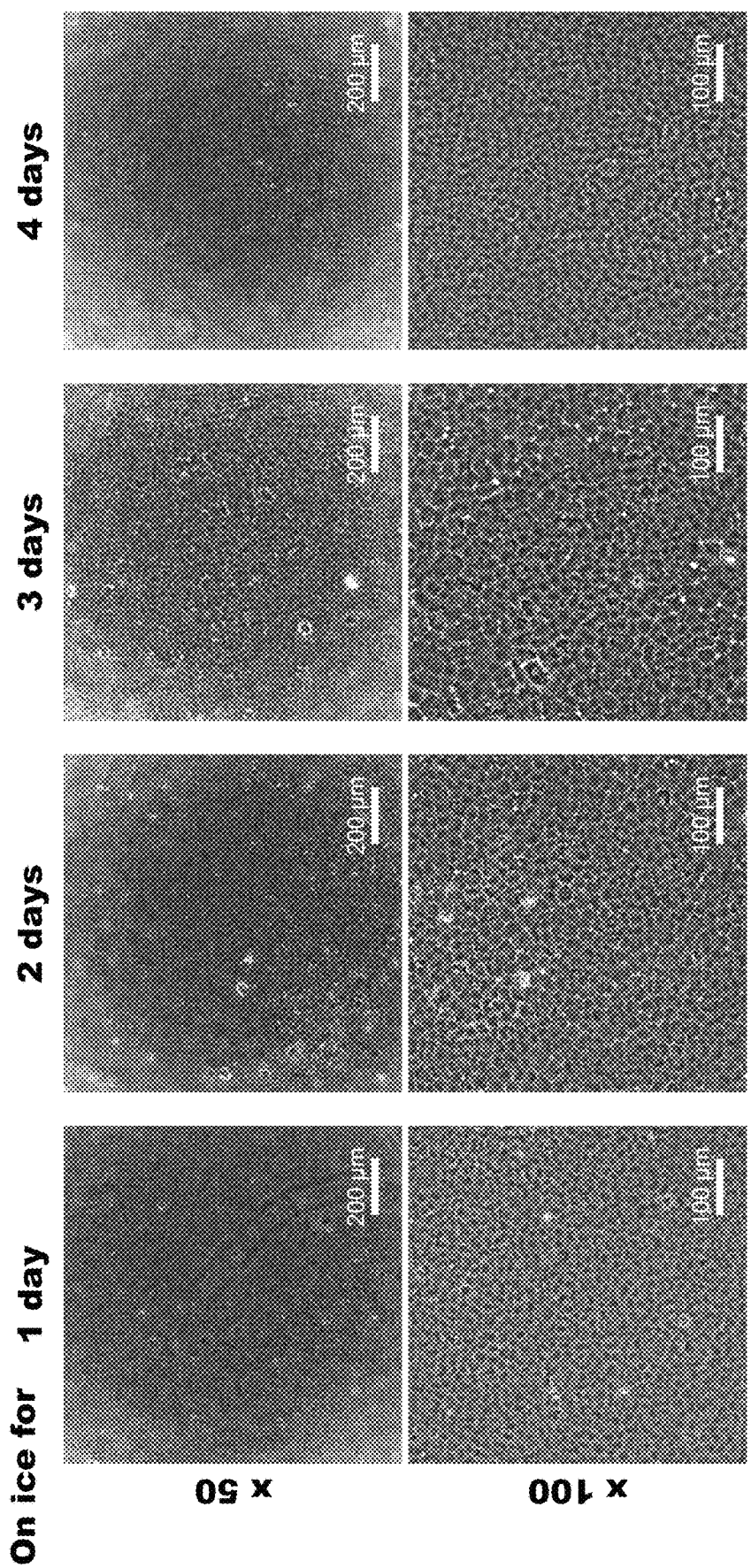
FIG. 35 contains phase-contrast microscopic images of cells that had been subjected to recovery culture after having been preserved at ice temperature using conditioned medium as the preservation solution.
Figure 36:
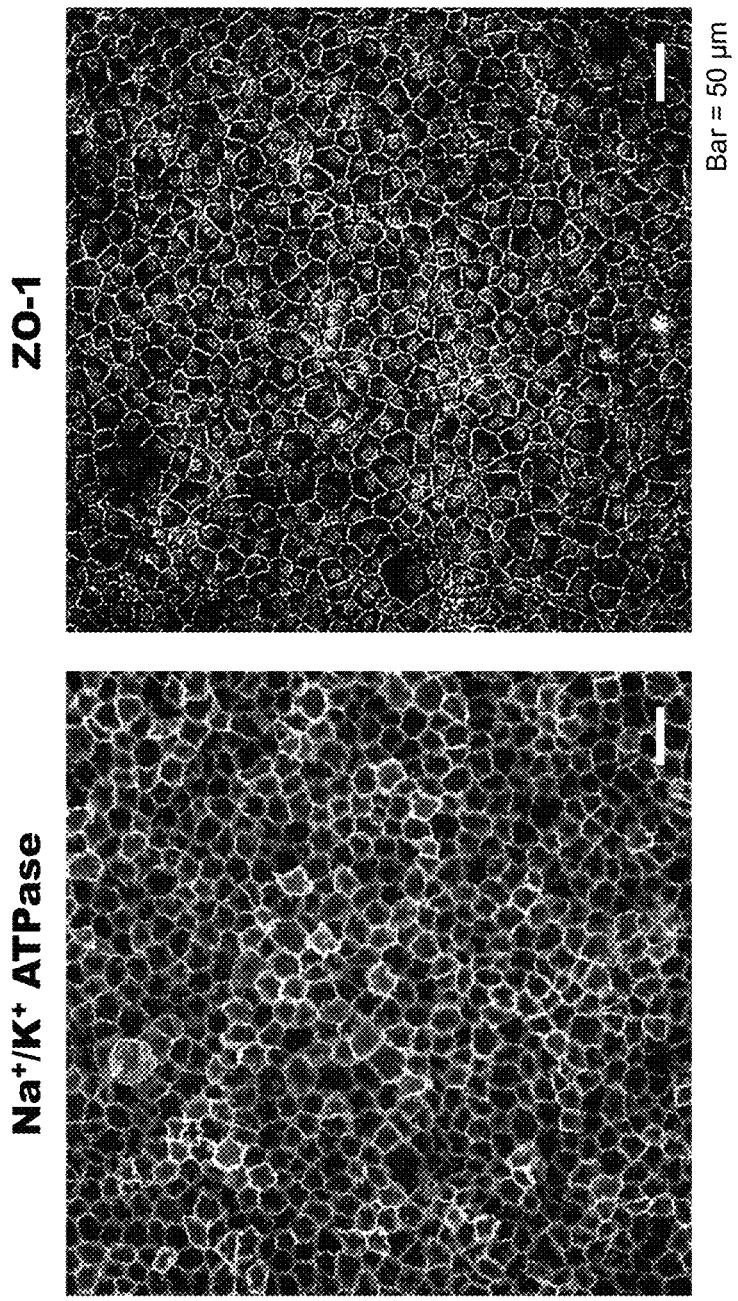
FIG. 36 contains photographic images of immunostaining of the cells that had been subjected to recovery culture after having been preserved at ice temperature using conditioned medium as the preservation solution.

From FIG. 35 it can be seen that, even when the cells are preserved at ice temperature for 4 days, in a case in which the cells are seeded at a similar cell density as when performing a transplant into a human, the cells attain the shape of functional human corneal endothelial cells in 1 week after seeding.
(Evaluation Using Immunostaining)
The cells shown in FIG. 35 were fixed using ice cold Methanol, and immunostaining was employed in order to verify expressions of Na$^+$/K$^+$ ATPase and ZO-1 which are functional proteins in human corneal endothelial cells. The results of this are shown in FIG. 36.
From the results shown in FIG. 36 it is possible to verify expressions of Na$^+$/K$^+$ ATPase and ZO-1 in substantially all cells.
(Conclusion)
From the above results it is possible to verify that, even when cells are preserved at ice temperature for 4 days, in a case in which the cells are seeded at a similar cell density as when performing a transplant into a human, then in the same way as in a case in which the cells are transplanted into a human, the cells are differentiated and matured in 1 week, and functional proteins of human corneal endothelial cells are expressed.
In this Example 11, one of the reasons why it is possible to obtain a cell population having functional human corneal endothelial cells with the short time period of just 1 week is thought to be that, because the cells are seeded at a high density and do not require a proliferation period, the cells begin to differentiate and mature immediately after being seeded.

Example 12: Short-Term Large-Scale Culturing of Human Corneal Endothelial Cells after Cryopreservation From the above-described Examples 1~11, it is able to be verified that, even in a case in which cells are harvested in 14 days or less from the most recent subculturing, there are no phase transitions in culturing after preservation. For this reason, in Example 12, an attempt was made to culture human corneal endothelial cells within a shorter time period than in the conventional technology by employing a method in which cells are repeatedly harvested in 14 days or less and subcultured.
(Culturing Conditions)
The cells were cultured with the same procedure as that for Example 2 until day 7 of Passage 2. The cells were then harvested on day 7 of Passage 2, and were cryopreserved following the same procedure as that employed in Example 3. The cell suspension solution which had been cryopreserved was then thawed, and was seeded so that the cell density when culturing started was 400 cells/mm$^2$, and the cells were then repeatedly subcultured for periods of 8 days to 10 days until Passage 8 so as to proliferate the cells.

(Results and Conclusion)

Figure 37:
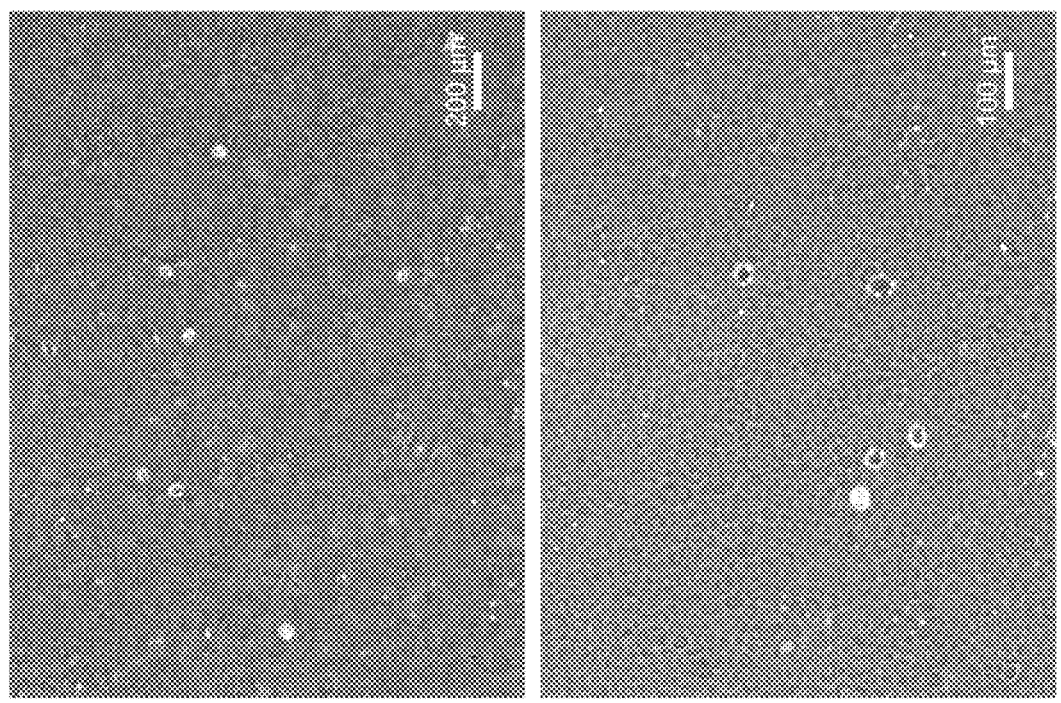
FIG. 37 contains a graph showing a proliferation rate and phase-contrast microscopic images of cells that were subcultured to Passage 8 at 8~10 day intervals after thawing.
Figure 37:
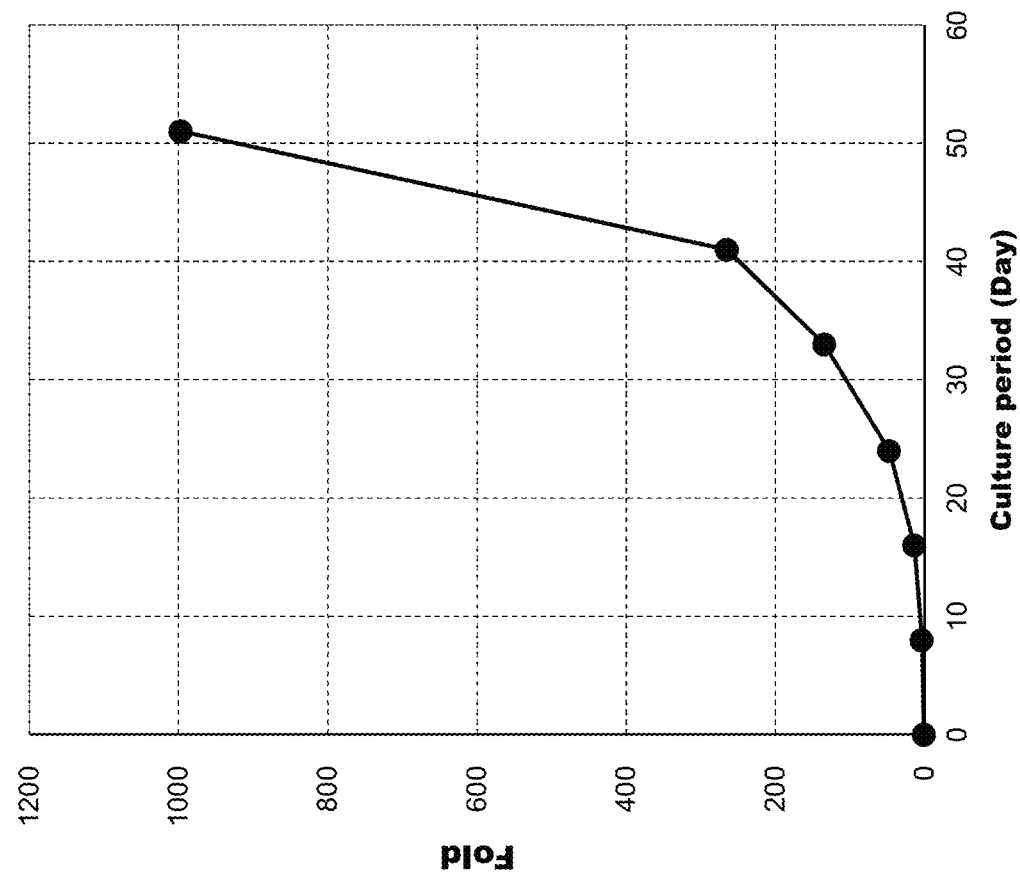
Figure 38:
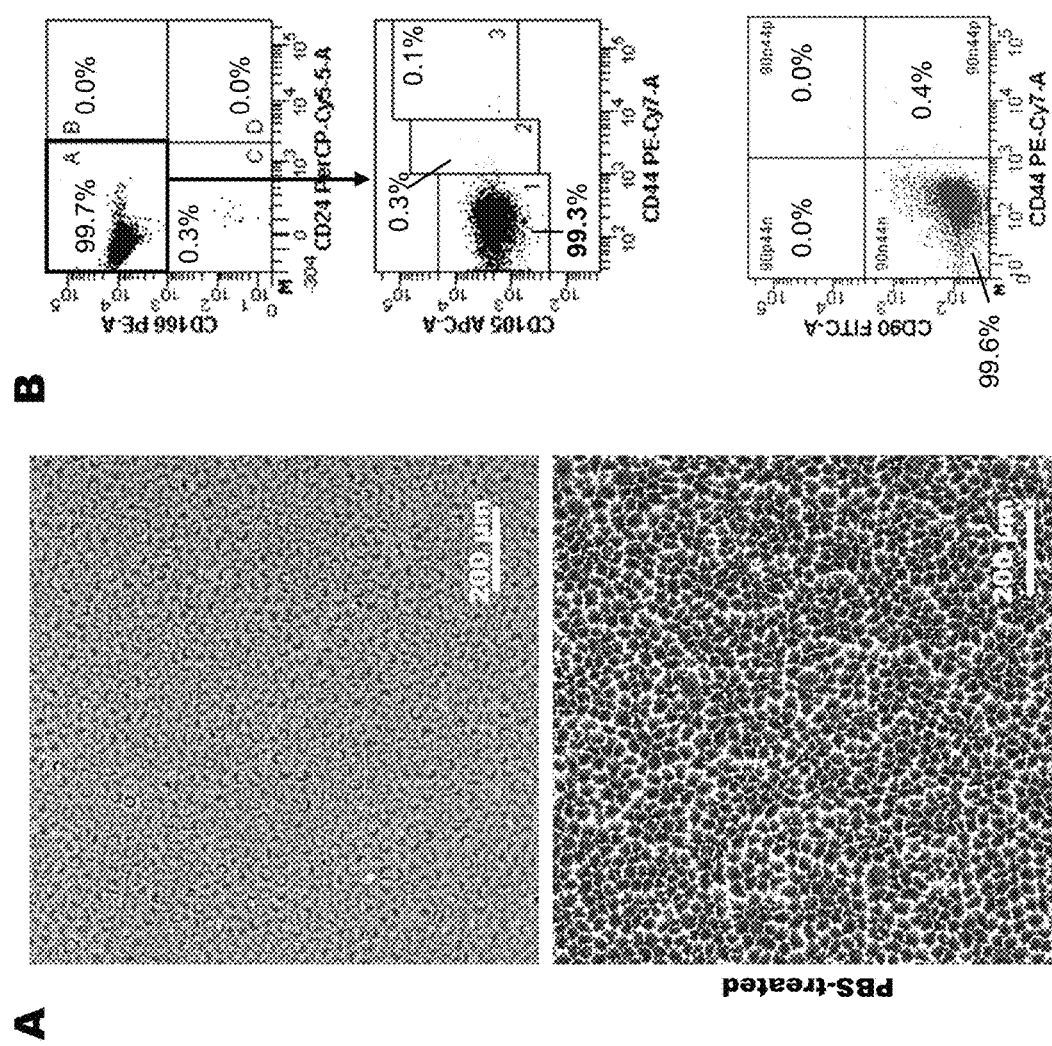
FIG. 38 contains phase-contrast microscopic images of the cells obtained when the cells shown in FIG. 29 were subcultured to Passage 9, and were cultured for 34 days in Culturing Conditions 2, and graphs showing analysis results of surface antigens thereon.

The results of this are shown in FIG. 37 and in Table 4. The phase-contrast microscopic images shown in FIG. 37 are from day 10 in Passage 8.

TABLE 4

| P | culture period (Day) | | ECD (cells/mm$^2$) | | Via-bility | Growth rate (fold) | |
|---|---|---|---|---|---|---|---|
| | each passage | Total | Seeded | at Passage | | Step | Cumu-lative |
| P3 | 8 | 8 | 400 | 1542 | 98.0% | 3.9 | 3.9 |
| P4 | 8 | 16 | 400 | 1440 | 95.2% | 3.6 | 13.9 |
| P5 | 8 | 24 | 400 | 1373 | 96.5% | 3.4 | 47.7 |
| P6 | 9 | 33 | 400 | 1130 | 94.4% | 2.8 | 134.6 |
| P7 | 8 | 41 | 400 | 788 | 97.0% | 2.0 | 265.2 |
| P8 | 10 | 51 | 400 | 1504 | 95.2% | 3.8 | 997.1 |

From the results shown in FIG. 37 and Table 4 it was found that, although it takes half a year or longer to increase the number of cells 1000-fold using a conventional method, according to the present example, this period can be shortened to approximately a mere 50 days.

Furthermore, cells on day 10 of Passage 8 were subcultured to Passage 9, and phase-contrast microscopic images of these cells that were cultured for 34 days in Culturing Conditions 2 are shown in FIG. 38A, while results when surface antigens thereof were analyzed via FACS analysis are shown in FIG. 38B. The FACS analysis was conducted using the same procedure as that employed in Example 4. As a result, it was able to be verified that, in the case of cells that are repeatedly subcultured at from 8 to 10 day intervals after seeding, which is before these cells are differentiated and matured, by further culturing these cells using a culture medium that ultimately contains a ROCK inhibitor and whose EGF percentage content is less than a concentration that will cause a transformation, it is possible to obtain a cell population having a sufficiently high percentage content of functional human corneal endothelial cells.

Example 13: Short-Term Large-Scale Culturing of Human Corneal Endothelial Cells

Figure 39:
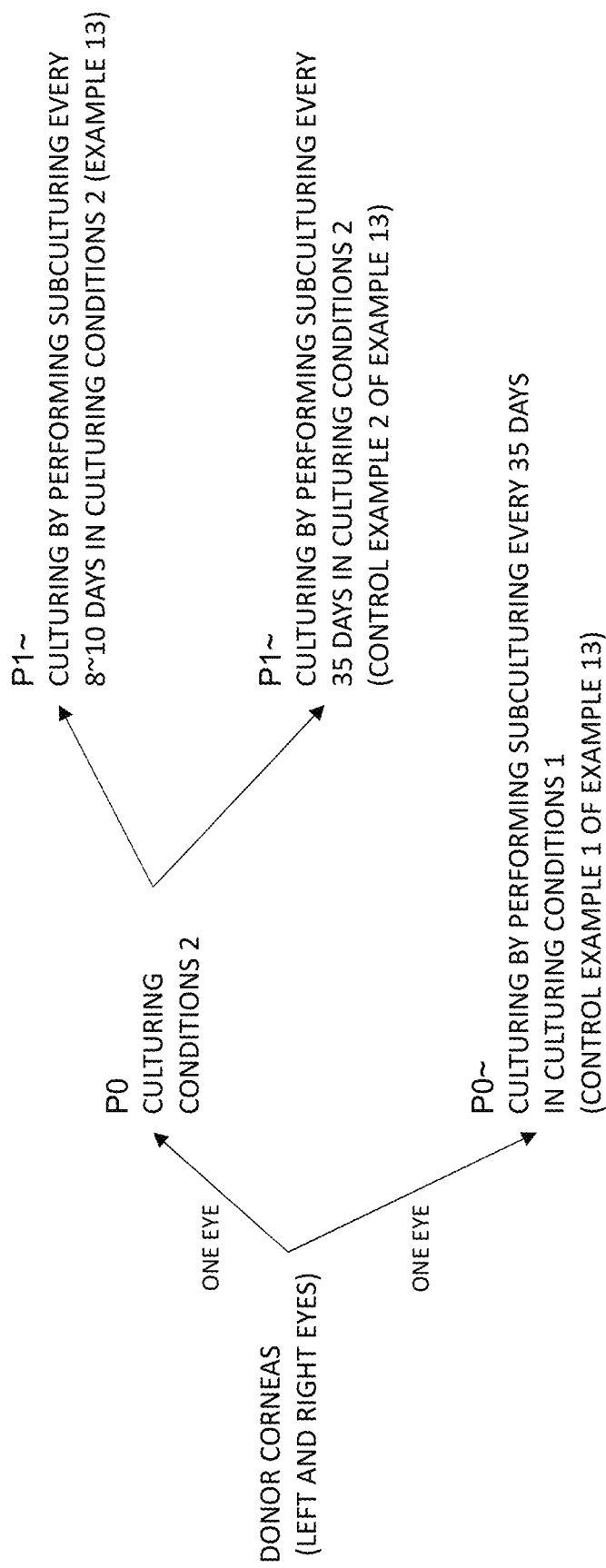
FIG. 39 is a diagram describing culturing conditions for cells in Example 13.

In the above-described Example 12, an example in which a cell suspension solution is thawed after having been cryopreserved, and large-scale culturing is performed in a short period of time is described, however, in the present example an attempt was made to perform short-term large-scale culturing of cells that had not been cryopreserved.
(Materials Used in the Test)
Donor corneas from a 29-year-old male and an 8-year-old female were used.
(Culturing Conditions)
Cells of one cornea from one donor were cultured by being subcultured at 35-day intervals in the Culturing Conditions 1 of Example 1 (i.e., Control Example 1). The other cornea from the same donor were cultured in the Culturing Conditions 2 of Example 1. The cells were then divided into two groups at the point when they were subcultured to Passage 1, and one of these groups was cultured by being subcultured at intervals in the Culturing Conditions 2 of Example 1 (i.e., Control Example 2), while the other group was cultured by being repeatedly subcultured at approximately 8-day intervals (i.e., between 5 and 11 days) in the same way as in Example 12 (Example 13). An outline of this procedure is shown in FIG. 39.

Figure 40:
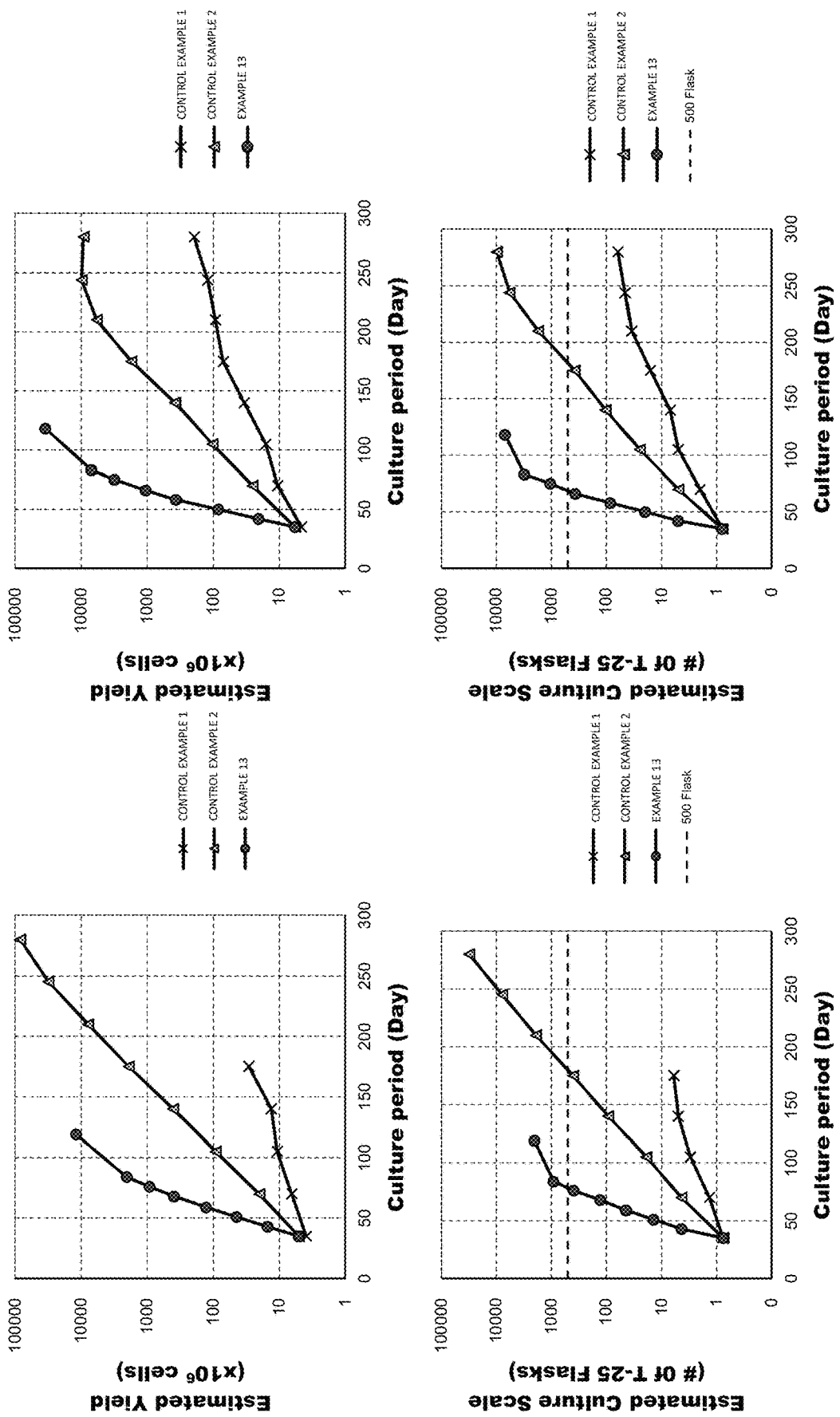
FIG. 40 contains graphs showing changes in cell yields and culturing scales in the respective culturing conditions shown in FIG. 39.

(Results and Conclusion)
Cell yields calculated from the proliferation rate and culturing scales are shown in FIG. 40. In the short-term large-scale culturing method of the present example in which cells were repeatedly subcultured at approximately 8-day intervals, it can be seen that, within 80 days, 2 billion cells, or 500 flasks worth of cells in terms of the volume of the T-25 flask, are obtained.

Figure 41:
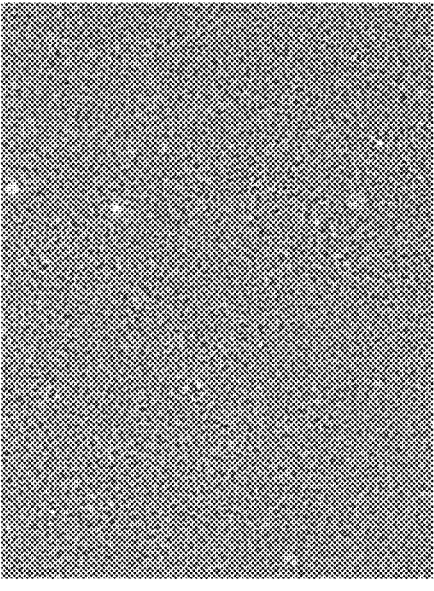
FIG. 41 contains the cell yields and phase-contrast microscopic images of cultivated cells in the respective culturing conditions shown in FIG. 39.
Figure 42:
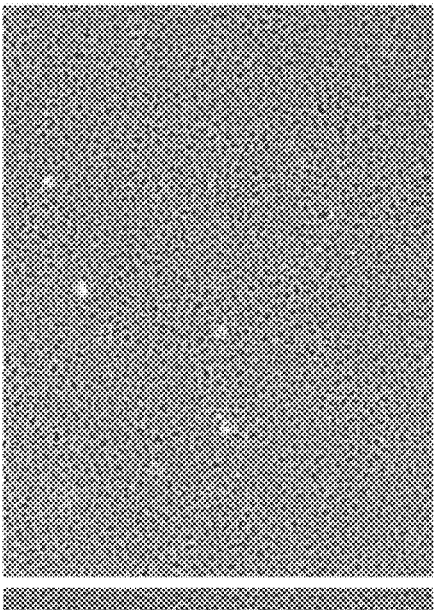
FIG. 42 contains the cell yields and phase-contrast microscopic images of cultivated cells in the respective culturing conditions shown in FIG. 39.

Moreover, photographic images of the cells that were cultured using the above-described short-term large-scale culturing method until Passage 4 and were then cultured for approximately 5 weeks in Passage 5, and of the cells of Control Example 2 that were cultured for approximately the same number of days, and of the cells of Control Example 2 that were cultured until Passage 5, and also a comparison of the resulting yields are shown in FIG. 41 and FIG. 42.

Figure 44:
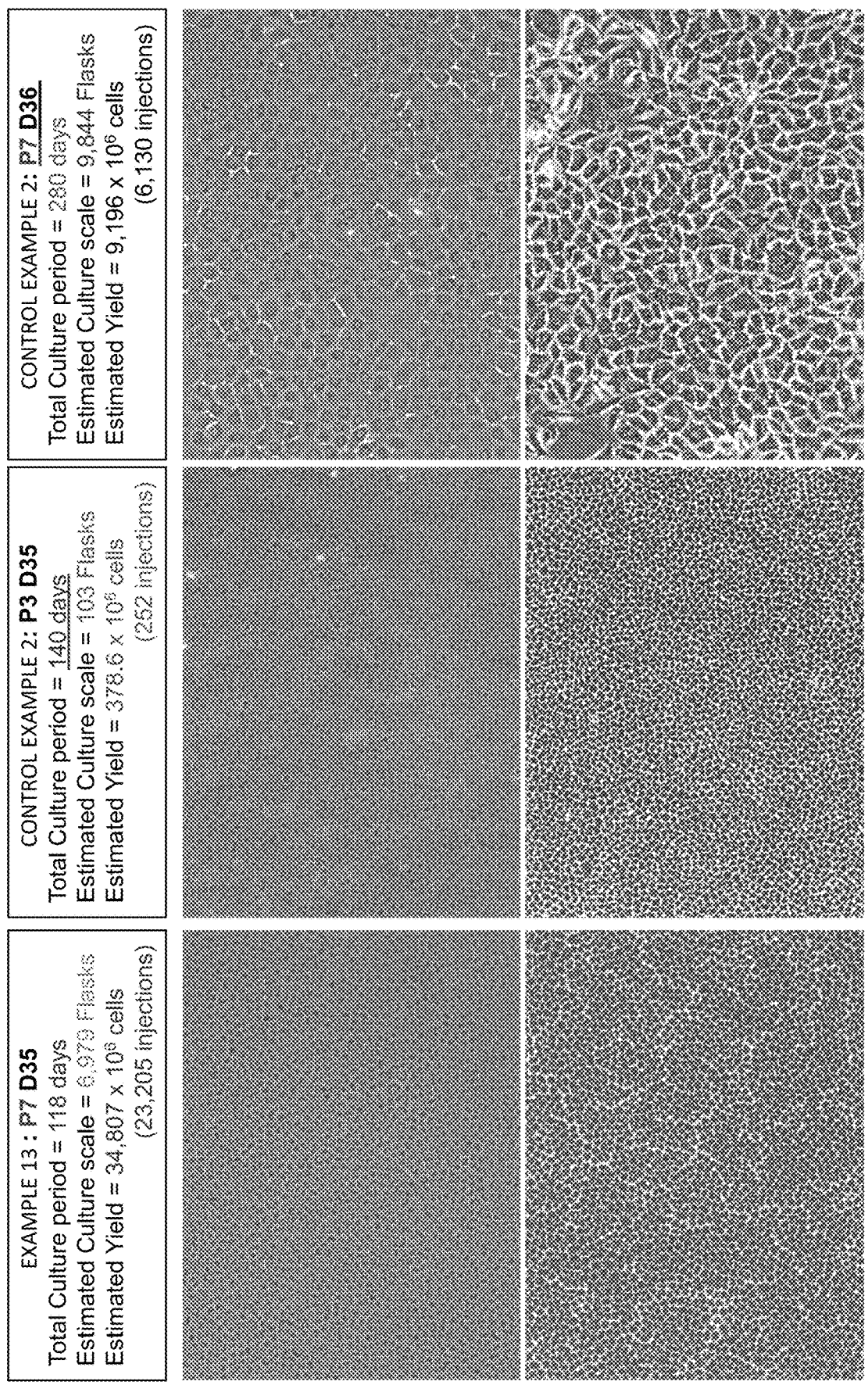
FIG. 44 contains the cell yields and phase-contrast microscopic images of cultivated cells in the respective culturing conditions shown in FIG. 39.

In the same way, photographic images of the cells that were cultured using the short-term large-scale culturing method until Passage 6 and were then cultured for approximately 5 weeks in Passage 7, and of the cells of Control Example 2 that were cultured for approximately the same number of days, and of the cells of control Example 2 that were cultured until Passage 7, and also a comparison of the resulting yields are shown in FIG. 43 and FIG. 44.
(Conclusion)
From the results shown in FIGS. 41 through 44 it can be seen that the short-term large-scale culturing method of the present example also enables a cell population having a sufficiently high percentage content of functional human corneal endothelial cells to be obtained within a short time period and at a high yield.

Observations on Examples 1 Through 13

From the results obtained from the above-described respective examples it can be seen that, if cells are destined to become functional human corneal endothelial cells by being cultured under appropriate culturing conditions, then by harvesting those cells in an immature state and either preserving or subculturing them, it is possible to obtain the target functional human corneal endothelial cells.

What is claimed is:

1. A method comprising:
   culturing human corneal endothelial cells and/or human corneal endothelial precursor cells in a culture medium comprising a ROCK inhibitor, wherein the human corneal endothelial cells and/or human corneal endothelial precursor cells are seeded at a density of not less than 300 cells/mm$^2$ and not more than 500 cells/mm$^2$;
   testing a sample of the cultured human corneal endothelial cells and/or human corneal endothelial precursor cells for their CD44 expression level;
   harvesting the human corneal endothelial cells and/or human corneal endothelial precursor cells during a period from (i) when the expression level of CD44 becomes equal to or less than half a maximum value observed after the seeding until (ii) the expression level of CD44 reaches a plateau;
   placing the harvested human corneal endothelial cells and/or human corneal endothelial precursor cells in suspension; and
   preserving the harvested human corneal endothelial cells and/or human corneal endothelial precursor cells.

2. The method according to claim 1, wherein the human corneal endothelial cells and/or human corneal endothelial precursor cells are preserved at a temperature of not more than 10 degrees Celsius.

3. The method according to claim 1, wherein the human corneal endothelial cells and/or human corneal endothelial precursor cells are preserved at a temperature of not more than-30 degrees Celsius.

4. The method according to claim 1, wherein the human corneal endothelial cells and/or human corneal endothelial precursor cells are preserved for 24 hours or longer after being placed in suspension.

5. The method according to claim 1, wherein the culture medium further comprises epidermal growth factor (EGF) and the concentration of EGF is less than 5 ng/mL.

6. The method according to claim 1, wherein the preserved human corneal endothelial cells and/or the human corneal endothelial precursor cells are capable of being cultured and/or differentiated and matured such that a cell population resulting from such culturing and/or differentiation and maturation satisfies one or more of the following conditions:
   (a) does not contain fibroblasts, foreign matter, discoloration, or other abnormalities;
   (b) has a survival rate of 70% or more in a Trypan blue dye exclusion assay;
   (c) has a PDGF-BB concentration of 100 pg/mL or more via an ELISA assay;
   (d) is greater than 99% $CD166^+$, less than 5% $CD24^+$, less than 5% $CD44^{high}$, greater than 90% $CD44^{neg-low}$, less than 5% $CD90^+$;
   (e) has a ratio of effector cells to human corneal endothelial cells of greater than 90%;
   (f) is positive for $Na^+/K^+$ ATPase pumping function;
   (g) is positive for barrier function (ZO-1); and
   (h) has a human corneal endothelial cell density of 1500 cells/mm$^2$ or greater.

7. The method according to claim 6, wherein an endothelial-mesenchymal transition has not occurred in the effector cells.

8. The method according to claim 5, wherein the concentration of EGF is less than 0.5 ng/mL.

9. The method according to claim 1, wherein the culture medium has no EGF.

10. The method of claim 1, wherein the harvesting is during a period from immediately after a morphology of the human corneal endothelial cells and/or human corneal endothelial precursor cells has shifted from a spindle-shape to a polygonal shape or an elliptical shape whose major axis-minor axis ratio is about 2:1 to about 1:2, until immediately before boundaries between the cells become indistinct.

11. The method according to claim 1, wherein the ROCK inhibitor is Y-27632.

* * * * *